US012200200B2

(12) United States Patent
Ko et al.

(10) Patent No.: US 12,200,200 B2
(45) Date of Patent: *Jan. 14, 2025

(54) VIDEO SIGNAL PROCESSING METHOD AND DEVICE USING MOTION COMPENSATION

(71) Applicant: WILUS INSTITUTE OF STANDARDS AND TECHNOLOGY INC., Seongnam-si (KR)

(72) Inventors: Geonjung Ko, Seoul (KR); Dongcheol Kim, Suwon-si (KR); Juhyung Son, Uiwang-si (KR); Jaehong Jung, Seoul (KR); Jinsam Kwak, Anyang-si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,003

(22) Filed: Oct. 20, 2023

(65) Prior Publication Data

US 2024/0048692 A1 Feb. 8, 2024

Related U.S. Application Data

(63) Continuation of application No. 17/423,853, filed as application No. PCT/KR2020/000964 on Jan. 20, 2020, now Pat. No. 11,849,106.

(30) Foreign Application Priority Data

Jan. 18, 2019 (KR) .......................... 10-2019-0006511
Mar. 29, 2019 (KR) .......................... 10-2019-0037000

(Continued)

(51) Int. Cl.
H04N 19/105 (2014.01)
H04N 19/139 (2014.01)
(Continued)

(52) U.S. Cl.
CPC ......... *H04N 19/105* (2014.11); *H04N 19/139* (2014.11); *H04N 19/176* (2014.11); *H04N 19/52* (2014.11); *H04N 19/70* (2014.11)

(58) Field of Classification Search
CPC .. H04N 19/105; H04N 19/139; H04N 19/176; H04N 19/52; H04N 19/70
(Continued)

(56) References Cited

U.S. PATENT DOCUMENTS 11,849,106 B2 * 12/2023 Ko ........................ H04N 19/70
2013/0279577 A1 10/2013 Schwarz et al.
(Continued)

FOREIGN PATENT DOCUMENTS

CN          1808428 A      7/2006
CN        104205829 A     12/2014
(Continued)

OTHER PUBLICATIONS

Office Action for EP 20741489.7 by European Patent Office dated Sep. 4, 2023.
(Continued)

Primary Examiner — Behrooz M Senfi
(74) Attorney, Agent, or Firm — BROADVIEW IP LAW, PC

(57) ABSTRACT

Disclosed is a video signal processing method and device that encodes or decodes a video signal. In particular, the video signal processing method may comprise the steps of: parsing a first syntax element indicating whether a merge mode is applied to a current block; when the merge mode is applied to the current block, determining whether to parse a second syntax element on the basis of a first predefined condition, wherein the second syntax element indicates whether a first mode or a second mode is applied to the current block; when the first mode and the second mode are
(Continued)

not applied to the current block, determining whether to parse a third syntax element on the basis of a second predefined condition; and determining a mode applied to the current block on the basis of the second syntax element or the third syntax element.

10 Claims, 33 Drawing Sheets

(30) Foreign Application Priority Data

| | | |
|---|---|---|
| Apr. 5, 2019 | (KR) | 10-2019-0040400 |
| May 31, 2019 | (KR) | 10-2019-0064959 |
| Jun. 24, 2019 | (KR) | 10-2019-0075316 |
| Jul. 7, 2019 | (KR) | 10-2019-0081764 |
| Oct. 11, 2019 | (KR) | 10-2019-0125746 |

(51) Int. Cl.
  *H04N 19/176* (2014.01)
  *H04N 19/52* (2014.01)
  *H04N 19/70* (2014.01)

(58) Field of Classification Search
  USPC .................................................. 375/240.02
  See application file for complete search history.

(56) References Cited

U.S. PATENT DOCUMENTS

| | | | |
|---|---|---|---|
| 2015/0271524 | A1 | 9/2015 | Zhang et al. |
| 2016/0241863 | A1 | 8/2016 | Wu et al. |
| 2016/0286229 | A1 | 9/2016 | Li et al. |
| 2018/0324464 | A1 | 11/2018 | Zhang et al. |
| 2020/0280735 | A1 | 9/2020 | Lim et al. |
| 2020/0374528 | A1 | 11/2020 | Huang et al. |
| 2022/0086429 | A1* | 3/2022 | Ko ...................... H04N 19/70 |
| 2022/0167009 | A1 | 5/2022 | Bossen et al. |

FOREIGN PATENT DOCUMENTS

| | | |
|---|---|---|
| CN | 106797476 A | 5/2017 |
| JP | 2018-512810 A | 5/2018 |
| JP | 2022-533664 A | 7/2022 |
| KR | 10-2013-0030240 A | 3/2013 |
| KR | 10-2016-0064845 A | 6/2016 |
| KR | 10-2018-0098161 A | 9/2018 |
| WO | 2015/192353 A1 | 12/2015 |
| WO | 2018/062950 A1 | 4/2018 |
| WO | 2018/128380 A1 | 7/2018 |
| WO | 2018/226015 A1 | 12/2018 |
| WO | 2020/142448 A1 | 7/2020 |

OTHER PUBLICATIONS

Chen, Yi-Wen et al. (2019). "Non-CE4: Regular merge flag coding", Joint Video Experts Team (JVET) of ITU-T SG 16 WP 3 and 1S0/IEC JTC 1/SC 29/WG 11. JVET-M0231.
Chen, Yi-Wen et al. (2019). "CE4: Regular merge flag coding (CE4-1.2.a and CE4-1.2.b)", Joint Video Experts Team (JVET) of ITU-T SG 16 WP 3 and 1S0/IEC JTC 1/SC 29/WG 11. JVET-N0324.
Bross, Benjamin et al. (2019). "Versatile Video Coding (Draft 4)", Joint Video Experts Team (JVET) of ITU-T SG 16 WP 3 and 1S0/IEC JTC 1/SC 29/WG 11. JVET-M1001-v7.
Notice of Allowance for VN 1-2021-05104 by Intellectual Property Office of Vietnam dated Aug. 31, 2023.
Notice of Allowance for U.S. Appl. No. 17/423,853 by United States Patent and Trademark Office dated Jul. 21, 2023.
Corrected Notice of Allowance for U.S. Appl. No. 17/423,853 by United States Patent and Trademark Office dated Sep. 8, 2023.
International Search Report & Written Opinion of the International Searching Authority dated May 14, 2020.
Office Action for CN 202080009653.X by China National Intellectual Property Administration dated Jun. 29, 2023.
Chen, Yi-Wen et al. (2019). "Non-CE4: Regular merge flag coding", Joint Video Experts Team (JVET) of ITU-T SG 16 WP 3 and ISO/IEC JTC 1/SC 29/WG 11. 13th Meeting: Marrakech, MA, Jan. 9-18, 2019, JVET-M0231.
Extended European Search Report for EP20741489.7 by European Patent Office dated Dec. 21, 2022.
Park (LGE) N et al: "CE4-related: Harmonized conditions for CIIP and GEO", 17. JVET Meeting; Jan. 7, 2020-Jan. 17, 2020; Brussels; (The Joint Video Exploration Team of ISO/IEC JTC1/SC29/WG11 and ITU-T SG.16), No. JVET-Q0338; m51933 Jan. 14, 2020 (Jan. 14, 2020), XP030223224, Retrieved from the Internet: URL: http://phenix.int-evry.fr/jvet/doc_end_user/documents/17_Brussels/wg11/JVET-Q0338-v3.zip JVET-Q0338-r1.docx [retrieved on Jan. 14, 2020].
Written Opinion for PCT/KR2020/000964 by Korean Intellectual Property Office dated May 14, 2020.
Non-Final Office Action for IN202127033022 by Intellectual Property India dated Apr. 28, 2022.
Yi-Wen Chen et al., Non-CE4: Regular merge flag coding, JVET-M0231, Joint Video Experts Team (JVET) of ITU-T SG 16 WP 3 and ISO/IEC JTC 1/SC 29/WG 11 13th Meeting: Marrakech, MA, Jan. 9-18, 2019.
Geonjung Ko et al., Non-CE4: Modification of merge data syntax, JVET-M0359, Joint Video Experts Team (JVET) of ITU-T SG 16 WP 3 and ISO/IEC JTC 1/SC 29/WG 11 13th Meeting: Marrakech, MA, Jan. 9-18, 2019.
Geonjung Ko et al., CE4-1.3: Modification of merge data syntax, JVET-N0237, Joint Video Experts Team (JVET) of ITU-T SG 16 WP 3 and ISO/IEC JTC 1/SC 29/WG 11 14th Meeting: Geneva, CH, Mar. 19-27, 2019.
Yi-Wen Chen et al., CE4: Regular merge flag coding (CE4-1.2.a and CE4-1.2.b), JVET-N0324, Joint Video Experts Team (JVET) of ITU-T SG 16 WP 3 and ISO/IEC JTC 1/SC 29/WG 11 14th Meeting: Geneva, CH, Mar. 19-27, 2019.
"Notice of Reasons for Refusal" for JP2021-541484 by Japan Patent Office dated Sep. 15, 2022.
Han Huang, et al., Merge Modes Signaling, Joint Video Experts Team (JVET) of ITU-T SG 16 WP 3 and ISO/IEC JTC 1/SC 29/WG 11 15th Meeting: Gothenburg, SE, Jul. 3-12, 2019 , [JVET-O0249], Jun. 24, 2019, pp. 1-8, Internet<URL: https://jvet-experts.org/doc_end_user/documents/15_Gothenburg/wg11/JVET-O0249-v1.zip> <JVET-O0249.docx>.
Eiichi Sasaki, et al., Non-CE4: Syntax change of MMVD, Joint Video Experts Team (JVET) of ITU-T SG 16 WP 3 and ISO/IEC JTC 1/SC 29/WG 11 13th Meeting: Marrakech, MA, Jan. 9-18, 2019, [JVET-M0069], Dec. 28, 2018, pp. 1-6, <URL:http://phenix.it-sudparis.eu/jvet/doc_end_user/documents/13_Marrakech/ wg11/JVET-M0069-v1.zip JVET-M0069.docx.
Hearing Notice for IN 202127033022 by Intellectual Property of India dated Mar. 14, 2024.
Office Action for EP 20741489.7 by European Patent Office dated Mar. 6, 2024.
Oral Proceedings for EP 20741489.7 by European Patent Office dated Oct. 2, 2024.
Liao, Ru-Ling et al. "CE10: Triangular prediction unit mode (CE10.3.1 and CE10.3.2)," Joint Video Exploration Team (JVET) of ITU-T SG 16 WP 3 and ISO/IEC JTC 1/SC 29/WG 11. JVET-K0144-v2. Jul. 2018.
Esenlik, Semih et al. "Non-CE4: Geometrical partitioning for inter blocks," Joint Video Exploration Team (JVET) of ITU-T SG 16 WP 3 and ISO/IEC JTC 1/SC 29/WG 11. JVET-O0489-v4. Jul. 2019.

* cited by examiner

| | |
|---|---|
| coding_unit( x0, y0, cbWidth, cbHeight, treeType ) { | |
|   if( slice_type != I ) { | |
|     cu_skip_flag[ x0 ][ y0 ] | |
|     if( cu_skip_flag[ x0 ][ y0 ] == 0 ) | |
|       pred_mode_flag | |
|   } | |
|   if( CuPredMode[ x0 ][ y0 ] == MODE_INTRA ) { /* intra */ | |
|   } else { /* MODE_INTER */ | |
|     if( cu_skip_flag[ x0 ][ y0 ] == 0 ) { | |
|       merge_flag[ x0 ][ y0 ] | |
|       if( merge_flag[ x0 ][ y0 ] ) { | |
|         merge_data( x0, y0, cbWidth, cbHeight ) | |
|       } else { | S801 |
|         mmvd_flag[ x0 ][ y0 ] | |
|         if( mmvd_flag[ x0 ][ y0 ] == 1 ) { | |
|           mmvd_merge_flag[ x0 ][ y0 ] | |
|           mmvd_distance_idx[ x0 ][ y0 ] | S802 |
|           mmvd_direction_idx[ x0 ][ y0 ] | |
|         } else { | |
|         } | |
|       } | |
|     } | |
|   if( !pcm_flag[ x0 ][ y0 ] ) { | |
|     if( CuPredMode[ x0 ][ y0 ] != MODE_INTRA && cu_skip_flag[ x0 ][ y0 ] == 0 ) | S803 |
|       cu_cbf | |
|     if( cu_cbf ) | S804 |
|       transform_tree( x0, y0, cbWidth, cbHeight, treeType ) | |
|   } | |
| } | |

*FIG. 8*

| | |
|---|---|
| coding_unit( x0, y0, cbWidth, cbHeight, treeType ) { | |
|   if( slice_type != I ) { | |
|     cu_skip_flag[ x0 ][ y0 ] | |
|     if( cu_skip_flag[ x0 ][ y0 ] == 0 ) | |
|       pred_mode_flag | |
|   } | |
|   if( CuPredMode[ x0 ][ y0 ] == MODE_INTRA ) { /* intra */ | |
|   } else { /* MODE_INTER */ | |
|     if( cu_skip_flag[ x0 ][ y0 ] == 0 ) { | |
|       merge_flag[ x0 ][ y0 ] | |
|       if( merge_flag[ x0 ][ y0 ] ) { | |
|         merge_data( x0, y0, cbWidth, cbHeight ) | |
|       } else { | |
|         mmvd_flag[ x0 ][ y0 ] | |
|         if( mmvd_flag[ x0 ][ y0 ] == 1 ) { | |
|           mmvd_merge_flag[ x0 ][ y0 ] | |
|           mmvd_distance_idx[ x0 ][ y0 ] | |
|           mmvd_direction_idx[ x0 ][ y0 ] | |
|         } else { /* AMVP, affine Inter, etc. */ | |
|         } | |
|       } | |
|     } | |
|   if( !pcm_flag[ x0 ][ y0 ] ) { | |
|     if( CuPredMode[ x0 ][ y0 ] != MODE_INTRA && cu_skip_flag[ x0 ][ y0 ] == 0 && mmvd_flag[ x0 ][ y0 ] == 0 ) | S901 |
|       cu_cbf | |
|     if( cu_cbf ) | |
|       transform_tree( x0, y0, cbWidth, cbHeight, treeType ) | |
|   } | |
| } | |

| Signaled Modes | Regular Flag | MMVD Flag | Subblock Flag | CIIP Flag |
|---|---|---|---|---|
| Regular | 1 | - | - | - |
| MMVD | 0 | 1 | - | - |
| Subblock | 0 | 0 | 1 | - |
| CIIP | 0 | 0 | 0 | 1 |
| Triangle | 0 | 0 | 0 | 0 |

(b)

| Signaled Modes | Regular Flag | MMVD Flag | Subblock Flag |
|---|---|---|---|
| Regular | 1 | - | - |
| MMVD | 0 | 1 | - |
| Subblock | 0 | 0 | 1 |
| Triangle | 0 | 0 | 0 |

*FIG. 10*

| | |
|---|---|
| merge_data( x0, y0, cbWidth, cbHeight ) { | |
|   regular_merge_flag[ x0 ][ y0 ] | S1101 |
|   if( !(cbWidth = = 4 && cbHeight = = 4 ) && !(cbWidth = = 8 && cbHeight = = 4 )<br>  && !(cbWidth = = 4 && cbHeight = = 8 ) && !regular_merge_flag[ x0 ][ y0 ])<br>  { | S1102 |
|   mmvd_flag[ x0 ][ y0 ]<br>  if( mmvd_flag[ x0 ][ y0 ] = = 1 ) {<br>  ...<br>  } else { | |
|     if( MaxNumSubblockMergeCand > 0 && cbWidth >= 8 && cbHeight >= 8 )<br>      merge_subblock_flag[ x0 ][ y0 ]<br>    if( merge_subblock_flag[ x0 ][ y0 ] = = 1 ) {<br>      if( MaxNumSubblockMergeCand > 1 )<br>        merge_subblock_idx[ x0 ][ y0 ] | S1103 |
|     } else {<br>      if( sps_mh_intra_enabled_flag && cu_skip_flag[ x0 ][ y0 ] = = 0 &&<br>      ( cbWidth * cbHeight ) >= 64 && cbWidth < 128 && cbHeight < 128 ) {<br>      mh_intra_flag[ x0 ][ y0 ]<br>      if( mh_intra_flag[ x0 ][ y0 ] ) {<br>        ...<br>      }<br>    } | S1104 |
|     merge_triangle_flag[ x0 ][ y0 ] =<br>      !regular_merge_flag[ x0 ][ y0 ] && !mmvd_flag[ x0 ][ y0 ]<br>      && !merge_subblock_flag[ x0 ][ y0 ] && !mh_intra_flag[ x0 ][ y0 ]<br>    if( merge_triangle_flag[ x0 ][ y0 ] )<br>      merge_triangle_idx[ x0 ][ y0 ]<br>    else if( MaxNumMergeCand > 1 )<br>      merge_idx[ x0 ][ y0 ]<br>  } | S1105 |

*FIG. 11*

| | |
|---|---|
| merge_data( x0, y0, cbWidth, cbHeight ) { | |
|   regular_merge_flag[ x0 ][ y0 ] | S1201 |
|   if( regular_merge_flag[ x0 ][ y0 ] && MaxNumMergeCand > 1) | |
|     merge_idx[ x0 ][ y0 ] | |
|   if( !regular_merge_flag[ x0 ][ y0 ] ) | |
|   { | |
|     mmvd_flag[ x0 ][ y0 ] | |
|     if( mmvd_flag[ x0 ][ y0 ] == 1 ) { | |
|     ... | |
|     } else if ( mmvd_flag[ x0 ][ y0 ] == 0 ) { | |
|       if( MaxNumSubblockMergeCand > 0 && cbWidth >= 8 && cbHeight >= 8 ) | |
|         merge_subblock_flag[ x0 ][ y0 ] | |
|       if( merge_subblock_flag[ x0 ][ y0 ] == 1 ) { | |
|         if( MaxNumSubblockMergeCand > 1 ) | |
|           merge_subblock_idx[ x0 ][ y0 ] | |
|       } else { | |
|         if( sps_mh_intra_enabled_flag && cu_skip_flag[ x0 ][ y0 ] == 0 && | |
|           ( cbWidth * cbHeight ) >= 64 && cbWidth < 128 && cbHeight < 128 ) { | |
|           mh_intra_flag[ x0 ][ y0 ] | |
|           if( mh_intra_flag[ x0 ][ y0 ] ) { | |
|             if ( cbWidth <= 2 * cbHeight \|\| cbHeight <= 2 * cbWidth ) | |
|               mh_intra_luma_mpm_flag[ x0 ][ y0 ] | |
|             if( mh_intra_luma_mpm_flag[ x0 ][ y0 ] ) | |
|               mh_intra_luma_mpm_idx[ x0 ][ y0 ] | |
|           } | |
|         } | |
|         if( merge_triangle_flag[ x0 ][ y0 ] ) { | |
|           merge_triangle_idx[ x0 ][ y0 ] | |
|         } | |

*FIG. 12*

| | |
|---|---|
| merge_data( x0, y0, cbWidth, cbHeight ) { | |
|   regular_merge_flag[ x0 ][ y0 ] | |
|   if( regular_merge_flag[ x0 ][ y0 ] && MaxNumMergeCand > 1) | |
|     merge_idx[ x0 ][ y0 ] | |
|   if( !regular_merge_flag[ x0 ][ y0 ] ) | |
|   { | |
|     if( merge_subblock_conditions \|\| mh_intra_conditions \|\| merge_triangle_conditions ) | S1301 |
|       mmvd_flag[ x0 ][ y0 ] | |
|     if( mmvd_flag[ x0 ][ y0 ] == 1 ) { | |
|     ... | |
|     } else if ( mmvd_flag[ x0 ][ y0 ] == 0 ) { | |
|       if( MaxNumSubblockMergeCand > 0 && cbWidth >= 8 && cbHeight >= 8 | |
|       && (mh_intra_conditions \|\| merge_triangle_conditions) ) | |
|         merge_subblock_flag[ x0 ][ y0 ] | |
|       if( merge_subblock_flag[ x0 ][ y0 ] == 1 ) { | |
|         if( MaxNumSubblockMergeCand > 1 ) | |
|           merge_subblock_idx[ x0 ][ y0 ] | |
|       } else { | |
|         if( sps_mh_intra_enabled_flag && cu_skip_flag[ x0 ][ y0 ] == 0 && | |
|         ( cbWidth * cbHeight ) >= 64 && cbWidth < 128 && cbHeight < 128 ) { | |
|           mh_intra_flag[ x0 ][ y0 ] | |
|           if( mh_intra_flag[ x0 ][ y0 ] ) { | |
|             ... | |
|           } | |
|         } | |
|         if( merge_triangle_flag[ x0 ][ y0 ] ) { | |
|           merge_triangle_idx[ x0 ][ y0 ] | |
|         } | |

*FIG. 13*

| | |
|---|---|
| merge_data( x0, y0, cbWidth, cbHeight ) { | |
|   if ( CuPredMode[ x0 ][ y0 ] = = MODE_IBC ) { | |
|     if( MaxNumMergeCand > 1 ) | |
|       merge_idx[ x0 ][ y0 ] | S1401 |
|   } else { | |
|   regular_merge_flag[ x0 ][ y0 ] | |
|   if( regular_merge_flag[ x0 ][ y0 ] && MaxNumMergeCand > 1) | |
|     merge_idx[ x0 ][ y0 ] | |
|   if( !regular_merge_flag[ x0 ][ y0 ] && !(cbWidth == 8 && cbHeight == 4) && !(cbWidth == 4 && cbHeight == 8) ) | |
|   { | S1402 |
|     if( sps_mmvd_enabled_flag ) | |
|       mmvd_flag[ x0 ][ y0 ] | |
|     if( mmvd_flag[ x0 ][ y0 ] = = 1 ) { | |
|       ... | |
|     } else if ( mmvd_flag[ x0 ][ y0 ] == 0 ) { | |
|       if( MaxNumSubblockMergeCand > 0 && cbWidth >= 8 && cbHeight >= 8 ) | S1403 |
|         merge_subblock_flag[ x0 ][ y0 ] | |
|       if( merge_subblock_flag[ x0 ][ y0 ] = = 1 ) { | |
|         if( MaxNumSubblockMergeCand > 1 ) | |
|           merge_subblock_idx[ x0 ][ y0 ] | |
|       } else { | |
|         if( sps_mh_intra_enabled_flag && cu_skip_flag[ x0 ][ y0 ] = = 0 && | |
|           ( cbHeight * cbWidth ) >= 64 && cbWidth < 128 && cbHeight < 128 ) { | S1404 |
|           mh_intra_flag[ x0 ][ y0 ] | |
|         if( mh_intra_flag[ x0 ][ y0 ] ) { | |
|           ... | |
|         } | |
|       } | |
|       if( merge_triangle_flag[ x0 ][ y0 ] ) { | |
|         merge_triangle_split_dir[ x0 ][ y0 ] | |
|         merge_triangle_idx0[ x0 ][ y0 ] | |
|         merge_triangle_idx1[ x0 ][ y0 ] | |
|       } | |
|     } | |

*FIG. 14*

| | |
|---|---|
| merge_data( x0, y0, cbWidth, cbHeight ) { | |
|   if ( CuPredMode[ x0 ][ y0 ] == MODE_IBC ) { // ... | |
|   } else { | |
|     if( sps_mmvd_enabled_flag || cbWidth + cbHeight > 12) ) | S1501 |
|       regular_merge_flag[ x0 ][ y0 ] | |
|     if( regular_merge_flag[ x0 ][ y0 ] && MaxNumMergeCand > 1) | |
|       merge_idx[ x0 ][ y0 ] | |
|     if( !regular_merge_flag[ x0 ][ y0 ] && !(cbWidth == 8 && cbHeight == 4) && !(cbWidth == 4 && cbHeight == 8) ) | |
|     { | |
|       if( sps_mmvd_enabled_flag ) | |
|         mmvd_flag[ x0 ][ y0 ] | |
|       if( mmvd_flag[ x0 ][ y0 ] == 1 ) { | |
|         ... | |
|       } else if ( mmvd_flag[ x0 ][ y0 ] == 0 ) { | |
|         if( MaxNumSubblockMergeCand > 0 && cbWidth >= 8 && cbHeight >= 8 ) | |
|           merge_subblock_flag[ x0 ][ y0 ] | |
|         if( merge_subblock_flag[ x0 ][ y0 ] == 1 ) { | |
|           if( MaxNumSubblockMergeCand > 1 ) | |
|             merge_subblock_idx[ x0 ][ y0 ] | |
|         } else { | |
|           if( sps_mh_intra_enabled_flag && cu_skip_flag[ x0 ][ y0 ] == 0 && | |
|             ( cbWidth * cbHeight ) >= 64 && cbWidth < 128 && cbHeight < 128 ) { | |
|             mh_intra_flag[ x0 ][ y0 ] | |
|             if( mh_intra_flag[ x0 ][ y0 ] ) { | |
|               .... | |
|             } | |
|           } | |
|           if( merge_triangle_flag[ x0 ][ y0 ] ) { | |
|             merge_triangle_split_dir[ x0 ][ y0 ] | |
|             merge_triangle_idx0[ x0 ][ y0 ] | |
|             merge_triangle_idx1[ x0 ][ y0 ] | |
|           } | |

*FIG. 15*

```
merge_data( x0, y0, cbWidth, cbHeight ) {
    if ( CuPredMode[ x0 ][ y0 ] = = MODE_IBC ) {
        if( MaxNumMergeCand > 1 )
            merge_idx[ x0 ][ y0 ]
    } else {
        regular_merge_flag[ x0 ][ y0 ]
        if( regular_merge_flag[ x0 ][ y0 ] && MaxNumMergeCand > 1)
            merge_idx[ x0 ][ y0 ]
        if( !regular_merge_flag[ x0 ][ y0 ] && !(cbWidth == 8 && cbHeight == 4) && !(cbWidth == 4 && cbHeight == 8) )
        {
            if( sps_mmvd_enabled_flag )
                mmvd_flag[ x0 ][ y0 ]
            if( mmvd_flag[ x0 ][ y0 ] = = 1 ) {
                ...
            } else if ( mmvd_flag[ x0 ][ y0 ] == 0 ) {
                if( MaxNumSubblockMergeCand > 0 && cbWidth >= 8 && cbHeight >= 8 )
                    merge_subblock_flag[ x0 ][ y0 ]
                if( merge_subblock_flag[ x0 ][ y0 ] = = 1 ) {
                    if( MaxNumSubblockMergeCand > 1 )
                        merge_subblock_idx[ x0 ][ y0 ]
                } else {
                    if( sps_triangle_enabled_flag && tile_group_type = = B && cbWidth * cbHeight >= 64 )
                        merge_triangle_flag[ x0 ][ y0 ]
                    if( merge_triangle_flag[ x0 ][ y0 ] ) {
                        ...
                    } else {
                        if( ciip_flag[ x0 ][ y0 ] ) {
                            // CIIP related syntax elements
                            if( MaxNumMergeCand > 1 )
                                merge_idx[ x0 ][ y0 ]
                        }
                    }
                }
            }
        }
    }
}
```

*FIG. 16*

| | |
|---|---|
| merge_data( x0, y0, cbWidth, cbHeight ) { | |
|   if ( CuPredMode[ x0 ][ y0 ] = = MODE_IBC ) { | |
|   ... | |
| | |
|   } else { | |
|     regular_merge_flag[ x0 ][ y0 ] | |
|     if( regular_merge_flag[ x0 ][ y0 ] && MaxNumMergeCand > 1 ) | |
|       merge_idx[ x0 ][ y0 ] | |
|     if( !regular_merge_flag[ x0 ][ y0 ] && !(cbWidth == 8 && cbHeight == 4) && !(cbWidth == 4 && cbHeight == 8) ) | |
|     { | |
|       if( sps_mmvd_enabled_flag ) | |
|         mmvd_flag[ x0 ][ y0 ] | |
|       if( mmvd_flag[ x0 ][ y0 ] = = 1 ) { | |
|         ... | |
|       } else if ( mmvd_flag[ x0 ][ y0 ] == 0 ) { | |
|         if( MaxNumSubblockMergeCand > 0 && cbWidth >= 8 && cbHeight >= 8 ) | |
|           merge_subblock_flag[ x0 ][ y0 ] | |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | |
|         } else { | |
|           if( sps_triangle_enabled_flag && tile_group_type = = B && cbWidth * cbHeight >= 64 | |
|           && sps_ciip_enabled_flag && cu_skip_flag[ x0 ][ y0 ] = = 0 && cbWidth < 128 && cbHeight < 128 ) | |
|             merge_triangle_flag[ x0 ][ y0 ] | |
|           if( merge_triangle_flag[ x0 ][ y0 ] ) { | |
|             .... | |
|           } else { | |
|             if( ciip_flag[ x0 ][ y0 ] ) { | |
|               // CIIP related syntax elements | |
|               if( MaxNumMergeCand > 1 ) | |
|                 merge_idx[ x0 ][ y0 ] | |
|             } | |
|           } | |

FIG. 17

| | |
|---|---|
| merge_data( x0, y0, cbWidth, cbHeight ) { | |
|   if ( CuPredMode[ x0 ][ y0 ] == MODE_IBC ) { | |
|     if( MaxNumMergeCand > 1 ) | |
|       merge_idx[ x0 ][ y0 ] | |
|   } else { | |
|     regular_merge_flag[ x0 ][ y0 ] | |
|     if( regular_merge_flag[ x0 ][ y0 ] && MaxNumMergeCand > 1) | |
|       merge_idx[ x0 ][ y0 ] | |
|     if( !regular_merge_flag[ x0 ][ y0 ] && !(cbWidth == 8 && cbHeight == 4) && !(cbWidth == 4 && cbHeight == 8) ) | |
|     { | |
|       if( sps_mmvd_enabled_flag ) | |
|         mmvd_flag[ x0 ][ y0 ] | |
|       if( mmvd_flag[ x0 ][ y0 ] == 1 ) { | |
|         ... | |
|       } else if ( mmvd_flag[ x0 ][ y0 ] == 0 ) { | |
|         if( MaxNumSubblockMergeCand > 0 && cbWidth >= 8 && cbHeight >= 8 ) | |
|           merge_subblock_flag[ x0 ][ y0 ] | |
|         if( merge_subblock_flag[ x0 ][ y0 ] == 1 ) { | |
|           if( MaxNumSubblockMergeCand > 1 ) | |
|             merge_subblock_idx[ x0 ][ y0 ] | |
|         } else { | |
|           if( sps_triangle_enabled_flag && tile_group_type == B && cbWidth * cbHeight >= 64 && cu_skip_flag[ x0 ][ y0 ] == 0 && cbWidth < 128 && cbHeight < 128 ) | |
|             merge_triangle_flag[ x0 ][ y0 ] | |
|           if( merge_triangle_flag[ x0 ][ y0 ] ) { | |
|             ... | |
|           } else { | |
|             if( ciip_flag[ x0 ][ y0 ] ) { | |
|               // CIIP related syntax elements | |
|               if( MaxNumMergeCand > 1 ) | |
|                 merge_idx[ x0 ][ y0 ] | |
|             } | |
|           } | |

*FIG. 18*

| | |
|---|---|
| merge_data( x0, y0, cbWidth, cbHeight ) { | |
|   if ( CuPredMode[ x0 ][ y0 ] == MODE_IBC ) { | |
|     if( MaxNumMergeCand > 1 ) | |
|       merge_idx[ x0 ][ y0 ] | |
|   } else { | |
|     regular_merge_flag[ x0 ][ y0 ] | |
|     if( regular_merge_flag[ x0 ][ y0 ] && MaxNumMergeCand > 1) | |
|       merge_idx[ x0 ][ y0 ] | |
|     if( !regular_merge_flag[ x0 ][ y0 ] && !(cbWidth == 8 && cbHeight == 4) && !(cbWidth == 4 && cbHeight == 8) ) | |
|     { | |
|       if( sps_mmvd_enabled_flag ) | |
|         mmvd_flag[ x0 ][ y0 ] | |
|       if( mmvd_flag[ x0 ][ y0 ] == 1 ) { | |
|         ... | |
|       } else if ( mmvd_flag[ x0 ][ y0 ] == 0 ) { | |
|         if( MaxNumSubblockMergeCand > 0 && cbWidth >= 8 && cbHeight >= 8 ) | |
|           merge_subblock_flag[ x0 ][ y0 ] | |
|         if( merge_subblock_flag[ x0 ][ y0 ] == 1 ) { | |
|           if( MaxNumSubblockMergeCand > 1 ) | |
|             merge_subblock_idx[ x0 ][ y0 ] | |
|         } else { | |
|           if( sps_triangle_enabled_flag && tile_group_type == B && cbWidth * cbHeight >= 64 && cu_skip_flag[ x0 ][ y0 ] == 0 ) | |
|             merge_triangle_flag[ x0 ][ y0 ] | |
|           if( merge_triangle_flag[ x0 ][ y0 ] ) { | |
|             ... | |
|           } else { | |
|             if( ciip_flag[ x0 ][ y0 ] ) { | |
|               // CIIP related syntax elements | |
|               if( MaxNumMergeCand > 1 ) | |
|                 merge_idx[ x0 ][ y0 ] | |
|             } | |
|           } | |

*FIG. 19*

```
merge_data( x0, y0, cbWidth, cbHeight ) {
  if ( CuPredMode[ x0 ][ y0 ] == MODE_IBC ) {
    if( MaxNumMergeCand > 1 )
      merge_idx[ x0 ][ y0 ]
  } else {
    if( sps_mmvd_enabled_flag || cbWidth * cbHeight != 32 )
      regular_merge_flag[ x0 ][ y0 ]
    if ( regular_merge_flag[ x0 ][ y0 ] == 1 ){
      if( MaxNumMergeCand > 1 )
        merge_idx[ x0 ][ y0 ]
    } else {
      if( sps_mmvd_enabled_flag && cbWidth * cbHeight != 32 )
        mmvd_merge_flag[ x0 ][ y0 ]
      if( mmvd_merge_flag[ x0 ][ y0 ] == 1 ) {
        ....
      } else {
        if( sps_ciip_enabled_flag && cu_skip_flag[ x0 ][ y0 ] == 0 &&
          ( cbWidth * cbHeight ) >= 64 && cbWidth < 128 && cbHeight < 128 ) {
          ciip_flag[ x0 ][ y0 ]
          if( ciip_flag[ x0 ][ y0 ] && MaxNumMergeCand > 1 )
            merge_idx[ x0 ][ y0 ]
        }
        if( ciip_flag[ x0 ][ y0 ] == 0 ) {
          if( MaxNumTriangleMergeCand >= 2 && sps_triangle_enabled_flag && slice_type == B
            && cbWidth * cbHeight >= 64 )
            merge_triangle_flag[ x0 ][ y0 ]
          if( merge_triangle_flag[ x0 ][ y0 ] ) {
            ...
          } else {
            if( merge_subblock_flag[ x0 ][ y0 ] == 1 ) {
              if( MaxNumSubblockMergeCand > 1 )
                merge_subblock_idx[ x0 ][ y0 ]
            }
          }
        }
```

*FIG. 20*

```
merge_data( x0, y0, cbWidth, cbHeight ) {
  if ( CuPredMode[ x0 ][ y0 ] == MODE_IBC ) {
    ...
  } else {
    if( sps_mmvd_enabled_flag || cbWidth * cbHeight != 32 )
      regular_merge_flag[ x0 ][ y0 ]
    if ( regular_merge_flag[ x0 ][ y0 ] == 1 ){
      if( MaxNumMergeCand > 1 )
        merge_idx[ x0 ][ y0 ]
    } else {
      if( sps_mmvd_enabled_flag && cbWidth * cbHeight != 32 )
        mmvd_merge_flag[ x0 ][ y0 ]
      if( mmvd_merge_flag[ x0 ][ y0 ] == 1 ) {
        ...
      } else {
        if( sps_ciip_enabled_flag && cu_skip_flag[ x0 ][ y0 ] == 0 &&
          ( cbWidth * cbHeight ) >= 64 && cbWidth < 128 && cbHeight < 128 ) {
          ciip_flag[ x0 ][ y0 ]
          if( ciip_flag[ x0 ][ y0 ] && MaxNumMergeCand > 1 )
            merge_idx[ x0 ][ y0 ]
        }
        if( ciip_flag[ x0 ][ y0 ] == 0 ) {
          if( MaxNumTriangleMergeCand >= 2 && sps_triangle_enabled_flag && slice_type == B
            && cbWidth * cbHeight >= 64
            && MaxNumSubblockMergeCand > 0 && cbWidth >= 8 && cbHeight >= 8 )
            merge_triangle_flag[ x0 ][ y0 ]
          if( merge_triangle_flag[ x0 ][ y0 ] ) {
            ...
          } else {
            if( merge_subblock_flag[ x0 ][ y0 ] == 1 ) {
              if( MaxNumSubblockMergeCand > 1 )
                merge_subblock_idx[ x0 ][ y0 ]
            }
          }
        }
```

*FIG. 21*

```
merge_data( x0, y0, cbWidth, cbHeight ) {
    if ( CuPredMode[ x0 ][ y0 ] = = MODE_IBC ) {
        ...
    } else {
        if( sps_mmvd_enabled_flag || cbWidth * cbHeight != 32 )
            regular_merge_flag[ x0 ][ y0 ]
        if ( regular_merge_flag[ x0 ][ y0 ] = = 1 ){
            if( MaxNumMergeCand > 1 )
                merge_idx[ x0 ][ y0 ]
        } else {
            if( sps_mmvd_enabled_flag && cbWidth * cbHeight != 32 )
                mmvd_merge_flag[ x0 ][ y0 ]
            if( mmvd_merge_flag[ x0 ][ y0 ] = = 1 ) {
                ...
            } else {
                if( MaxNumTriangleMergeCand >= 2 && sps_triangle_enabled_flag && slice_type = = B
                    && cbWidth * cbHeight >= 64
                    && ( (MaxNumSubblockMergeCand > 0 && cbWidth >= 8 && cbHeight >= 8 )
                    || (sps_ciip_enabled_flag && cu_skip_flag[ x0 ][ y0 ] = = 0 &&
                        ( cbWidth * cbHeight ) >= 64 && cbWidth < 128 && cbHeight < 128 )))
                    merge_triangle_flag[ x0 ][ y0 ]
                if( merge_triangle_flag[ x0 ][ y0 ] ) {
                    ...
                } else {
                    if( MaxNumSubblockMergeCand > 0 && cbWidth >= 8 && cbHeight >= 8
                        && sps_ciip_enabled_flag && cu_skip_flag[ x0 ][ y0 ] = = 0 &&
                        ( cbWidth * cbHeight ) >= 64 && cbWidth < 128 && cbHeight < 128 )
                        merge_subblock_flag[ x0 ][ y0 ]
                    if( merge_subblock_flag[ x0 ][ y0 ] = = 1 ) {
                        ...
                    } else {
                        if( ciip_flag[ x0 ][ y0 ] && MaxNumMergeCand > 1 )
                            merge_idx[ x0 ][ y0 ]
                    }
```

*FIG. 22*

| | |
|---|---|
| merge_data( x0, y0, cbWidth, cbHeight ) { | |
|   if ( CuPredMode[ x0 ][ y0 ] = = MODE_IBC ) { | |
|     ... | |
|   } else { | |
|     if( sps_mmvd_enabled_flag \|\| cbWidth * cbHeight != 32 ) | |
|       regular_merge_flag[ x0 ][ y0 ] | |
|     if ( regular_merge_flag[ x0 ][ y0 ] = = 1 ){ | |
|       if( MaxNumMergeCand > 1 ) | |
|         merge_idx[ x0 ][ y0 ] | |
|     } else { | |
|       if( sps_mmvd_enabled_flag && cbWidth * cbHeight != 32 ) | |
|         mmvd_merge_flag[ x0 ][ y0 ] | |
|       if( mmvd_merge_flag[ x0 ][ y0 ] = = 1 ) { | |
|         ... | |
|       } else { | |
|         if( MaxNumTriangleMergeCand >= 2 && sps_triangle_enabled_flag && slice_type = = B | |
|           && cbWidth * cbHeight >= 64 | |
|           && ( (MaxNumSubblockMergeCand > 0 && cbWidth >= 8 && cbHeight >= 8 ) | |
|           \|\| (sps_ciip_enabled_flag && cu_skip_flag[ x0 ][ y0 ] = = 0 && | |
|             ( cbWidth * cbHeight ) >= 64 && cbWidth < 128 && cbHeight < 128 ) ) ) | |
|           merge_triangle_flag[ x0 ][ y0 ] | |
|         if( merge_triangle_flag[ x0 ][ y0 ] ) { | |
|           ... | |
|         } else { | |
|           if( sps_ciip_enabled_flag && cu_skip_flag[ x0 ][ y0 ] = = 0 && | |
|             ( cbWidth * cbHeight ) >= 64 && cbWidth < 128 && cbHeight < 128 | |
|             && MaxNumSubblockMergeCand > 0 && cbWidth >= 8 && cbHeight >= 8 ) { | |
|             ciip_flag[ x0 ][ y0 ] | |
|             if( ciip_flag[ x0 ][ y0 ] && MaxNumMergeCand > 1 ) | |
|               merge_idx[ x0 ][ y0 ] | |
|           } | |
|           if( ciip_flag[ x0 ][ y0 ] == 0 ) { | |
|             if( merge_subblock_flag[ x0 ][ y0 ] = = 1 ) { | |
|               if( MaxNumSubblockMergeCand > 1 ) | |
|                 merge_subblock_idx[ x0 ][ y0 ] | |
|             } | |
|           } | |

*FIG. 23*

| | |
|---|---|
| merge_data( x0, y0, cbWidth, cbHeight ) { | |
|   if ( CuPredMode[ x0 ][ y0 ] == MODE_IBC ) { | |
|     ... | |
|   } else { | |
|     if( sps_mmvd_enabled_flag \|\| cbWidth * cbHeight != 32 ) | |
|       regular_merge_flag[ x0 ][ y0 ] | |
|     if ( regular_merge_flag[ x0 ][ y0 ] == 1 ){ | |
|       if( MaxNumMergeCand > 1 ) | |
|         merge_idx[ x0 ][ y0 ] | |
|     } else { | |
|       if( sps_mmvd_enabled_flag && cbWidth * cbHeight != 32 ) | |
|         mmvd_merge_flag[ x0 ][ y0 ] | |
|       if( mmvd_merge_flag[ x0 ][ y0 ] == 1 ) { | |
|         ... | |
|       } else { | |
|         if( MaxNumSubblockMergeCand > 0 && cbWidth >= 8 && cbHeight >= 8 ) | |
|           merge_subblock_flag[ x0 ][ y0 ] | |
|         if( merge_subblock_flag[ x0 ][ y0 ] == 1 ) { | |
|           if( MaxNumSubblockMergeCand > 1 ) | |
|             merge_subblock_idx[ x0 ][ y0 ] | |
|         } else { | |
|           if( MaxNumTriangleMergeCand >= 2 && sps_triangle_enabled_flag && slice_type == B<br>            && cbWidth * cbHeight >= 64 && sps_ciip_enabled_flag && cu_skip_flag[ x0 ][ y0 ] == 0 && cbWidth < 128 && cbHeight < 128 ) | |
|             merge_triangle_flag[ x0 ][ y0 ] | |
|           if( merge_triangle_flag[ x0 ][ y0 ] ) { | |
|             ... | |
|           } else { | |
|             if( ciip_flag[ x0 ][ y0 ] && MaxNumMergeCand > 1 ) | |
|               merge_idx[ x0 ][ y0 ] | |
|             } | |
|         } | |

*FIG. 24*

| | |
|---|---|
| merge_data( x0, y0, cbWidth, cbHeight ) { | |
|   if ( CuPredMode[ x0 ][ y0 ] == MODE_IBC ) { | |
|     ... | |
|   } else { | |
|     if( sps_mmvd_enabled_flag \|\| cbWidth * cbHeight != 32 ) | 2501 |
|       regular_merge_flag[ x0 ][ y0 ] | |
|     if ( regular_merge_flag[ x0 ][ y0 ] == 1 ){ | |
|       if( MaxNumMergeCand > 1 ) | |
|         merge_idx[ x0 ][ y0 ] | |
|     } else { | |
|       if( sps_mmvd_enabled_flag && cbWidth * cbHeight != 32 ) | 2502 |
|         mmvd_merge_flag[ x0 ][ y0 ] | |
|       if( mmvd_merge_flag[ x0 ][ y0 ] == 1 ) { | |
|         ... | |
|       } else { | |
|         if( MaxNumSubblockMergeCand > 0 && cbWidth >= 8 && cbHeight >= 8 ) | 2503 |
|           merge_subblock_flag[ x0 ][ y0 ] | |
|         if( merge_subblock_flag[ x0 ][ y0 ] == 1 ) { | |
|           if( MaxNumSubblockMergeCand > 1 ) | |
|             merge_subblock_idx[ x0 ][ y0 ] | |
|         } else { | |
|           if( sps_ciip_enabled_flag && cu_skip_flag[ x0 ][ y0 ] == 0 && | 2504 |
|             ( cbWidth * cbHeight ) >= 64 && cbWidth < 128 && cbHeight < 128 ) { | |
|             ciip_flag[ x0 ][ y0 ] | |
|           if( ciip_flag[ x0 ][ y0 ] && MaxNumMergeCand > 1 ) | |
|             merge_idx[ x0 ][ y0 ] | |
|           } | |
|           if( MergeTriangleFlag[ x0 ][ y0 ] ) { | 2505 |
|             merge_triangle_split_dir[ x0 ][ y0 ] | |
|             merge_triangle_idx0[ x0 ][ y0 ] | |
|             merge_triangle_idx1[ x0 ][ y0 ] | |
|           } | |
|         } | |
|       } | |

*FIG. 25*

| | |
|---|---|
| merge_data( x0, y0, cbWidth, cbHeight ) { | |
| ... | |
| if( ( sps_mmvd_enabled_flag \|\| cbWidth * cbHeight != 32 )<br>&& ( mmvd_condition \|\| subblock_merge_condition \|\| ciip_condition \|\| triangle_merge_condition ) ) | 2601 |
|     regular_merge_flag[ x0 ][ y0 ] | |
| if ( regular_merge_flag[ x0 ][ y0 ] = = 1 ){ | |
|   if( MaxNumMergeCand > 1 ) | |
|     merge_idx[ x0 ][ y0 ] | |
| } else { | |
|   if( sps_mmvd_enabled_flag && cbWidth * cbHeight != 32<br>&& ( subblock_merge_condition \|\| ciip_condition \|\| triangle_merge_condition ) ) | 2602 |
|     mmvd_merge_flag[ x0 ][ y0 ] | |
|   if( mmvd_merge_flag[ x0 ][ y0 ] = = 1 ) { | |
|     ... | |
|   } else { | |
|     if( MaxNumSubblockMergeCand > 0 && cbWidth >= 8 && cbHeight >= 8<br>&& ( ciip_condition \|\| triangle_merge_condition ) ) | 2603 |
|       merge_subblock_flag[ x0 ][ y0 ] | |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | |
|     } else { | |
|       if( sps_ciip_enabled_flag && cu_skip_flag[ x0 ][ y0 ] = = 0 &&<br>( cbWidth * cbHeight ) >= 64 && cbWidth < 128 && cbHeight < 128<br>&& triangle_merge_condition ) { | 2604 |
|         ciip_flag[ x0 ][ y0 ] | |
|         if( ciip_flag[ x0 ][ y0 ] && MaxNumMergeCand > 1 ) | |
|           merge_idx[ x0 ][ y0 ] | |
|       } | |
|       if( MergeTriangleFlag[ x0 ][ y0 ] ) { | 2605 |
|         ... | |
|       } | |
|     } | |

*FIG. 26*

| | |
|---|---|
| merge_data( x0, y0, cbWidth, cbHeight ) { | |
| ... | |
| if( ( sps_mmvd_enabled_flag \|\| cbWidth * cbHeight != 32 )<br>&& ( sps_mmvd_enabled_flag \|\| (sps_triangle_enabled_flag && slice_type == B && MaxNumTriangleMergeCand >= 2 && ( cbWidth * cbHeight ) >= 64 )<br>  \|\| (sps_ciip_enabled_flag && cu_skip_flag[ x0 ][ y0 ] == 0 && cbWidth < 128 && cbHeight < 128 && ( cbWidth * cbHeight ) >= 64 )<br>  \|\| ( MaxNumSubblockMergeCand > 0 && cbWidth >= 8 && cbHeight >= 8 ) ) )<br>    regular_merge_flag[ x0 ][ y0 ] | 2701 |
| if ( regular_merge_flag[ x0 ][ y0 ] == 1 ){ | |
|   if( MaxNumMergeCand > 1 ) | |
|     merge_idx[ x0 ][ y0 ] | |
| } else { | |
| if( sps_mmvd_enabled_flag && cbWidth * cbHeight != 32<br>&& ( (sps_triangle_enabled_flag && slice_type == B && MaxNumTriangleMergeCand >= 2 && ( cbWidth * cbHeight ) >= 64 )<br>  \|\| (sps_ciip_enabled_flag && cu_skip_flag[ x0 ][ y0 ] == 0 && cbWidth < 128 && cbHeight < 128 && ( cbWidth * cbHeight ) >= 64 )<br>  \|\| ( MaxNumSubblockMergeCand > 0 && cbWidth >= 8 && cbHeight >= 8 ) ) ) | 2702 |
|   mmvd_merge_flag[ x0 ][ y0 ] | |
|   if( mmvd_merge_flag[ x0 ][ y0 ] == 1 ) { | |
|   ... | |
|   } else { | |
|     if( MaxNumSubblockMergeCand > 0 && cbWidth >= 8 && cbHeight >= 8<br>     && ( (sps_triangle_enabled_flag && slice_type == B && MaxNumTriangleMergeCand >= 2)<br>       \|\| (sps_ciip_enabled_flag && cu_skip_flag[ x0 ][ y0 ] == 0 && cbWidth < 128 && cbHeight < 128 ) ) ) | 2703 |
|       merge_subblock_flag[ x0 ][ y0 ] | |
|   ... | |
|   } else { | |
|     if( sps_ciip_enabled_flag && cu_skip_flag[ x0 ][ y0 ] == 0 &&<br>     ( cbWidth * cbHeight ) >= 64 && cbWidth < 128 && cbHeight < 128<br>     && sps_triangle_enabled_flag && slice_type == B && MaxNumTriangleMergeCand >= 2 ) { | 2704 |
|       ciip_flag[ x0 ][ y0 ] | |
|       if( ciip_flag[ x0 ][ y0 ] && MaxNumMergeCand > 1 ) | |
|         merge_idx[ x0 ][ y0 ] | |
|     } | |
|     if( MergeTriangleFlag[ x0 ][ y0 ] ) { | 2705 |
|     ... | |
|     } | |
|   } | |

FIG. 27

| | |
|---|---|
| merge_data( x0, y0, cbWidth, cbHeight ) { | |
| ... | |
| if( ( sps_mmvd_enabled_flag \|\| cbWidth * cbHeight != 32 ) | 2801 |
| && ( sps_mmvd_enabled_flag \|\| (sps_triangle_enabled_flag && slice_type == B && MaxNumTriangleMergeCand >= 2 && ( cbWidth * cbHeight ) >= 64 ) | |
| \|\| (sps_ciip_enabled_flag && cu_skip_flag[ x0 ][ y0 ] == 0 && cbWidth < 128 && cbHeight < 128 && ( cbWidth * cbHeight ) >= 64 ) | |
| \|\| ( MaxNumSubblockMergeCand > 0 && cbWidth >= 8 && cbHeight >= 8 ) ) ) | |
|    regular_merge_flag[ x0 ][ y0 ] | |
| if ( regular_merge_flag[ x0 ][ y0 ] == 1 ){ | |
|   if( MaxNumMergeCand > 1 ) | |
|     merge_idx[ x0 ][ y0 ] | |
| } else { | |
| if( sps_mmvd_enabled_flag && cbWidth * cbHeight != 32 | 2802 |
| && ( (sps_triangle_enabled_flag && slice_type == B && MaxNumTriangleMergeCand >= 2 ) | |
| \|\| (sps_ciip_enabled_flag && cu_skip_flag[ x0 ][ y0 ] == 0 && cbWidth < 128 && cbHeight < 128 ) | |
| \|\| ( MaxNumSubblockMergeCand > 0 && cbWidth >= 8 && cbHeight >= 8 ) ) ) | |
|    mmvd_merge_flag[ x0 ][ y0 ] | |
| if( mmvd_merge_flag[ x0 ][ y0 ] == 1 ) { | |
| ... | |
| } else { | |
| if( MaxNumSubblockMergeCand > 0 && cbWidth >= 8 && cbHeight >= 8 | 2803 |
| && ( (sps_triangle_enabled_flag && slice_type == B && MaxNumTriangleMergeCand >= 2) | |
| \|\| (sps_ciip_enabled_flag && cu_skip_flag[ x0 ][ y0 ] == 0 && cbWidth < 128 && cbHeight < 128 ) ) ) | |
|    merge_subblock_flag[ x0 ][ y0 ] | |
| ... | |
| } else { | |
| if( sps_ciip_enabled_flag && cu_skip_flag[ x0 ][ y0 ] == 0 && | 2804 |
|   ( cbWidth * cbHeight ) >= 64 && cbWidth < 128 && cbHeight < 128 | |
|   && sps_triangle_enabled_flag && slice_type == B && MaxNumTriangleMergeCand >= 2 ) { | |
|    ciip_flag[ x0 ][ y0 ] | |
| if( ciip_flag[ x0 ][ y0 ] && MaxNumMergeCand > 1 ) | |
|    merge_idx[ x0 ][ y0 ] | |
| } | |
| if( MergeTriangleFlag[ x0 ][ y0 ] ) { | 2805 |
| ... | |
| } | |
| } | |

*FIG. 28*

(a) 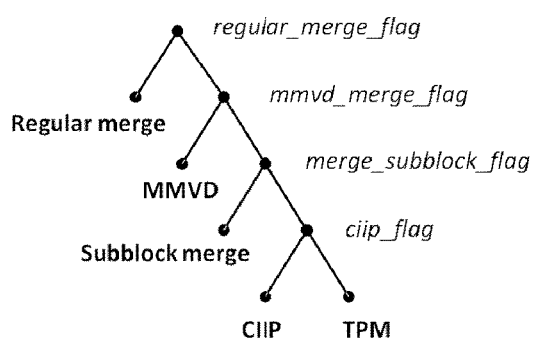   (b) 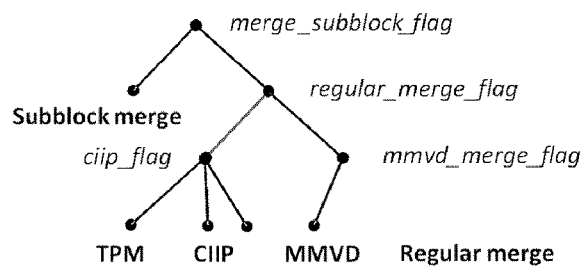
FIG. 29

| | |
|---|---|
| merge_data( x0, y0, cbWidth, cbHeight ) { | |
| ... | |
|   if( MaxNumSubblockMergeCand > 0 && cbWidth >= 8 && cbHeight >= 8 ) | |
|     merge_subblock_flag[ x0 ][ y0 ] | |
|   if( merge_subblock_flag[ x0 ][ y0 ] == 1 ) { | |
|     if( MaxNumSubblockMergeCand > 1 ) | |
|       merge_subblock_idx[ x0 ][ y0 ] | |
|   } else { | |
|     if( ( cbWidth * cbHeight ) >= 64 && cbWidth < 128 && cbHeight < 128 && ((sps_ciip_enabled_flag && cu_skip_flag[ x0 ][ y0 ] == 0) \|\| (sps_triangle_enabled_flag && slice_type == B) ) { | |
|       regular_merge_flag[ x0 ][ y0 ] | |
|     } | |
|     if( regular_merge_flag[ x0 ][ y0 ] ) { | |
|       if( sps_mmvd_enabled_flag ) | |
|       { | |
|         mmvd_merge_flag[ x0 ][ y0 ] | |
|         ... | |
|       } else { | |
|         if( MaxNumMergeCand > 1 ) | |
|           merge_idx[ x0 ][ y0 ] | |
|       } | |
|     } | |
|     } else { | |
|       if(sps_ciip_enabled_flag && cu_skip_flag[ x0 ][ y0 ] == 0 && sps_triangle_enabled_flag && slice_type == B) { | |
|         ciip_flag[ x0 ][ y0 ] | |
|         if( ciip_flag[ x0 ][ y0 ] && MaxNumMergeCand > 1 ) | |
|           merge_idx[ x0 ][ y0 ] | |
|       } | |
|       if( ! ciip_flag[ x0 ][ y0 ] ) { | |
|         ... | |
|       } | |
|     } | |

*FIG. 30*

```
merge_data( x0, y0, cbWidth, cbHeight ) {
    ...
    if( MaxNumSubblockMergeCand > 0 && cbWidth >= 8 && cbHeight >= 8 )
        merge_subblock_flag[ x0 ][ y0 ]
    if( merge_subblock_flag[ x0 ][ y0 ] == 1 ) {
        if( MaxNumSubblockMergeCand > 1 )
            merge_subblock_idx[ x0 ][ y0 ]
    } else {
        if( ( cbWidth * cbHeight ) >= 64 && ((sps_ciip_enabled_flag && cu_skip_flag[ x0 ][ y0 ] == 0 &&
            cbWidth < 128 && cbHeight < 128 ) || (sps_triangle_enabled_flag && slice_type == B) ) {
            regular_merge_flag[ x0 ][ y0 ]
        } if( regular_merge_flag[ x0 ][ y0 ] ) {
            if( sps_mmvd_enabled_flag )
            {
                mmvd_merge_flag[ x0 ][ y0 ]
                ...
            }
        }
        if( mmvd_merge_flag[ x0 ][ y0 ] == 0 && MaxNumMergeCand > 1 )
            merge_idx[ x0 ][ y0 ]
        } else {
            if(sps_ciip_enabled_flag && cu_skip_flag[ x0 ][ y0 ] == 0 && cbWidth < 128 && cbHeight < 128 &
            & sps_triangle_enabled_flag && slice_type == B) {
                ciip_flag[ x0 ][ y0 ]
                if( ciip_flag[ x0 ][ y0 ] && MaxNumMergeCand > 1 )
                    merge_idx[ x0 ][ y0 ]
            }
            if( ! ciip_flag[ x0 ][ y0 ] ) {
                ...
            }
        }
```

*FIG. 31*

Examples of geometric partitioning
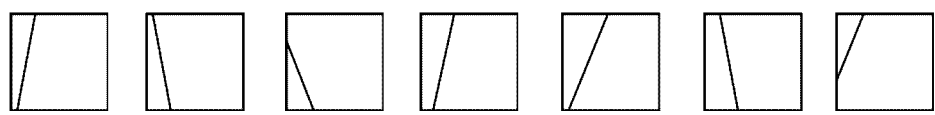
Geometric partitioning description
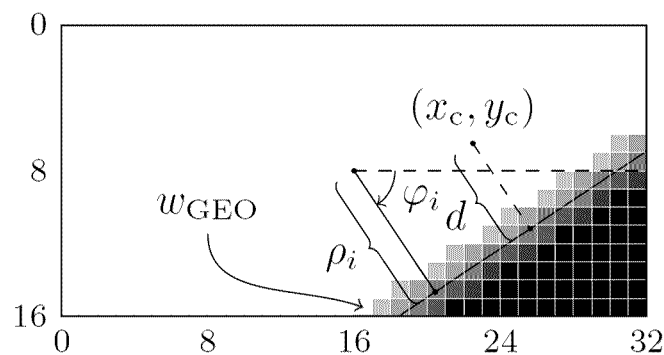
*FIG. 32*

| | |
|---|---|
| merge_data( x0, y0, cbWidth, cbHeight, chType ) { | |
|   if ( CuPredMode[ chType ][ x0 ][ y0 ] == MODE_IBC ) { | |
|     if( MaxNumIbcMergeCand > 1 ) | |
|       merge_idx[ x0 ][ y0 ] | |
|   } else { | |
|     if( MaxNumSubblockMergeCand > 0 && cbWidth >= 8 && cbHeight >= 8 ) | 3301 |
|       merge_subblock_flag[ x0 ][ y0 ] | |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | |
|     } else { | |
|       if( (sps_ciip_enabled_flag && cu_skip_flag[ x0 ][ y0 ] == 0 && <br>         ( cbWidth * cbHeight ) >= 64 && cbWidth < 128 && cbHeight < 128) \|\| <br>         ( sps_triangle_enabled_flag && MaxNumTriangleMergeCand > 1 && <br>         cbWidth >= 8 && cbHeight >= 8 ) ) | 3302 |
|         regular_merge_flag[ x0 ][ y0 ] | |
|       if ( regular_merge_flag[ x0 ][ y0 ] == 1 ){ | |
|         if( sps_mmvd_enabled_flag ) | |
|           mmvd_merge_flag[ x0 ][ y0 ] | |
|         if( mmvd_merge_flag[ x0 ][ y0 ] == 1 ) { | |
|           if( MaxNumMergeCand > 1 ) | |
|             mmvd_cand_flag[ x0 ][ y0 ] | |
|           mmvd_distance_idx[ x0 ][ y0 ] | |
|           mmvd_direction_idx[ x0 ][ y0 ] | |
|         } else { | |
|           if( MaxNumMergeCand > 1 ) | |
|             merge_idx[ x0 ][ y0 ] | |
|         } | |
|       } else { | |
|         if( sps_ciip_enabled_flag && sps_triangle_enabled_flag && <br>           MaxNumTriangleMergeCand > 1 && <br>           cu_skip_flag[ x0 ][ y0 ] == 0 && <br>           cbWidth >= 8 && cbHeight >= 8 && cbWidth < 128 && cbHeight < 128 ) { | 3303 |
|           ciip_flag[ x0 ][ y0 ] | |
|         if( ciip_flag[ x0 ][ y0 ] && MaxNumMergeCand > 1 ) | |
|           merge_idx[ x0 ][ y0 ] | |
|         if( !ciip_flag[ x0 ][ y0 ] && MaxNumTriangleMergeCand > 1 ) { | |
|           merge_geo_idx[ x0 ][ y0 ] | |
|           merge_triangle_idx0[ x0 ][ y0 ] | |
|           merge_triangle_idx1[ x0 ][ y0 ] | |
|         } | |
|       } | |
|     } | |
|   } | |
| } | |

*FIG. 33*

VIDEO SIGNAL PROCESSING METHOD AND DEVICE USING MOTION COMPENSATION

CROSS-REFERENCE TO RELATED APPLICATIONS

This application is a Continuation of U.S. Ser. No. 17/423,853, filed on Jul. 16, 2021, which is a National Stage Entry of International Application No. PCT/KR2020/000964, filed on Jan. 20, 2020, which claims priority to Korean Application No. 10-2019-0125746, filed on Oct. 11, 2019, Korean Application No. 10-2019-0081764, filed on Jul. 7, 2019, Korean Application No. 10-2019-0075316, filed on Jun. 24, 2019, Korean Application No. 10-2019-0064959, filed on May 31, 2019, Korean Application No. 10-2019-0040400, filed on Apr. 5, 2019, Korean Application No. 10-2019-0037000, filed on Mar. 29, 2019, and Korean Application No. 10-2019-0006511, filed on Jan. 18, 2019, in the Korean Intellectual Property Office, the entire contents of which are hereby incorporated by reference.

TECHNICAL FIELD

The present invention relates to a method and a device for processing a video signal and, more specifically, to a method and a device for processing a video signal, wherein a video signal is encoded or decoded by using motion compensation.

BACKGROUND ART

Compression coding refers to a series of signal processing technologies for transmitting digitalized information through a communication line or storing the same in a type appropriate for a recording medium. Objects of compression coding include sounds, images, characters, and the like, and a technology for performing compression coding in connection with images, in particular, is referred to as video image compression. Compression coding regarding video signals is performed by removing redundant information in view of spatial correlation, temporal correlation, probabilistic correlation, and the like. However, recent development of various kinds of media and data transmission instruments has generated a request for methods and devices for processing video signals with higher efficiencies.

DISCLOSURE

Technical Problem

It is an aspect of the present invention to improve the video signal coding efficiency. It is another aspect of the present invention to provide an efficient merge-mode signaling method.

Technical Solution

In order to solve the above-mentioned problems, the present invention provides a video signal processing device and a video signal processing method as follows.

According to an embodiment of the present invention, there is provided a video signal processing method including: parsing a first syntax element indicating whether a merge mode is applied to a current block; determining whether to parse a second syntax element based on a first predefined condition when the merge mode is applied to the current block, wherein the second syntax element indicates whether a first mode or a second mode is applied to the current block; determining whether to parse a third syntax element based on a second predefined condition when the first mode and the second mode are not applied to the current block, wherein the third syntax element indicates a mode applied to the current block among a third mode and a fourth mode; determining a mode applied to the current block based on the second syntax element or the third syntax element; deriving motion information of the current block based on the determined mode; and generating a prediction block of the current block by using the motion information of the current block, wherein the first condition includes at least one of a condition by which the third mode is usable and a condition by which the fourth mode is usable.

In an embodiment, the third mode and the fourth mode may be located later than the first mode in a decoding sequence in a merge data syntax.

In an embodiment, the method may further include parsing the second syntax element when the first condition is satisfied, and when the first condition is not satisfied, the value of the second syntax element may be inferred to be 1.

In an embodiment, when the first condition is not satisfied, the second syntax element may be inferred based on a fourth syntax element indicating whether a subblock-based merge mode is applied to the current block.

In an embodiment, the second condition may include a condition by which the fourth mode is usable.

In an embodiment, the second condition may include at least one of conditions relating to whether the third mode is usable in the current sequence, whether the fourth mode is usable in the current sequence, whether the maximum number of candidates for the fourth mode is greater than 1, whether a width of the current block is smaller than a first predefined size, and whether a height of the current block is smaller than a second predefined size.

In an embodiment, the method may further include, when the second syntax element has a value of 1, obtaining a fifth syntax element indicating whether a mode applied to the current block is the first mode or the second mode.

According to an embodiment of the present invention, there is provided a video signal processing apparatus including a processor, wherein the processor is configured to: parse a first syntax element indicating whether a merge mode is applied to a current block; determine whether to parse a second syntax element based on a first predefined condition when the merge mode is applied to the current block, wherein the second syntax element indicates whether a first mode or a second mode is applied to the current block; determine whether to parse a third syntax element based on a second predefined condition when the first mode and the second mode are not applied to the current block, wherein the third syntax element indicates a mode applied to the current block among a third mode and a fourth mode; determine a mode applied to the current block based on the second syntax element or the third syntax element; derive motion information of the current block based on the determined mode; and generate a prediction block of the current block by using the motion information of the current block, wherein first condition includes at least one of a condition by which the third mode is usable and a condition by which the fourth mode is usable.

In an embodiment, the third mode and the fourth mode may be located later than the first mode in a decoding sequence in a merge data syntax.

In an embodiment, the processor may parse the second syntax element when the first condition is satisfied; and when the first condition is not satisfied, the value of the second syntax element may be inferred to be 1.

In an embodiment, when the first condition is not satisfied, the second syntax element may be inferred based on a fourth syntax element indicating whether a subblock-based merge mode is applied to the current block.

In an embodiment, the second condition may include a condition by which the fourth mode is usable.

In an embodiment, the second condition may include at least one of conditions relating to whether the third mode is usable in the current sequence, whether the fourth mode is usable in the current sequence, whether the maximum number of candidates for the fourth mode is greater than 1, whether a width of the current block is smaller than a first predefined size, and whether a height of the current block is smaller than a second predefined size.

In an embodiment, when the second syntax element has a value of 1, the processor may obtain a fifth syntax element indicating whether a mode applied to the current block is the first mode or the second mode.

According to an embodiment of the present invention, there is provided a video signal processing method including: encoding a first syntax element indicating whether a merge mode is applied to a current block; determining whether to encode a second syntax element based on a first predefined condition when the merge mode is applied to the current block, wherein the second syntax element indicates whether a mode applied to the current block is a first mode or a second mode; determining whether to encode a third syntax element based on a second predefined condition when the first mode and the second mode are not applied to the current block, wherein the third syntax element indicates a mode applied to the current block among a third mode or a fourth mode; determining a mode applied to the current block based on the second syntax element or the third syntax element; deriving motion information of the current block based on the determined mode; and generating a prediction block of the current block by using the motion information of the current block, wherein the first condition includes at least one of a condition by which the third mode is usable and a condition by which the fourth mode is usable.

Advantageous Effects

According to an embodiment of the present invention, it is possible to increase coding efficiency of a video signal. Particularly, according to an embodiment of the present invention, it is possible to reduce signaling overhead and increase compression efficiency by controlling a syntax parsing order.

DESCRIPTION OF DRAWINGS

FIG. 8 illustrates an example of a coding unit syntax according to an embodiment of the present invention;

FIG. 9 illustrates an example of a coding unit syntax according to an embodiment of the present invention;

FIG. 10 illustrates an example of a merge mode signaling method according to an embodiment of the present invention;

FIG. 11 illustrates an example of a merge data syntax structure according to an embodiment of the present invention;

FIG. 12 illustrates merge data syntax according to an embodiment of the present invention;

FIG. 13 illustrates an example of a merge data syntax structure according to an embodiment of the present invention;

FIG. 14 illustrates an example of a merge data syntax structure according to an embodiment of the present invention;

FIG. 15 illustrates a merge data syntax structure according to an embodiment of the present invention;

FIG. 16 illustrates a merge data syntax structure according to an embodiment of the present invention;

FIG. 17 illustrates a merge data syntax structure according to an embodiment of the present invention;

FIG. 18 illustrates a merge data syntax structure according to an embodiment of the present invention;

FIG. 19 illustrates an example of a merge data syntax structure according to an embodiment of the present invention;

FIG. 20 illustrates an example of a merge data syntax structure according to an embodiment of the present invention;

FIG. 21 illustrates an example of a merge data syntax structure according to an embodiment of the present invention;

FIG. 22 illustrates an example of a merge data syntax structure according to an embodiment of the present invention;

FIG. 23 illustrates an example of a merge data syntax structure according to an embodiment of the present invention;

FIG. 24 illustrates a merge data syntax structure according to an embodiment of the present invention;

FIG. 25 illustrates an example of a merge data syntax structure according to an embodiment of the present invention;

FIG. 26 illustrates a merge data syntax structure according to an embodiment of the present invention;

FIG. 27 illustrates a merge data syntax structure according to an embodiment of the present invention;

FIG. 28 illustrates an example of a merge data syntax structure according to an embodiment of the present invention;

FIG. 29 illustrates an example of a merge mode signaling method according to an embodiment of the present invention;

FIG. 30 illustrates an example of a merge data syntax according to an embodiment of the present invention;

FIG. 31 illustrates an example of a merge data syntax according to an embodiment of the present invention;

FIG. 32 illustrates a geometric merge mode according to an embodiment of the present invention;

FIG. 33 illustrates merge data syntax according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
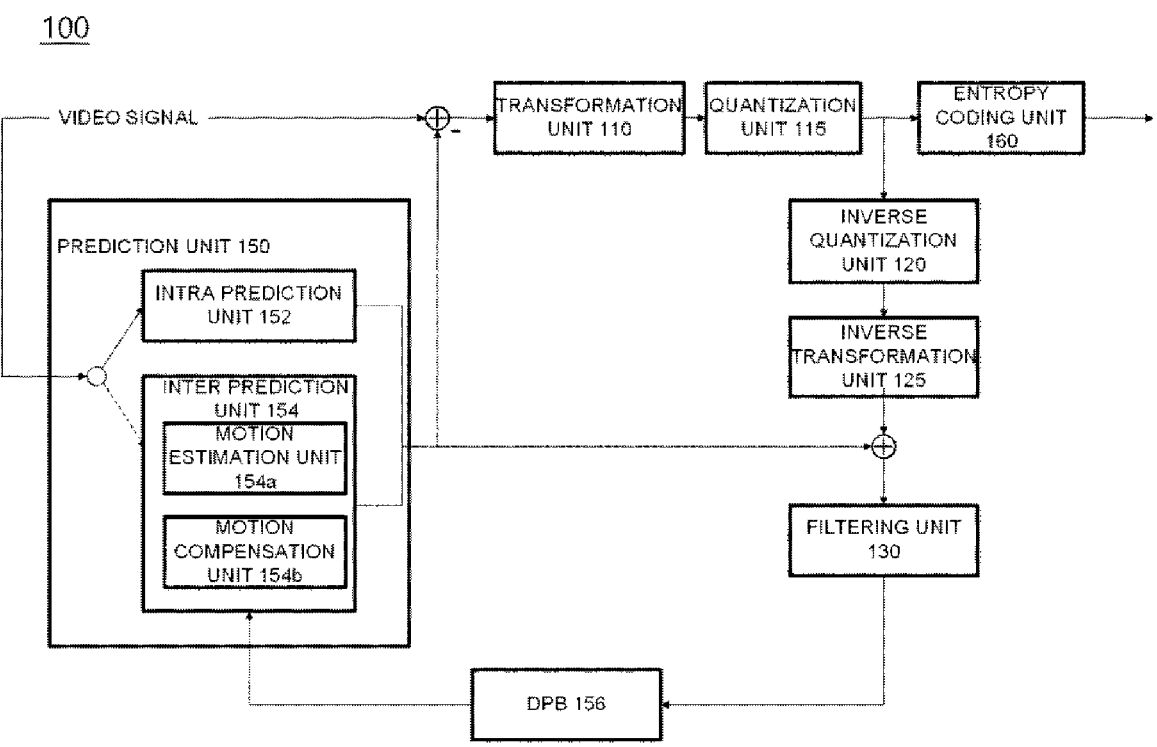
FIG. 1 is a block diagram schematically illustrating an apparatus for encoding a video signal according to an embodiment of the present invention.

FIG. 1 is a schematic block diagram of a video signal encoding apparatus according to an embodiment of the present disclosure. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
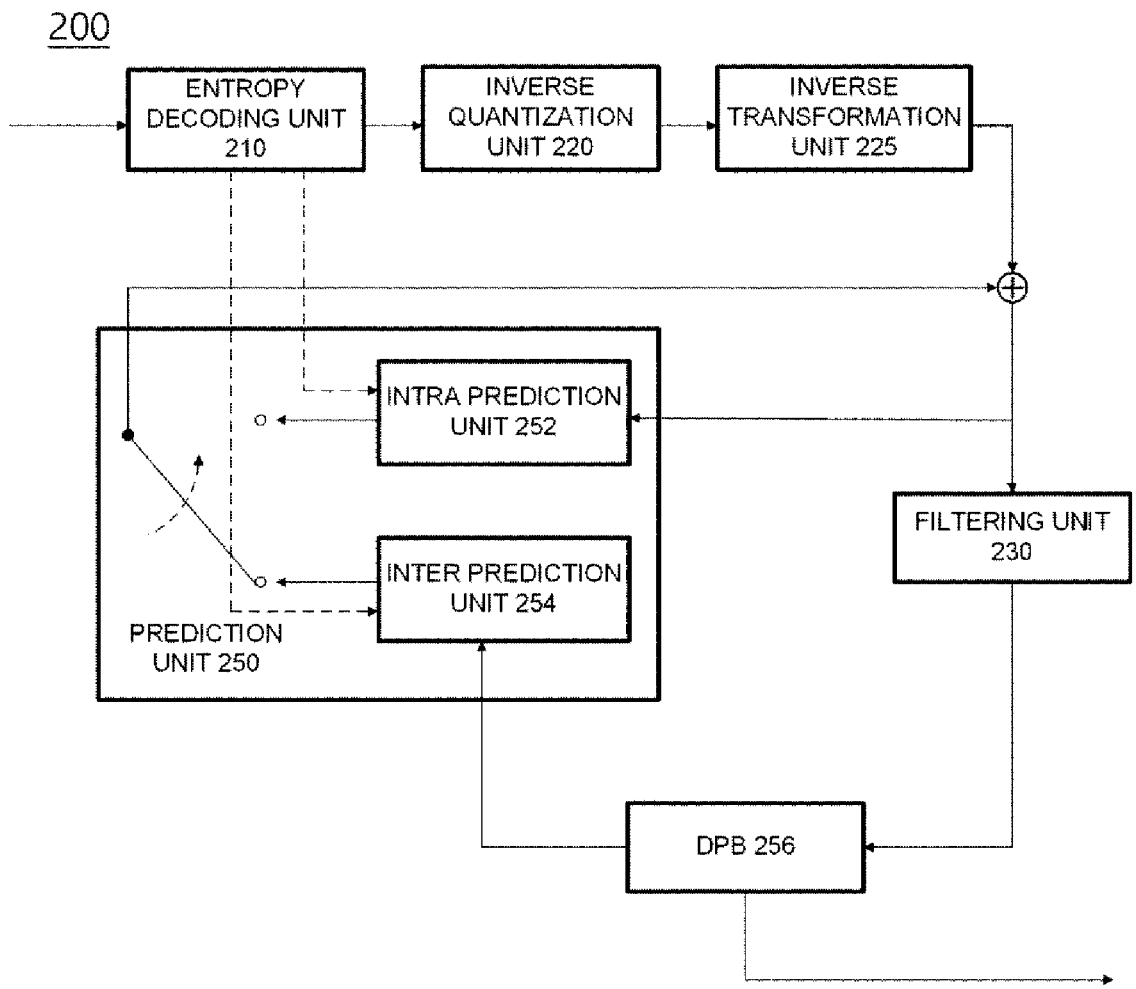
FIG. 2 is a block diagram schematically illustrating an apparatus for decoding a video signal according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may be present in the same reference picture or may be present in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
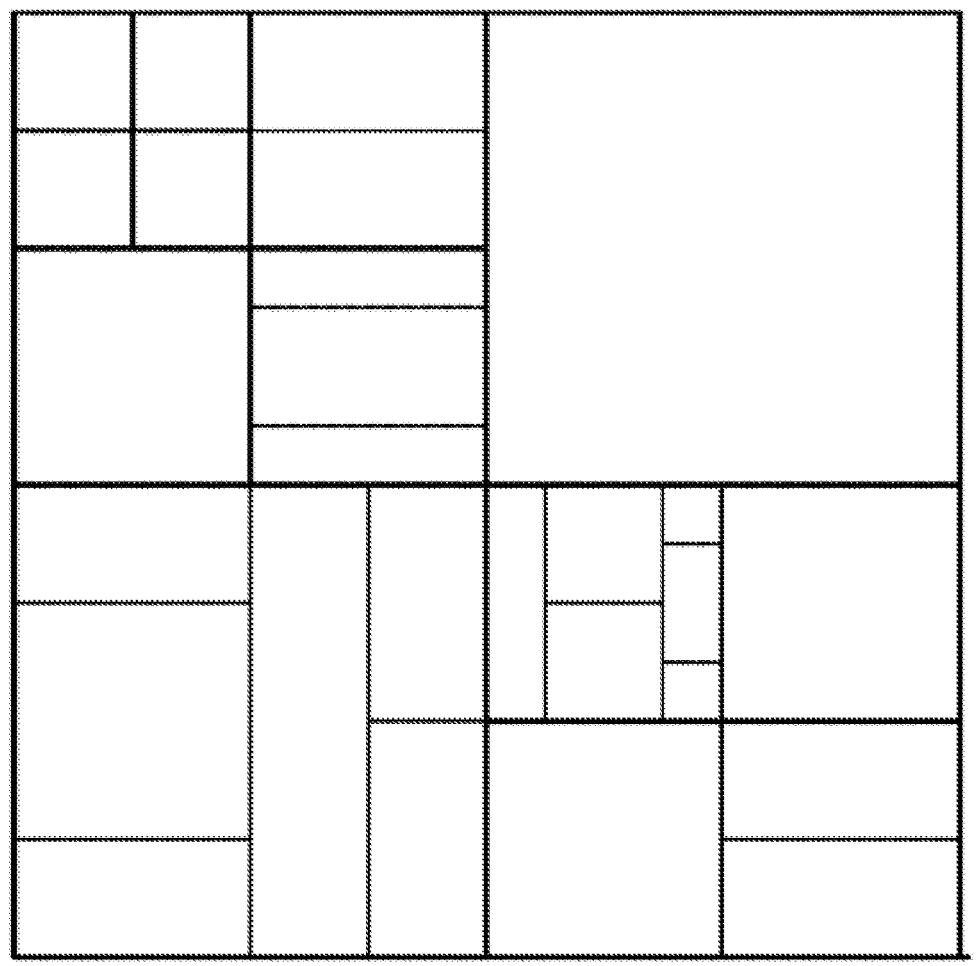
FIG. 3 illustrates an embodiment in which a coding tree unit is divided into coding units within a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split may be performed recursively.

The leaf node of the multi-type tree may be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
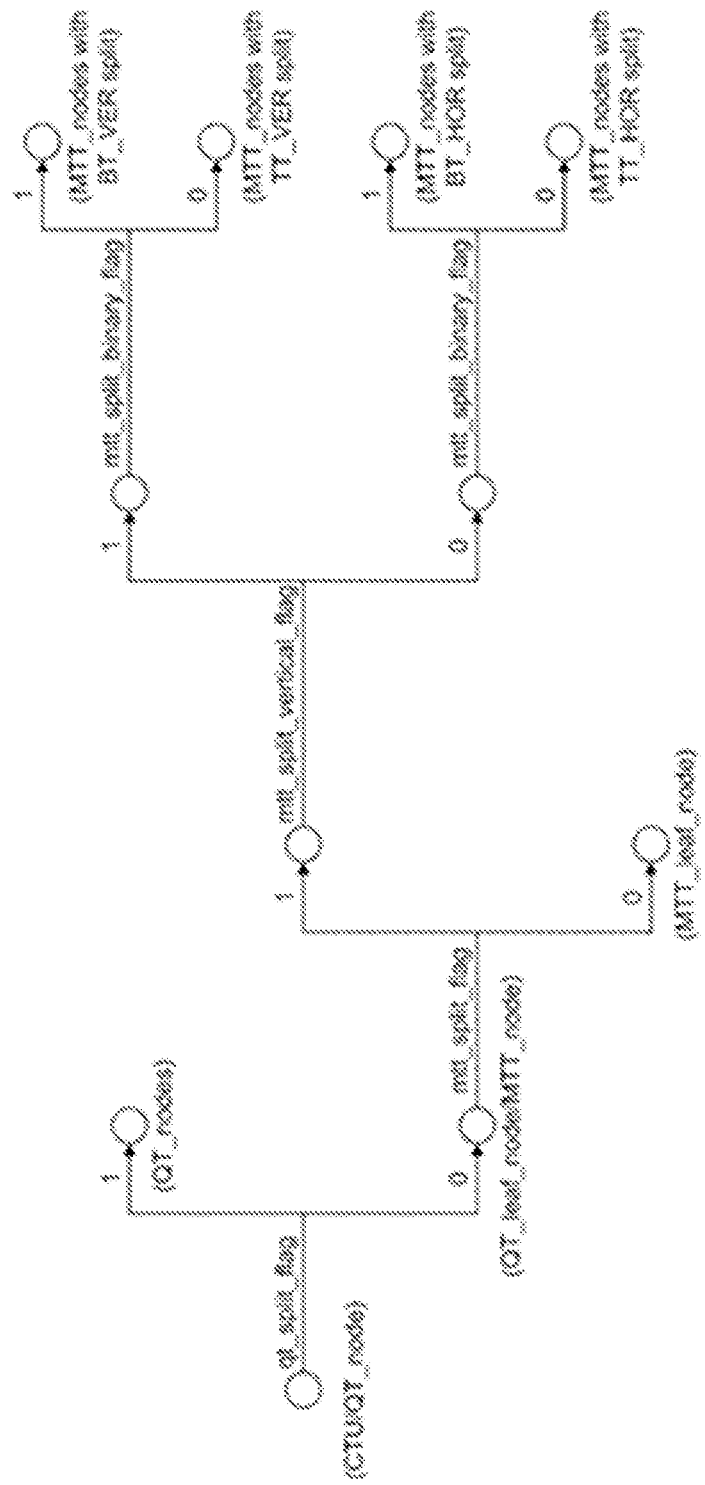
FIG. 4 illustrates an embodiment of a method of signaling division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
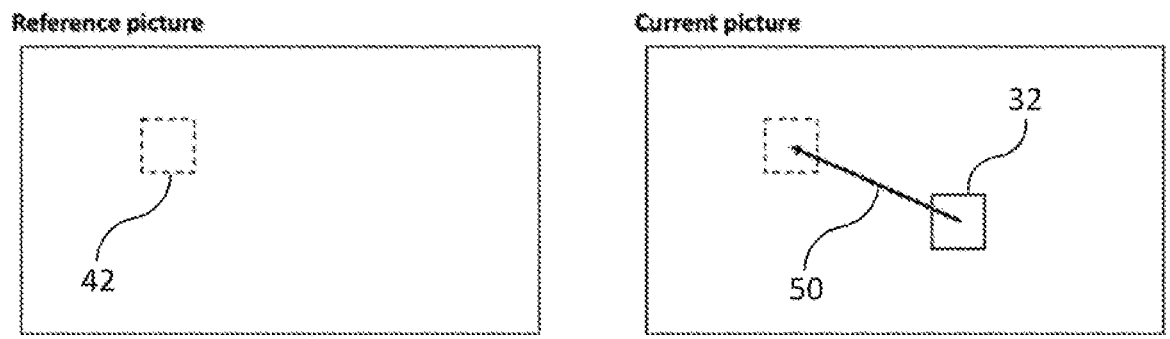
FIG. 5 illustrates inter prediction according to an embodiment of the present invention.

FIG. 5 illustrates inter prediction according to an embodiment of the present invention. As described above, the decoder may predict the current block with reference to restored samples of another decoded picture. Referring to FIG. 5, the decoder acquires a reference block 42 within the reference picture based on motion information of the current block 32. In this case, the motion information may include a reference picture index and a motion vector 50. The reference picture index indicates the reference picture of the current block in a reference picture list. Further, the motion vector 50 indicates an offset between a coordinate value of the current block 32 within the current picture and a coordinate value of the reference block 42 within the reference picture. The decoder acquires a predictor of the current block 32 based on sample values of the reference block 42 and restores the current block 32 using the predictor.

Meanwhile, according to an embodiment of the present invention, subblock-based motion compensation may be used. That is, the current block 32 may be divided into a plurality of subblocks, and an independent motion vector may be used for each subblock. Accordingly, respective subblocks may be predicted using different reference blocks within the current block 32. According to an embodiment, the subblock may have a preset size such as 4×4 or 8×8. The decoder acquires a predictor of each subblock of the current block 32 through a motion vector of each subblock. Through a combination of predictors of the respective subblocks, a predictor of the current block 32 may be acquired, and the decoder may restore the current block 32 using the acquired predictor of the current block 32.

According to an embodiment of the present invention, subblock-based motion compensation through various methods may be performed. Subblock-based motion compensation may include affine model-based motion compensation (hereinafter, referred to as affine motion compensation or affine motion prediction) and Subblock-based Temporal Motion Vector Prediction (SbTMVP). Hereinafter, various embodiments of the affine motion compensation and the SbTMVP are described with reference to drawings.

Figure 6:
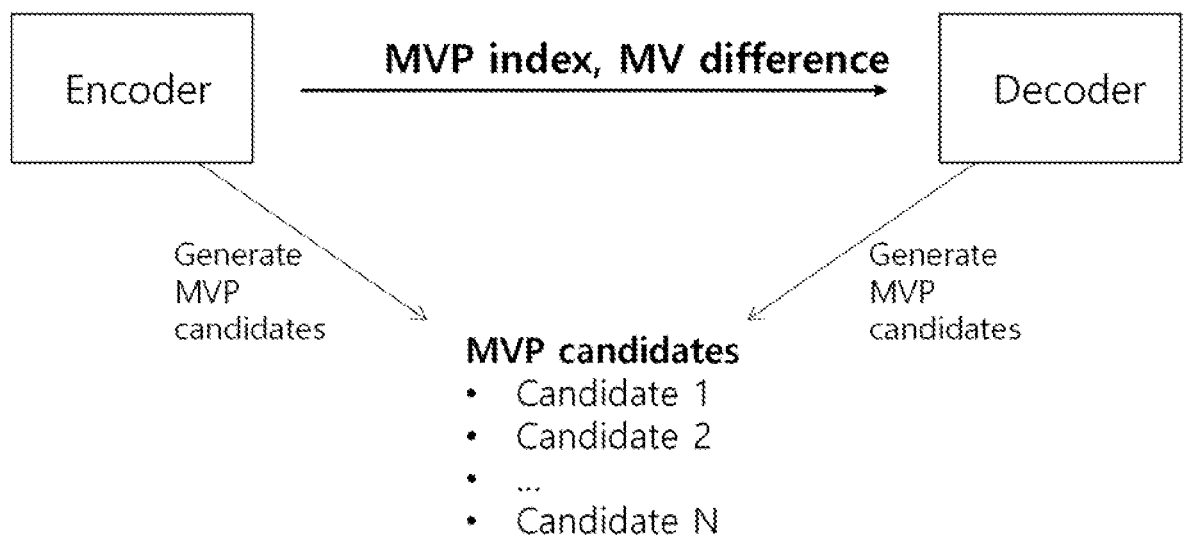
FIG. 6 illustrates a method of signaling a motion vector according to an embodiment of the present invention.

FIG. 6 illustrates a method of signaling a motion vector according to an embodiment of the present invention. According to an embodiment of the present invention, a Motion Vector (MV) may be generated based on Motion Vector Prediction (or Predictor) (MVP). For example, the MV may be determined by MVP as shown in [Equation 1] below. In other words, the MV may be determined (configured or induced) as a value which is the same as the MVP.

$$MV=MVP \qquad \text{[Equation 1]}$$

In another example, the MV may be determined based on MVP and a Motion Vector Difference (MVD) as shown in [Equation 2] below. The encoder may signal MVD information to the decoder in order to more accurately indicate the MV, and the decoder may induce the MV by adding the acquired MVD to the MVP.

$$MV=MVP+MVD \qquad \text{[Equation 2]}$$

According an embodiment of the present invention, the encoder may transmit the determined motion information to the decoder, and the decoder may generate the MV from the received motion information and generate (or induce) a predicted block on the basis thereof. For example, the motion information may include MVP information and MVD information. In this case, elements of the motion information may vary depending on the inter prediction mode. For example, the motion information may or may not include MVP information in the merge mode. In another example, the motion information may include MVP information and MVD information in an Advanced Motion vector Prediction (AMVP) mode.

In order to determine, transmit, and receive information on the MVP, the encoder and the decoder may generate MVP candidates (or an MVP candidate list) in the same way. For example, the encoder and the decoder may generate the same MVP candidates in the same order. Further, the encoder may transmit an index indicating (or representing) the determined (or selected) MVP from among the generated MVP candidates to the decoder, and the decoder may induce the determined MVP and/or MV based on the received index.

According to an embodiment of the present invention, the MVP candidates may include a spatial candidate, a temporal candidate, and the like. The MVP candidates may be referred to as merge candidates when the merge mode is applied, and may be referred to as AMVP candidates when the AMVP mode is applied. The spatial candidate may be an MV (or motion information) for a block positioned at a specific location from the current block. For example, the spatial candidate may be an MV of a block which is adjacent to or not adjacent to the current block. The temporal candidate may be an MV corresponding to a block within a picture different from the current picture. Further, for example, the MVP candidates may include an affine MV, an ATMVP, an STMVP, a combination of the MVs (or candidates), an average MV of the MVs (or candidates), a zero MV, and the like.

According to an embodiment, the encoder may signal information indicating a reference picture to the decoder. As an embodiment, when a reference picture of the MVP candidates is different from a reference picture of the current block (or currently processed block), the encoder/decoder may scale the MV (motion vector scaling) of the MVP candidates. In this case, the MV scaling may be performed based on a Picture Order Count (POC) of the current picture, a POC of the reference picture of the current block, and a POC of the reference picture of the MVP candidate.

A detailed embodiment of the MVD signaling method is described hereinafter. [Table 1] below shows a syntax structure for MVD signaling.

TABLE 1

| | Descriptor |
|---|---|
| mvd_coding( x0, y0, refList ) { | |
|   abs_mvd_greater0_flag[ 0 ] | ae(v) |
|   abs_myd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

Referring to [Table 1], a sign and an absolute value of the MVD may be separately coded according to an embodiment of the present invention. That is, the sign and the absolute value of the MVD may have different syntax (or syntax elements). Further, the absolute value of the MVD may be directly coded or may be gradually coded based on a flag indicating whether the absolute value is larger than N as shown in [Table 1]. If the absolute value is larger than N, a value of (absolute value−N) may be also signaled. Specifically, in the example of [Table 1], abs_mvd_greater0_flag indicating whether the absolute value is larger than 0 may be transmitted. If abs_mvd_greater0_flag indicates (represents) that the absolute value is not larger than 0, the absolute value of the MVD may be determined as 0. Further, if abs_mvd_greater0_flag indicates that the absolute value is larger than 0, additional syntax (or syntax element) may be present.

For example, abs_mvd_greater1_flag indicating that the absolute value is larger than 1 may be transmitted. If abs_mvd_greater1_flag indicates (represents) that the absolute value is not larger than 1, the absolute value of the MVD may be determined as 1. If abs_mvd_greater1_flag indicates that the absolute value is larger than 1, additional syntax may be present. For example, abs_mvd_minus2 may be present. abs_mvd_minus2 may be a value of (absolute value−2). Since it is determined that the absolute value is larger than 1 (that is, larger than or equal to 2) according to the values of abs_mvd_greater0_flag and abs_mvd_greater1_flag, the value of (absolute value−2) may be signaled. Hierarchically performing syntax signaling on the information on the absolute value may use a smaller number of bits than binarizing and signaling the absolute value.

According to an embodiment, the syntax related to the absolute value may be coded by applying a binarization method of a variable length such as exponential-Golomb, truncated unary, truncated rice, or the like. Further, a flag indicating the sign of the MVD may be signaled through mvd_sign_flag.

Although a method of coding the MVD has been described in the above-described embodiment, the sign and the absolute value of information as well as the MVD may be separately signaled. The absolute value may be coded to a flag indicating whether the absolute value is larger than a predefined specific value or a value obtained by subtracting the specific value from the absolute value. In [Table 1], [0] and [1] may indicate component indexes. For example, [0] and [1] may be an x-component (that is, a horizontal component) and a y-component (that is, a vertical component).

Figure 7:
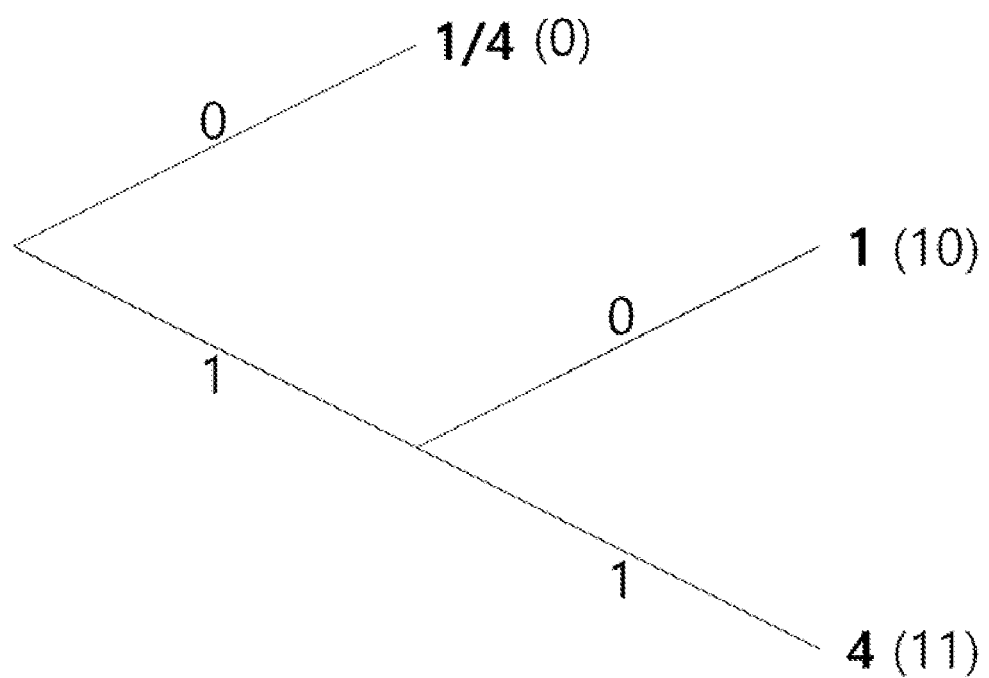
FIG. 7 illustrates a method of signaling adaptive motion vector resolution information according to an embodiment of the present invention.

FIG. 7 illustrates a method of signaling adaptive motion vector resolution information according to an embodiment of the present invention. According to an embodiment of the present invention, a resolution indicating the MV or the MVD may vary. For example, the resolution may be expressed based on a pixel (or a pel). For example, the MV or the MVD may be signaled in units of ¼ (quarter), ½ (half), 1 (integer), 2, or 4 pixels. The encoder may signal resolution information of the MV or the MVD to the decoder. Further, for example, 16 may be coded to 64 in units of ¼ (¼*64=16), to 16 in units of 1 (1*16=16), and to 4 in units of 4 (4*4=16). That is, the MV or MVD value may be determined using [Equation 3] below.

$$\text{valueDetermined} = \text{resolution} * \text{valuePerResolution} \qquad \text{[Equation 3]}$$

In [Equation 3], valueDetermined indicates the MV or MVD value. Further, valuePerResolution is a value signaled based on the determined resolution. In this case, when the value signaled by the MV or the MVD cannot be divided by the determined resolution, a rounding process and the like may be applied. When the high resolution is used, the accuracy may increase but a coded value is large and thus the larger number of bits may be used. When the low resolution is used, the accuracy may decrease but a coded value is small and thus the smaller number of bits may be used. According to an embodiment, the resolution may be differently configured in units of sequences, pictures, slices, Coding Tree Units (CTUs), Coding Units (CUs), and the like. That is, the encoder/decoder may adaptively determine/apply the resolution according to a predefined unit among the above-described units.

According to an embodiment of the specification, the resolution information may be signaled from the encoder to the decoder. In this case, the resolution information may be binarized and signaled based on the variable length. In this case, signaling overhead may be reduced when signaling is performed based on an index corresponding to the smallest value (that is, foremost value). As an embodiment, the resolution may be mapped to signaling indexes in the order from the high resolution to the low resolution.

According to an embodiment of the specification, FIG. 7 illustrates a signaling method when it is assumed that three resolutions are used among various resolutions. In this case, three signaling bits may be 0, 10, and 11, and three signaling indexes may be referred to as a first resolution, a second resolution, and a third resolution. Since 1 bit is needed to signal the first resolution and 2 bits are needed to signal the remaining resolutions, signaling overhead may be relatively reduced when the first resolution is signaled. In the example of FIG. 7, the first resolution, the second resolution, and the third resolution may be defined as ¼, 1, and 4 pixel resolutions, respectively. In the following embodiments, the MV resolution may be the resolution of the MVD.

Hereinafter, a motion compensation method based on a merge mode using a motion vector difference (merge mode with MVD (MMVD)) (or merge MVD) will be described.

FIG. 8 illustrates an example of a coding unit syntax according to an embodiment of the present invention. According to an embodiment of the present invention, a syntax element indicating whether or not an MMVD is applied may be signaled based on a syntax element indicating whether or not a merge mode is applied. Referring to FIG. 8, in step S801, an MMVD flag (mmvd_flag) may be signaled when the merge flag (merge_flag) is 0 (i.e., in a case where a merge mode is not used). In FIG. 8, the MMVD flag indicates a syntax element (or flag) indicating whether or not MMVD is applied. In addition, the merge flag indicates a syntax element (or flag) indicating whether or not the merge mode is applied.

According to an embodiment of the present invention, an encoder/decoder may determine a motion vector (MV) based on a motion vector predictor (MVP) and a motion vector difference (MVD) when the merge mode is applied. In the present specification, the MVP may be referred to as a base motion vector (baseMV). That is, the encoder/decoder may derive a motion vector (i.e., a final motion vector) by summing the base motion vector with the motion vector difference. However, the present invention is not limited to these names, and the MVP may be referred to as a base motion vector, a temporary motion vector, an initial motion vector, an MMVD candidate motion vector, and the like. The MVD may be expressed as a value for refining the MVP, and may be referred to as a refined motion vector (refineMV) or a merge motion vector difference.

According to an embodiment of the present invention, when the MMVD is applied, that is, in the MMVD mode, the MV may be determined based on a base motion vector, a distance parameter (or variable), or a direction parameter (or variable). Further, according to an embodiment of the present invention, the base motion vector may be determined from a candidate list. For example, the base motion vector may be determined from a merge candidate list. The encoder/decoder may determine the base motion vector from some of another candidate list. Some of the candidate list may be a front part of the candidate list (part having a smaller index). For example, the encoder/decoder may determine the base motion vector using first and second candidates among candidates of the merge candidate list. To this end, a candidate index indicating a specific candidate among the two candidates may be signaled from the encoder to the decoder. Referring to FIG. 21, a base candidate index which is an index for signaling the base motion vector may be defined. The encoder/decoder may determine a candidate applied to the current block among the candidates of the candidate list according to the base candidate index and determine a motion vector of the determined candidate as the base motion vector. In the present invention, the base candidate index is not limited to the name, and may be referred to as a base candidate flag, a candidate index, a candidate flag, an MMVD index, an MMVD candidate index, an MMVD candidate flag, or the like.

According to an embodiment of the present invention, there may be an MVD different from the MVD described in FIGS. 6 and 7. For example, the MVD in the MMVD may be differently defined from the MVD described in FIGS. 6 and 7. In this specification, the MMVD may indicate a merge mode using a motion vector difference (that is, a motion compensation mode or method) or indicate a motion vector difference in the case in which the MMVD is applied. For example, the encoder/decoder may determine whether to apply (or use) the MMVD. If the MMVD is applied, the encoder/decoder may induce a merge candidate used for inter prediction of the current block from the merge candidate list and determine a motion vector of the current block by inducing the MMVD and applying (or adding) the MMVD to a motion vector of the merge candidate.

In an embodiment, the different MVD may be a simplified MVD, an MVD having a different (or small) resolution, MVDs having the small usable number, MVDs having different signaling methods, or the like. For example, while the MVD used in the conventional AMVP, affine inter mode, or the like described in FIGS. 6 and 7 may indicate all areas in x and y axes (that is, horizontal and vertical directions), for example, areas based on pictures (for example, picture areas or areas including pictures and surrounding areas) at uniform intervals for a specific signal unit (for example, x-pel), the MMVD may have a relatively limited unit of specific signaling. Further, areas (or units) for signaling the MMVD may not have uniform intervals. The MMVD may indicate only a specific direction for the specific signaling unit.

According to an embodiment of the present invention, the MMVD may be determined based on a distance and a direction. The distance and the direction of the MMVD according to a distance index indicating the distance of the MMVD and a direction index indicating the direction of the MMVD may be preset. In an embodiment, the distance may indicate the MMVD size (for example, an absolute value) in units of specific pixels, and the direction may indicate the direction of the MMVD. The encoder/decoder may signal a relatively small distance through a relatively small index. That is, if the signaling is not signaling through fixed length binarization, the encoder/decoder may signal a relatively short distance through relatively small bits.

In an embodiment of the present invention, MMVD-related syntax elements may be signaled when a merge flag (i.e., merge_flag) is 0 (i.e., in a case where a merge mode is not used). As described above, MMVD may be a method of signaling MVD for a base candidate. With regard to this aspect, the MMVD mode may have similarities to modes such as MVD-signaling AMVP and affine AMVP (or affine inter). Accordingly, when the merge flag is 0, signaling may be performed. In step S802, when MMVD is applied to the current block, that is, when the MMVD flag is 1, a decoder may parse MMVD-related syntax elements. As an embodiment, the MMVD-related syntax element may include at least one of mmvd_merge_flag, mmvd_distance_idx, and mmvd_direction_idx. Here, mmvd_merge_flag indicates a flag (or syntax element) indicating a base candidate of the MMVD, mmvd_distance_idx indicates an index (or syntax element) indicating a distance value of the MVD, and mmvd_direction_idx indicates an index (or syntax element) indicating the direction of the MVD.

Further, referring to FIG. 8, CuPredMode indicates a variable (or value) indicating a prediction mode of the current block. Alternatively, the prediction mode of the current block may be a value indicating whether the current block is intra-predicted or inter-predicted. Alternatively, the prediction mode of the current block may be determined based on pred_mode_flag. Here, pred_mode_flag indicates a syntax element indicating whether the current block is coded in the inter prediction mode or the intra prediction mode. If pred_mode_flag is 0, the prediction mode of the current block may be set to a value indicating that inter prediction is used. A prediction mode value indicating that inter prediction is used may be MODE_INTER. If pred_mode_flag is 1, the prediction mode of the current block may be set to a value indicating that intra prediction is used. A prediction mode value indicating that intra prediction is used may be MODE_INTRA. If pred_mode_flag is not present, CuPredMode may be set to a preset value. Further, as an example, the preset value may be MODE_INTRA.

Further, referring to FIG. 8, cu_cbf may be a value indicating whether a syntax related to transform is present. The syntax related to transform may be a transform tree syntax structure. Further, the syntax related to transform may be a syntax signaled through a transform tree (transform tree) of FIG. 28. Further, when cu_cbf is 0, a syntax related to transform may be not present. When cu_cbf is 1, syntax related to transform may be present. Referring to FIG. 28, in step S803, when cu_cbf is 1, the decoder may call the transform tree syntax. If cu_cbf is not present, a cu_cbf value may be determined based on cu_skip_flag. For example, when cu_skip_flag is 1, cu_cbf may be 0. Further, when cu_skip_flag is 0, cu_cbf may be 1. As described above, cu_skip_flag denotes a syntax element indicating whether or not a skip mode is used. In addition, when the skip mode is applied, a residual signal may not be used. That is, the skip mode may be a mode in which reconstruction occurs without adding a residual to a prediction signal. Accordingly, an indication that cu_skip_flag is 1 may denote that a syntax related to transform is not present.

According to an embodiment of the present invention, in step S802, the decoder may parse cu_cbf when intra prediction is not used. Further, when cu_skip_flag is 0, cu_cbf may be parsed. Further, the decoder may parse cu_cbf when the merge flag is 0. Further, these conditions may be combined and applied. For example, the decoder may parse cu_cbf when the prediction mode of the current block is not the intra prediction mode and the merge flag is 0. Alternatively, the decoder may parse cu_cbf when the prediction mode of the current block is the inter prediction mode and the merge flag is 0. This may occur since the skip mode may be used or not in a case of non-merge mode inter prediction.

FIG. 9 illustrates an example of a coding unit syntax according to an embodiment of the present invention. According to an embodiment of the present invention, cu_cbf and transform-related syntax of FIG. 8 described above may be changed to those shown in FIG. 9. That is, according to an embodiment of the present invention, when a specific mode is applied, whether or not to use the skip mode may be determined. For example, when MMVD is applied, whether or not to use the skip mode may be determined. As an embodiment, referring to FIG. 9, in step S901, the decoder may determine whether to parse cu_cbf based on whether or not MMVD is applied. That is, since use of the skip mode is determined according to whether or not MMVD is applied, a determination of whether to parse cu_cbf can be made accordingly. When it is clear whether or not to use the skip mode, the decoder may not parse cu_cbf.

In an embodiment, in a case of using MMVD, the encoder/decoder may not use the skip mode. Since MVD cannot be accurately indicated like the AMVP and can only be indicated in a limited range as described above, the MMVD can be more accurately reconstructed using a residual. Accordingly, by determining whether to parse cu_cbf based on whether or not MMVD is used, prediction accuracy and compression efficiency can be increased. For example, in a case of using MMVD, the decoder may not parse cu_cbf. If the MMVD is not used, the decoder may parse cu_cbf. In step S901, the decoder may parse cu_cbf when the MMVD flag is 0, and may not parse cu_cbf when the MMVD flag is 1.

In an embodiment of the present invention, when cu_cbf is not present, the decoder may infer the value of cu_cbf. According to the method described with reference to FIG. 8, the decoder may infer cu_cbf based on the value of cu_skip_flag. According to an embodiment of the present invention, the cu_cbf value may be inferred based on the merge flag. If the merge flag is 0, the decoder may infer the value of cu_cbf as 1. As an example, when the merge mode is not used, it may indicate that a syntax related to transform is present. Accordingly, in a case of using the MMVD in the embodiments of FIGS. 8 to 9, the decoder may infer the value of cu_cbf as 1. As an embodiment, the decoder may infer 1) the value of cu_cbf as 0 when the merge flag is 1 and the cu_skip_flag is 1, 2) the value of cu_cbf as 1 when the merge flag is 1 and the cu_skip_flag is 0, and 3) the value of cu_cbf as 1 when the merge flag is 0. Alternatively, in the embodiment as shown in FIG. 8, the decoder may infer 1) the value of cu_cbf as 0 when cu_skip_flag is 1, and 2) the value of cu_cbf as 1 when cu_skip_flag is 0.

According to another embodiment of the present invention, the cu_cbf value may be inferred based on the MMVD flag. When the MMVD flag is 1, cu_cbf may be inferred as 1. Further, when the MMVD flag is 0, cu_cbf may be inferred as 0 or 1. When combined with the inference method described in FIG. 28, 1) when the MMVD flag is 1, the value of cu_cbf may be inferred as 1, 2) when the MMVD flag is 0 and the cu_skip_flag is 1, the value of cu_cbf may be inferred as 0, and 3) when the MMVD flag is 0 and the cu_skip_flag is 0, the value of cu_cbf may be inferred as 1.

Further, as an embodiment, in the embodiments of FIGS. 8 to 9, the MMVD flag may be not present in a merge data (merge_data) syntax. The merge data syntax may be the merge data syntax shown in FIGS. 8 and 9.

FIG. 10 illustrates an example of a merge mode signaling method according to an embodiment of the present invention. In an embodiment of the present invention, the merge mode may be signaled based on a syntax element as shown in FIG. 10. Referring to FIG. 10, the merge mode is signaled based on at least one of a regular flag, an MMVD flag, a subblock flag, and/or a combined inter-picture merge and intra-picture prediction (CIIP) flag. In the present invention, CIIP indicates a prediction method combining inter prediction (e.g., merge mode inter prediction) and intra prediction, and may be referred to as multi-hypothesis prediction.

Referring to FIG. 10, tables (a) and (b) of FIG. 10 may indicate cases corresponding to a non-skip merge mode and a skip-merge mode, respectively. Unlike the merge data syntax of FIGS. 8 and 9 described above, a regular flag may be present in the embodiment of FIG. 10. For example, a triangle flag may be not present. The regular flag may be a syntax element indicating to use the conventional merge mode, and in the present invention, the regular flag may be referred to as a regular merge flag. The conventional merge mode may be the same merge mode as that used in HEVC. Further, the conventional merge mode may be a merge mode in which a candidate indicated by a merge index is used and motion compensation is performed without using MVD. In an embodiment, the regular flag, the MMVD flag, the subblock flag, and the CIIP flag may be signaled in a preset sequence. The MMVD flag denotes a syntax element indicating whether or not the MMVD is used. The subblock flag indicates a syntax element indicating whether a subblock mode, in which subblock-based prediction is performed, is used or not. The CIIP flag indicates a syntax element indicating whether the CIIP mode is applied.

In an embodiment of the present invention, the value of signaling for indicating whether or not to use a corresponding mode among the regular flag, MMVD flag, subblock flag, and CIIP flag may be 1 or less. Accordingly, when one among the regular flag, the MMVD flag, the subblock flag, and the CIIP flag has a value of 1, the encoder/decoder may determine that the values of flags acquired later in the decoding sequence are 0. Further, when the regular flag, the MMVD flag, the subblock flag, and the CIIP flag are all 0, a mode not indicated by the regular flag, the MMVD flag, the subblock flag, or the CIIP flag may be used. The mode not indicated by the regular flag, the MMVD flag, the subblock flag, and the CIIP flag may be triangle prediction. That is, as an embodiment, when the regular flag, the MMVD flag, the subblock flag, and the CIIP flag are all 0, it may be determined that the triangle prediction mode is applied.

FIG. 11 illustrates an example of a merge data syntax structure according to an embodiment of the present invention. FIG. 11 illustrates an example of a syntax structure in which syntax elements described with reference to FIG. 10 are used. In FIG. 11, "regular merge flag" refers to a regular merge flag. As an example, the regular merge flag may be the regular flag described above with reference to FIG. 10.

According to an embodiment of the present invention, the regular merge flag may come first in the merge data syntax. In step S1101, the decoder may first parse the regular merge flag in the merge data syntax. That is, the regular merge flag may be the first syntax element that is parsed after identifying that the merge flag is 1. In step S1102, the decoder may parse the MMVD flag when the regular merge flag is 0. In steps S1103, S1106, and S1105, when the regular merge flag is 0, the decoder may parse at least one of a subblock merge flag, a multi-hypothesis flag, and/or a triangle merge flag. In FIG. 11, merge_subblock_flag denotes a subblock merge flag indicating whether the subblock merge mode is applied or not, mh_intra_flag denotes a multi-hypothesis prediction flag indicating whether the multi-hypothesis prediction mode is applied or not, and merge_triangle_flag denotes a triangle merge flag indicating whether the triangle merge mode is applied or not.

Referring to FIG. 11, when the current block satisfies a predefined specific block size condition, the decoder may parse the MMVD flag. Further, in an embodiment, the triangle merge flag may be defined as (!regular_merge_flag && !MMVD flag && !merge_subbock_flag && !mh_intra_flag). That is, the triangle merge flag is 1 when all of the regular merge flag, MMVD flag, subblock merge flag, and multi-hypothesis prediction flag are 0, and when at least one of the regular merge flag, MMVD flag, subblock merge flag, and mh_intra_flag is 1, the triangle merge flag may be 0.

FIG. 12 illustrates a merge data syntax according to an embodiment of the present invention. FIG. 12 illustrates a syntax structure in which the syntax elements described above with reference to FIG. 10 are used. Referring to FIG. 12, in an embodiment of the present invention, the decoder may first parse the regular merge flag, and may parse the merge index when the parsed regular merge flag is 1 (S1201). Further, the decoder may parse the merge index when MaxNumMergeCand is greater than 1. Here, MaxNumMergeCand is a variable indicating the maximum number of merge candidates. Further, when the regular merge flag is 0, the decoder may parse at least one of the MMVD flag, the subblock merge flag, the multi-hypothesis flag, and/or the triangle merge flag. In an embodiment, the value of the triangle merge flag may be determined by the method described above with reference to FIGS. 10 and 11. That is, the triangle merge flag may be determined based on a flag value indicating whether another mode is applied. If the triangle merge flag is 1, the decoder may parse a syntax (or syntax element) related to triangle prediction. For example, when the triangle merge flag is 1, the decoder may parse the triangle merge index (i.e., merge_triangle_idx).

In a case of the embodiment of FIG. 11, a merge index required for the regular merge mode is present at the rear of the merge data syntax, and since MMVD flag, subblock merge flag, multi-hypothesis prediction flag signaling, for example, may be present between the regular merge flag and the merge index, signaling may be inefficient when the regular merge mode is used. However, in the embodiment of FIG. 12, when the regular merge flag is 1, the merge index may be parsed immediately after the regular merge flag, and thus there is no need to parse other signaling irrelevant to the regular merge mode. Accordingly, compression efficiency can be improved.

Further, according to an embodiment of the present invention, when multiple various prediction modes are used, whether to parse a specific prediction mode may be determined based on a prediction mode application condition. This will be described with reference to Table 2 below.

TABLE 2

```
If(A1 && A2 && A3 )
    mode_A_flag
If(mode_A_flag) {
    // mode A related syntax elements
} else {
    if(B1 && B2 && B3 )
        mode_B_flag
    if(mode_B_flag) {
        // mode B related syntax elements
    } else {
        // mode C related syntax elements
    }
}
```

Referring to Table 2, mode A, mode B, and mode C are assumed to be present as prediction modes. Further, it is assumed that only one prediction mode among mode A, mode B, and mode C is used for prediction. In addition, conditions for using mode A may be defined, and conditions for using mode A may be assumed to be A1, A2, and A3. In the present embodiment, when all conditions of A1, A2, and A3 are satisfied, the encoder/decoder may apply mode A. In addition, it is assumed that conditions for using mode B may be B1, B2, and B3. In the present embodiment, when all of conditions of B1, B2, and B3 are satisfied, the encoder/decoder may apply mode B. In addition, conditions for using mode C may be C1, C2, and C3, and when all conditions of C1, C2, and C3 are satisfied, the encoder/decoder may apply mode C. Signaling (or syntax element) indicating whether or not to use a predetermined prediction mode X (Mode X) may be mode_X_flag.

Referring to Table 2, the decoder may parse a related syntax in order to determine a prediction mode to be applied to a current block in a sequence of mode A, mode B, and mode C. Alternatively, the encoder may perform signaling in a sequence of mode_A_flag, mode_B_flag, and mode_C_flag, as shown in Table 2. If a condition for using mode A is satisfied, the decoder may parse mode_A_flag. If mode_A_flag is 1, the decoder may parse a syntax related to mode A, and may not parse flags related to the remaining modes and a syntax related thereto. If mode_A_flag is 0, there may be a possibility of using mode B or mode C. Accordingly, if a condition for using mode B is satisfied, the decoder may parse mode_B_flag. If mode_B_flag is 1, the decoder may parse a syntax related to mode B, and may not parse mode_X_flag related to the remaining modes (i.e., mode C) and a syntax related thereto. If mode_B_flag is 0, the decoder may determine to use mode C. That is, if all of mode_X_flags that do not correspond to mode C are 0, the decoder may determine to use the mode C. In addition, the decoder may parse a syntax related to the mode C.

In addition, according to an embodiment of the present invention, if multiple various prediction modes are used, whether to parse a specific prediction mode may be determined based on a condition of applying a prediction mode. This will be described with reference to Table 3 below.

TABLE 3

If((A1 && A2 && A3) && !((!B1 || !B2 || !B3) && (!C1 || !C2 | !C3)) )
  mode_A_flag
If(mode_A_flag) {
  // mode A related syntax elements
} else {
  if(B1 && B2 && B3 )
    mode_B_flag
  if(mode_B_flag) {
    // mode B related syntax elements
  } else {
    // mode C related syntax elements
  }
}

Referring to Table 3, as shown in Table 2 described above, mode A, mode B, and mode C may be defined as prediction modes, and a syntax element (i.e., mode_X_flag) indicating whether or not to use a prediction mode and/or a syntax element indicating related prediction mode information may be defined. In addition, conditions X1, X2, X3, and the like for using a predetermined mode X may be defined. As shown in Table 2 described above, whether to sequentially apply mode A, mode B, and mode C is determined, and if the determined mode is applied, a syntax element related to the corresponding prediction mode may be parsed.

Here, according to an embodiment of the present invention, when prediction modes, the use of which are determined later than that of a specific prediction mode, are all unusable, the encoder/decoder may determine to use the specific prediction mode above. Here, the decoder may not parse a flag indicating whether to apply the specific prediction mode (i.e., mode_X_flag when the specific prediction mode is mode X). In an embodiment, the non-usability of the prediction mode may be determined according to whether the aforementioned condition for using the prediction mode is satisfied. For example, if mode B and mode C, which are determined to be used at a relatively lower priority, are all unusable, the decoder may not parse mode_A_flag and may determine (or decide or infer) to use the mode A.

In Tables 2 and 3 described above, a case in which three prediction modes of mode A, mode B, and mode C are applied is assumed. However, the present invention is not limited to the number of prediction modes, and even if more prediction modes exist, a mode can be determined using the proposed method. For example, when mode A, mode B, mode C, and mode D are assumed to be usable, if the mode B, mode C, and mode D are all unusable, the decoder may determine to use mode A without performing separate signaling (or parsing). In addition, after determining not to use mode A, when mode C and mode D are all unusable, the decoder may determine to use mode B.

Referring to Table 3, a condition by which a predetermined prediction mode X (i.e., mode X) is non-usable may be a case in which at least one of conditions of X1, X2, and X3 is not satisfied. That is, in a case of !X1||!X2||!X3, mode X may not be usable. Therefore, a case in which mode B and mode C are all unusable may indicate a case of satisfying a condition ((!B1||!B2 ||!B3) && (!C1||!C2||!C3)). When this condition is satisfied, the decoder may not parse mode_A_flag, and may infer the value of mode_A_flag as 1. That is, the decoder may determine to use mode A. When the condition of ((·B1||!B2||!B3) && (!C1||!C2||!C3)) is not satisfied, the decoder may parse mode_A_flag. Here, the decoder may also consider a condition for using mode A. That is, the decoder may parse mode_A_flag if the condition of !((·B1||!B2||!B3) && (!C1 ||!C2||!C3)) is satisfied and in a case of (A1 && A2 && A3). In other words, when at least one of a condition for using mode B and a condition for using mode C is satisfied, the decoder may parse mode_A_flag. In a case of (B1 && B2 && B3) or (C1 && C2 && C3), the decoder may parse mode_A_flag.

Further, when mode_A_flag does not exist, in a case of (B1 && B2 && B3) or (C1 && C2 && C3), the decoder may infer the value of mode_A_flag as 0. Otherwise, the decoder may infer the value of mode_A_flag as 1. That is, if none of mode B and mode C are usable, when mode_A_flag does not exist, the decoder may infer the value of mode_A_flag as 1 (i.e., mode A is to be applied).

In Tables 2 and 3 above, it has been described under an assumption that mode A, mode B, and mode C, which are prediction modes, are selectively applied, and mode A, mode B, and mode C may be defined as specific prediction modes among various prediction modes proposed in the present invention. For example, each of mode A, mode B, and mode C may be defined as one of a regular merge mode, a CIIP mode, and a triangle merge mode. Alternatively, as described above, Tables 2 and 3 described above may be applied even when mode A, mode B, mode C, and mode D are defined. For example, each of mode A, mode B, mode C, and mode D may be defined as one of a regular merge mode, an MMVD mode, a CIIP mode, and a triangle merge mode.

FIG. 13 illustrates an example of a merge data syntax structure according to an embodiment of the present invention. According to an embodiment of the present invention, the method described in Table 2 and/or Table 3 may be applied to FIG. 13, and a related duplicate description will be omitted. Further, FIG. 13 may be an embodiment related to a regular merge flag as described in FIGS. 10 and 11.

As described above, according to an embodiment of the present invention, when modes, the use of which are determined relatively later than that of the specific mode in a sequence of a decoding process, are all unusable, the decoder may determine (or decide or infer) to use the specific mode without parsing signaling indicating whether or not to use the specific mode. For example, when modes, the use of which are determined relatively later than that of a subblock merge mode, are all unusable, the decoder may not parse signaling (or syntax element) indicating whether or not to use the subblock merge mode. Here, the decoder may determine to use the subblock merge mode without performing syntax parsing. For example, the modes, the use of which are determined relatively later, may include multi-hypothesis prediction and triangle prediction.

In an embodiment, in step S1301, if modes, the use of which are determined later than that of the MMVD, are all unusable, the decoder may not parse signaling indicating whether or not to use the MMVD, but may determine to use the MMVD. For example, the modes, the use of which are determined later, may include a subblock merge mode, multi-hypothesis prediction, and triangle prediction.

In addition, in the above-described embodiment, conditions (i.e., mh_intra_conditions in FIG. 13) by which multi-hypothesis prediction is usable may include at least one of 1) sps_mh_intra_enabled_flag, 2) cu_skip_flag[x0][y0]==0, and 3) a block size condition. As an example, the block size condition may be defined as ((cbWidth*cbHeight)>=64 && cbWidth<128 && cbHeight<128). Here, the sps_mh_intra_enabled_flag represents a syntax element indicating whether multi-hypothesis prediction is usable in the current sequence, for example, the syntax element may be signaled through a sequence parameter set (SPS). In addition, cbWidth and cbHeight are variables representing the width and the height of the current block (current coding block), respectively.

In addition, in the above-described embodiment, conditions by which triangle prediction (merge_triangle_conditions in FIG. 13) is usable may include at least one of 1) sps_triangle_enabled_flag, 2) tile_group_type (or slice_type)==B, and 3) a block size condition. As an example, the block size condition may be defined as (cbWidth*cbHeight>=64). Here, the sps_triangle_enabled_flag indicates a syntax element indicating whether triangle prediction is usable in the current sequence. For example, the syntax element may be signaled through SPS.

In addition, in the above-described embodiment, conditions (merge_subblock_conditions in FIG. 13) by which subblock merge is usable may include at least one of 1) MaxNumSubblockMergeCand>0, and 2) a block size condition. As an example, the block size condition may be defined as (cbWidth>=8 && cbHeight>=8). Here, MaxNumSubblockMergeCand is a variable indicating the maximum number of subblock merge candidates.

Accordingly, in an embodiment, the decoder may not parse the subblock merge flag in a case of (!mh_intra_conditions && !merge_triangle_conditions). In addition, when the subblock merge flag does not exist, the decoder may infer the subblock merge flag as 1 in a case of (!mh_intra_conditions && !merge_triangle_conditions). Otherwise, the decoder may infer the subblock merge flag as 0.

Further, in an embodiment, the decoder may not parse the MMVD flag in a case of (!merge_subblock_conditions && !mh_intra_conditions && !merge_triangle_conditions). Further, if the MMVD flag does not exist (!merge_subblock_conditions && !mh_intra_conditions && !merge_triangle_conditions), the decoder may infer the MMVD flag as 1. Otherwise the decoder may infer the MMVD flag as 0.

Further, in an embodiment, the decoder may not parse the subblock merge flag in a case of (!sps_mh_intra_enabled_flag && ! sps_triangle_enabled_flag), and may infer the value of subblock merge flag as 1. Alternatively, when cu_skip_flag is 1 and tile_group_type (slice_type) is not B, the decoder may not parse the subblock merge flag and may infer the value thereof as 1. Alternatively, if both the width and the height are equal to 128, and the tile_group_type is not B, the decoder may not parse the subblock merge flag, but may infer the value thereof as 1.

FIG. 14 illustrates an example of a merge data syntax structure according to an embodiment of the present invention. For the embodiment described with reference to FIG. 14, the details described above with reference to FIGS. 10 to 13 may be applied, and duplicate descriptions will be omitted for convenience of description. According to an embodiment of the present invention, a merge mode may include a regular merge mode, an MMVD, a subblock merge mode, a CIIP mode, a triangle merge mode (or a triangle partitioning mode (TPM)), and the like. Further, there may be a regular merge flag, an MMVD flag, a subblock merge flag, a CIIP flag, and a triangle merge flag, which are signaling (or syntax elements) indicating whether a mode is used (or applied), respectively. As described above, the prediction mode may include MODE_INTRA, MODE_IBC, and MODE_INTER. MODE_INTRA and MODE_IBC may be prediction modes using a current picture including a current block. Further, MODE_INTRA may be the intra prediction described above. MODE_IBC may be a prediction method using a motion vector or a block vector. MODE_INTER may be a prediction method using another picture, or may be the inter prediction described above.

When the current prediction mode is MODE_IBC and the merge flag is 1, the decoder may use only the regular merge mode (S1401). Further, here, the regular merge flag may not be parsed. The decoder may infer the regular merge flag as 1.

Further, according to an embodiment of the present invention, whether to parse a syntax element may be determined based on a block size. For example, whether to parse the syntax element may be determined based on the block size. For example, when syntax elements are signaled in a sequence of a first mode, a second mode, a third mode, a fourth mode, and a fifth mode, block size conditions by which the third mode, the fourth mode, and the fifth mode are usable may include a third condition, a fourth condition, and a fifth condition. If condition A, which is a condition satisfying none of the third, fourth, and fifth conditions, is satisfied, the decoder may infer to not use or parse syntax elements for the third, fourth, and fifth modes. Further, when condition A is satisfied, the decoder may make a determination based on a syntax element for the first mode without parsing a syntax element related to the second mode. Here, if it is determined and inferred to not use the first mode, the decoder may determine and infer to use the second mode. In addition, based on the determination, the decoder may parse a syntax element required to use the second mode.

According to an embodiment of the present invention, block size conditions, by which the subblock merge mode, the CIIP, and the triangle merge mode are usable, may be present. For example, the embodiment may be the same as those described in the embodiment of FIG. 13. Therefore, 4×4, 8×4, and 4×8 size blocks may not use the subblock merge mode, the CIIP, or the triangle merge mode. Therefore, in a case of blocks of 4×4, 8×4, and 4×8 sizes, when the merge flag is 1, only the regular merge mode and the MMVD are usable. Therefore, here, the decoder may not parse the MMVD flag. Further, here, the decoder may determine or infer the MMVD flag value based on the regular merge flag.

In an embodiment, the decoder may not perform inter prediction for a 4×4 block. Therefore, in the following embodiments, description can be made without including conditions related to the 4×4 block, but the embodiment of the present invention can be applied even when 4×4 inter prediction is possible.

Referring to FIG. 14, when cbWidth and cbHeight are equal to 8 and 4, or 4 and 8, respectively, the decoder may not parse the MMVD flag, the subblock merge flag, or the multi-hypothesis prediction flag (S1402, S1403, and S1404). Further, although not shown in FIG. 14, even if both cbWidth and cbHeight are equal to 4, the decoder may not parse the MMVD flag, the subblock merge flag, or the multi-hypothesis prediction flag. In addition, here, other MMVDs, subblock merge mode, CIIP, and triangle related syntax elements may not be parsed.

Further, in the present invention, cbWidth and cbHeight may be equal to 4 and 8, or 8 and 4, respectively, and thus the sum of cbWidth and cbHeight is equal to 12. That is, when the sum of cbWidth and cbHeight is equal to or less than 12, the MMVD flag, subblock merge flag, and mh_intra_flag may not be parsed. Further, the present invention can be applied when the prediction mode is MODE_INTER.

According to an embodiment of the present invention, higher level signaling indicating whether or not MMVD is usable may be present. Higher level signaling may be signaling in a unit including a current block. For example, a higher level of the current block may be a CTU, a sequence, a picture, a slice, a tile, a tile group, and the like. For example, higher-level signaling (or syntax element) indicating whether or not MMVD is usable may be SPS-level signaling. For example, higher level signaling indicating whether or not MMVD is usable may be sps_mmvd_enabled_flag. The higher level signaling indicating whether or not MMVD is usable may indicate whether or not to use MMVD. If the higher level signaling indicating whether or not the MMVD is usable is 0, the decoder may not parse the MMVD-related syntax element. In addition, when the higher level signaling indicating whether the MMVD is usable is 0, the decoder may infer the MMVD flag as 0. When the higher level signaling indicating whether the MMVD is usable is 1, the MMVD flag may be 1 or 0 depending on a block.

Further, in an embodiment, the subblock merge mode related syntax element may include a subblock merge flag and a subblock merge index. The subblock merge mode may include a subblock-based temporal motion vector (SbTMVP) and an affine motion compensation mode. In addition, the CIIP-related syntax element may include mh_intra_flag (CIIP flag), and an index indicating a candidate of an inter prediction part of CIIP. The index indicating a candidate of the inter prediction part of CIIP may be a merge index. As described above, the CIIP may be a method of performing prediction based on a prediction signal generated from the current picture and a prediction signal generated from another reference picture, and may be referred to as multi-hypothesis prediction.

Further, according to an embodiment, the syntax element related to the triangle merge mode may include merge_triangle_split_dir, merge_triangle_idx0, and merge_triangle_idx1. The triangle merge mode may be a prediction method (or prediction mode) in which the current block is divided into two parts and the two parts use different pieces of motion information. In addition, each of the two parts may have a predetermined polygonal shape rather than a rectangular shape. The present invention is not limited to these names, and the triangle merge mode may have various other names. Further, merge_triangle_split_dir may be a syntax element indicating division of the two parts. Further, merge_triangle_idx0 and merge_triangle_idx1 may be syntax elements indicating motion information used by the two parts, respectively.

According to an embodiment of the present invention, there may be a case where the MMVD flag does not exist. For example, as described with reference to FIG. 14, there may be a case in which the MMVD flag does not exist according to higher-level signaling indicating whether MMVD is usable or not, a block size condition, and the like. In the embodiment below, a method for performing inference when the MMVD flag does not exist may be described. According to an embodiment of the present invention, when specific conditions are satisfied, the decoder may infer the MMVD flag as 1. Further, when at least one of the specific conditions is not satisfied, the decoder may infer the MMVD flag as 0.

In an embodiment, the specific condition may include a case in which higher-level signaling (or syntax element) indicating whether or not MMVD is usable has a value of 1. As described above, the higher level signaling may be included in one of SPS, PPS, slice header, tile group header, and CTU. Further, the specific condition may include a block size condition. For example, the specific condition may include a case in which the block size is 4×8, 8×4, or 4×4. That is, the specific case may include a case in which a summation of cbWidth and cbHeight is equal to or less than 12. If 4×4 inter prediction is not allowed, a case in which the block size is 4×4 may be excluded. Further, the specific condition may include a case in which the regular merge flag is 0. Further, the specific condition may include a case in which the merge flag is 1.

Further, in an embodiment, in a case where an MMVD flag does not exist, the encoder/decoder may infer the MMVD flag as 1, if 1) sps_mmvd_enabled_flag is 1, 2) a summation of cbWidth and cbHeight is equal to 12, and 3) the regular merge flag is 0. Further, if at least one of 1), 2), and 3) is not satisfied, the encoder/decoder may infer the MMVD flag as 0.

Further, according to an embodiment of the present invention, when a regular merge flag does not exist, the decoder may infer the value of the regular merge flag according to a predefined condition. In an embodiment, the decoder may infer the regular merge flag based on a prediction mode of a current block. For example, the decoder may infer the regular merge flag based on a CuPredMode value. For example, the decoder may infer the regular merge flag as 1 when the CuPredMode value is MODE_IBC. Further, the decoder may infer the regular merge flag as 0 when the CuPredMode value is MODE_INTER.

According to an additional embodiment, the decoder may infer the value of a regular merge flag based on the merge flag. For example, when the merge flag is 1 and CuPredMode is MODE_IBC, the decoder may infer the regular merge flag value as 1. Further, when the merge flag is 0, the regular merge flag value may be inferred as 0.

FIG. 15 illustrates a merge data syntax structure according to an embodiment of the present invention. The embodiment of FIG. 15 may be another embodiment related to the embodiments described with reference to FIGS. 10 to 13. As described above, in an embodiment of the present invention, a plurality of modes may be defined as a merge mode. Further, in a case of signaling a predetermined mode to be used, whether to use the predetermined mode, whether to parse signaling indicating whether or not to use the predetermined mode, or a signaling inference method indicating whether or not to use the predetermined mode may be determined based on the signaling sequence for multiple modes and conditions by which multiple modes are usable.

According to an embodiment of the present invention, the decoder may determine whether to parse signaling indicating whether to use a first mode, based on higher-level signaling indicating whether a second mode is usable or not. Further, the decoder may infer a signaling value indicating whether to use a first mode, based on higher level signaling indicating whether a second mode is usable or not. Here, the second mode may be a mode, the use of which is determined later than that of the first mode.

In a more specific embodiment, the decoder may determine whether to parse the regular merge flag based on higher level signaling indicating whether the MMVD is usable or not. Further, the decoder may infer (or determine) a regular merge flag value based on higher-level signaling indicating whether the MMVD is usable or not. Referring to FIG. 15, as an example, when sps_mmvd_enabled_flag is 1, the decoder may parse the regular merge flag (S1501).

Further, in an embodiment, it is possible to determine whether to parse signaling indicating whether to use a specific mode, based on the size of the current block. Further, a signaling value indicating whether a specific mode is usable or not may be inferred based on the size of the current block. According to an embodiment, even when signaling indicating whether to use a specific mode is not parsed based on the size of the current block, there may be a case in which the specific mode is used. That is, the signaling value indicating whether to use the specific mode may be inferred to be 1.

In a more specific embodiment, the decoder may determine whether to parse the regular merge flag based on the size of the current block. For example, the decoder may determine whether to parse the regular merge flag based on information as to whether the size of the current block is greater than 4×8 or 8×4. A block size larger than 4×8 or 8×4 may have a sum of width and height greater than 12. Referring to FIG. 15, when the sum of cbWidth and cbHeight is greater than 12, the regular merge flag may be parsed (S1501). In addition, there may be a mode, the use of which is restricted in block sizes of 4×8 and 8×4 or less.

According to an embodiment of the present invention, when all of a plurality of conditions are satisfied, signaling indicating whether or not to use a specific mode may not be parsed. Further, here, signaling indicating whether to use a specific mode may be inferred as 1. Signaling indicating whether to use a specific mode is 1 may indicate that the specific mode is used. As an embodiment, the plurality of conditions may include a condition related to higher-level signaling indicating whether a second mode different from the first mode is usable. For example, the plurality of conditions may include a condition in which higher level signaling indicating whether a second mode different from the first mode is usable has the value of 0. Here, the second mode may be a mode, the use of which is determined later than that of the first mode, or may be a mode, the related syntax element of which is present later than that of the first mode.

In a more specific embodiment, signaling indicating whether a decoder uses a specific mode may be a regular merge flag. In addition, the plurality of conditions may be a case in which a higher level signaling value indicating whether MMVD is usable is 0. In addition, the plurality of conditions may include a condition related to a block size. For example, the plurality of conditions may include a condition in which the block size is equal to or less than a threshold. Under a condition in which the block size is equal to or less than a threshold, one or more other modes, the use of which is determined later than that of the specific mode or the related syntax elements of which exist at the rear thereof, may be unusable.

More specifically, signaling indicating whether or not to use a predetermined mode may be a regular merge flag. In addition, the plurality of conditions may include a case in which the sum of the width and height of the current block is 12 or less. Alternatively, the plurality of conditions may include a case in which the size of the current block is 4×8 or 8×4. Further, when 4×4 inter prediction is possible, the plurality of conditions may include a case in which the current block size is 4×8, 8×4, or 4×4.

Therefore, according to an embodiment, when the higher-level signaling value indicating whether MMVD is usable is 0 and the current block size is 4×8 or 8×4, the regular merge flag may not be parsed. Further, here, the regular merge flag value may be inferred as 1. In addition, when the higher-level signaling value indicating whether MMVD is usable is 1 or the current block size is greater than 4×8 or 8×4, the regular merge flag may be parsed.

In step S1501, if sps_mmvd_enabled_flag is 1 or cbWidth+cbHeight>12, the decoder may parse the regular merge flag. Further, if not, that is, if sps_mmvd_enalbed_flag is 0 and cbWidth+cbHeight<=12, the regular merge flag may not be parsed.

The embodiments as described above with reference to FIGS. 10 to 13 may be related to usability conditions of modes related to syntax elements existing after the regular merge flag. For example, when signaling is performed or the use of mode is determined in a sequence of regular merge mode, MMVD, subblock merge mode, CIIP, and triangle merge mode, higher-level signaling indicating whether MMVD is usable in the above-described embodiment is 0, and thus the decoder may not use the MMVD. Further, the decoder may not use the subblock merge mode, the CIIP, or the triangle merge mode when the block size is equal to or less than a threshold. Therefore, when all of these conditions are satisfied, the decoder may determine to use the regular merge mode without additional signaling. Additionally, the present embodiment can be applied to a case of MODE_INTER.

In an embodiment of the present invention, when predefined specific conditions are satisfied as shown in FIG. 15, there may be a case where a regular merge flag is not parsed, and in such a case, the decoder may infer the value of the regular merge flag as 1. For example, when the higher-level signaling value indicating whether MMVD is usable is 0 and the block size is 4×8 or 8×4, the decoder may infer the value of the regular merge flag as 1. Further, this may be performed when the merge flag is 1. Further, this may be performed when CuPredMode is MODE_INTER. If the higher level signaling value indicating whether the MMVD is usable is 1 or the block size is greater than 4×8 or 8×4, the decoder may infer the regular merge flag value as 0.

As an example, when the regular merge flag does not exist, the decoder may infer the regular merge flag according to the following conditions. Specifically, when sps_mmvd_enabled_flag is 0 and cbWidth+cbHeight==12, the decoder may infer the regular merge flag as 1. Here, if 4×4 inter prediction is allowed, the condition of cbWidth+cbHeight==12 may be changed to cbWidth+cbHeight<=12. Otherwise, the decoder may infer the regular merge flag as 0.

In an embodiment of the present invention, when the triangle merge flag, the affine inter flag, and the subblock merge flag are all 0, the same motion information may be used for the entire current block. For this case, the following motion information derivation process may be performed. Further, here, if one or more conditions are satisfied, the decoder may set dmvrFlag to 1.
   if sps_dmvr_enabled_flag is 1
   if merge flag[xCb][yCb] is 1
   if predFlagL0[0][0] and predFlagL1[0][0] are 1
   When mmvd_flag[xCb][yCb] is 1
   When DiffPicOrderCnt(currPic, RefPicList[0][refIdxL0]) and DiffPicOrderCnt(RefPicList[1][refIdxL1], currPic) are the same
   if cbHeight is equal to or greater than 8
   if cbHeight*cbWidth is equal to or greater than 64

Further, the motion information derivation process may be performed for a block having a size of 4×8 or 8×4. If bi-prediction is used for a 4×8 or 8×4 block, the decoder may switch bi-prediction to uni-prediction.

Further, in an embodiment of the present invention, when the merge flag is 1 and the regular merge flag is 1, the same motion information may be used for the entire current block. Alternatively, when the merge flag is 1 and the MMVD flag is 1, the same motion information may be used for the entire current block. Alternatively, when the merge flag is 1 and the CIIP flag is 1, the same motion information may be used for the entire current block. Alternatively, when the merge flag is 0 and inter_affine_flag is 0, the same motion information may be used for the entire current block. Here, a motion information derivation process for this case may be performed. Further, here, if one or more of the predefined conditions are satisfied, the decoder may set dmvrFlag to 1. Here, the conditions of the above-described embodiment may be applied. In addition, the motion information derivation process may be performed for a 4×8 or 8×4 block. If bi-prediction is used for a 4×8 or 8×4 block, the decoder may switch bi-prediction to uni-prediction.

According to an embodiment of the present invention, CIIP may be the last determined or signaled mode among merge modes. For example, a determination may be made in a sequence of regular merge mode, MMVD, subblock merge mode, triangle merge mode, and CIIP. Here, when a condition by which CIIP is usable is not satisfied, the decoder may determine a corresponding mode without parsing signaling indicating whether or not to use a mode determined first in the decoding sequence (or syntax parsing sequence). For example, here, the decoder may not parse signaling indicating whether or not to use a mode immediately before the CIIP. Further, here, the decoder may determine to use the mode immediately before the CIIP. For example, this case may include a case in which cu_skip_flag is 1. Alternatively, this case may be a case in which cbWidth has the value of 128 or more or a case in which cbHeight has the value of 128 or more. Alternatively, this case may include a case in which higher-level signaling indicating whether the CIIP is usable or not, for example, sps_ciip_enabled_flag is 0.

FIG. 16 illustrates a merge data syntax structure according to an embodiment of the present invention. In relation to embodiments of FIGS. 16 to 19, the embodiments described with reference to FIGS. 10 to 13 may be applied, and a related duplicate description will be omitted. As described above, among the merge modes, the CIIP may be the last determined or signaled mode. Accordingly, the decoder may determine whether to use CIIP without parsing a CIIP flag. For example, if none of modes signaled before CIIP are used, the decoder may determine to use the CIIP. Further, the CIIP flag may be a value derived from another signaling (or syntax element).

According to an embodiment of the present invention, multiple pieces of signaling indicating whether or not to use a mode may be present. Referring to FIG. 16, signaling indicating whether or not to use a mode may include a regular merge flag, an MMVD flag, a subblock merge flag, and a triangle merge flag. Further, parsing of the regular merge flag, the MMVD flag, the subblock merge flag, and the triangle merge flag may be present. For example, when the merge flag value is 1, signaling indicating whether or not to use the mode may be parsed. Alternatively, when CuPredMode is MODE_INTER, signaling indicating whether or not to use the mode may be parsed. Further, when the merge flag value is 1, the decoder may parse the regular merge flag.

Further, when the regular merge flag value is 0, the decoder may parse the MMVD flag. Further, when the value of sps_mmvd_enabled_flag is 1, the decoder may parse the MMVD flag. Further, the decoder may parse the MMVD flag when the block size condition is satisfied. For example, if the block size is not 4×8, 8×4, and 4×4, the MMVD flag may be parsed.

Further, when the regular merge flag value is 0, the subblock merge flag may be parsed. Further, when the MMVD flag value is 0, the subblock merge flag may be parsed. Further, when the block size condition is satisfied, the subblock merge flag may be parsed. For example, when the block size is 8×8 or more, the subblock merge flag may be parsed. Further, when the maximum number of subblock merge candidates is greater than 0, the subblock merge flag may be parsed. For example, a case in which the maximum number of subblock merge candidates is greater than 0 may indicate that at least one of pieces of higher-level signaling regarding whether to use a candidate that can be included in the subblock merge candidate list is usable. For example, when sps_affine_enabled_flag or sps_sbtmvp_enabled_flag is 1, the maximum number of subblock merge candidates may be greater than 0.

Further, when the regular merge flag value is 0, the triangle merge flag may be parsed. Further, when the MMVD flag value is 0, the triangle merge flag may be parsed. Further, when the subblock merge flag value is 0, the triangle merge flag may be parsed. Further, when the block size condition is satisfied, the triangle merge flag may be parsed. For example, the triangle merge flag may be parsed when the block size satisfies a condition (width*height>=64). Further, when a slice type is B, the triangle merge flag may be parsed. For example, the slice type of B may denote that two or more pieces of motion information is usable when predicting one sample. Further, when the sps_triangle_enabled_flag value is 1, the decoder may parse the triangle merge flag. Further, if a condition based on the maximum number of triangle merge candidates (MaxNumTriangleMergeCand) is satisfied, the triangle merge flag may be parsed. For example, when the maximum number of triangle merge candidates is 2 or more, the decoder may parse the triangle merge flag. The maximum number of triangle merge candidates may be the maximum number (or length) of candidates of a candidate list usable in the triangle merge mode.

When the above-described parsing conditions are satisfied, the decoder may parse signaling. That is, signaling may not be parsed unless one of the above conditions that enable parsing is satisfied. Further, the decoder may perform inference when signaling is not parsed. For example, if one of the above-mentioned conditions that enable parsing is not satisfied, a signaling value may be inferred as 0. As another example, if one of the above-mentioned conditions that enable parsing is not satisfied, when signaling regarding whether to use the first mode is 0, the value of signaling regarding whether to use a second mode may be inferred as 1. As another example, if one of the above-mentioned conditions that enable parsing is not satisfied, when signaling regarding whether to use the first mode is 1, the value of signaling regarding whether to use the second mode may be inferred as 0.

Further, according to an embodiment of the present invention, when a CIIP flag does not exist, the decoder may infer the value thereof. For example, the value to be inferred may be determined based on a value of signaling regarding whether to use one or more modes. The signaling regarding whether to use the mode may include signaling regarding whether to use modes determined before determining whether to use CIIP. For example, the signaling regarding whether to use a mode may include signaling regarding whether to use the regular merge mode, signaling regarding whether to use MMVD, signaling regarding whether to use the subblock merge mode, and signaling regarding whether to use the triangle merge mode. In addition, the signaling regarding whether to use a mode may include signaling regarding whether to use the merge mode.

According to an embodiment, when all of the values of signaling regarding whether to use one or more modes are 0, the decoder may infer the CIIP flag value as 1. The signaling regarding whether to use one or more modes may include a regular merge flag, an MMVD flag, a subblock merge flag, and a triangle merge flag. Therefore, if the regular merge flag==0 && MMVD flag==0 && subblock merge flag==0 && triangle merge flag==0, the CIIP flag value may be inferred as 1. Further, if not, the CIIP flag value may be inferred as 0.

According to an embodiment, when all of the values of signaling regarding whether to use one or more modes are 0 and the merge flag is 1, the decoder may infer the CIIP flag value as 1. The signaling regarding whether to use one or more modes may include a regular merge flag, an MMVD flag, a subblock merge flag, and a triangle merge flag. Therefore, if the regular merge flag==0 && MMVD flag==0 && subblock merge flag==0 && triangle merge flag==0 && merge flag==1, the decoder may infer the CIIP flag value as 1. Further, if not, the decoder may infer the CIIP flag value as 0. In addition, an indication that the value of signaling regarding whether to use a mode is 1 may indicate that the mode is used, and an indication that the value of signaling regarding whether to use a mode is 0 may indicate that the mode is not used.

FIG. 17 illustrates a merge data syntax structure according to an embodiment of the present invention. The embodiment of FIG. 17 may be an efficient signaling method based on the embodiment of FIG. 16, and a duplicate description thereof will be omitted. As described above, the CIIP may be the last determined or signaled mode among the merge modes.

According to an embodiment, here, the signaling method described with reference to FIGS. 10 to 13 may be used. The embodiment of FIGS. 17 to 19 may be a specific embodiment of the method described with reference to FIGS. 10 to 13.

According to an embodiment of the present invention, when the use of mode is determined or signaling is performed in a sequence of mode A, mode B, mode C, and mode D, conditions by which mode D is non-usable may be present. If at least one of the conditions by which mode D is non-usable is satisfied, the decoder may not parse signaling regarding whether to use mode C. In addition, if signaling regarding whether to use mode C does not exist, the decoder may infer the value thereof. Here, the value to be inferred may be based on a condition by which mode D is non-usable, signaling regarding whether to use mode A, and signaling regarding whether to use mode B. In addition, when none of the conditions by which mode D is non-usable are satisfied, signaling regarding whether to use mode C may be parsed. Alternatively, when some of conditions by which mode D is non-usable are not satisfied, the decoder may parse signaling (or syntax element) regarding whether or not to use the mode C. When there are multiple conditions by which mode D is non-usable, only some of the above conditions may be usable in the signaling method of the present invention. For example, only some conditions may be used in order to reduce conditions needing to be checked when determining whether to parse signaling regarding whether to use mode C.

According to one embodiment, mode D may be CIIP. In addition, mode A, mode B, and mode C may be the MMVD, the subblock merge mode, and the triangle merge mode, respectively, and here, it is also possible to configure mode A, mode B, and mode C in a different sequence. FIGS. 17 to 19 are assuming that mode A, mode B, and mode C are the MMVD, the subblock merge mode, and the triangle merge mode, respectively. According to an embodiment, a condition by which mode D is non-usable may be based on higher level signaling indicating whether mode D is usable. Further, the condition by which mode D is non-usable may be based on a block size. Further, the condition by which mode D is non-usable may be based on cu_skip_flag. In addition, the condition by which mode D is non-usable may be based on a tile group (or slice) type. In addition, the condition by which mode D is non-usable may be based on the maximum number of candidates that is usable in mode D.

Referring to FIG. 17, conditions by which CIIP is non-usable may include a case in which sps_ciip_enabled_flag is 0, a case in which cu_skip_flag is 1, a case in which cbWidth has the value of 128 or more, and a case in which cbHeight has the value of 128 or more. Therefore, according to an embodiment of the present invention, when sps_ciip_enabled_flag is 0, cu_skip_flag is 1, cbWidth has the value of 128 or more, or cbHeight has the value of 128 or more, signaling regarding whether or not to use mode C may not be parsed. That is, in the embodiment of FIG. 17, when sps_ciip_enabled_flag is 0, cu_skip_flag is 1, cbWidth has the value of 128 or more, or cbHeight has the value of 128 or more, the triangle merge flag may not be parsed. In addition, when sps_ciip_enabled_flag is 1, cu_skip_flag is 0, cbWidth has the value less than 128, and cbHeight has the value less than 128, signaling regarding whether to use mode C may be parsed. That is, in the embodiment of FIG. 17, when sps_ciip_enabled_flag is 1, cu_skip_flag is 0, cbWidth has the value less than 128, and cbHeight has the value less than 128, the triangle merge flag may be parsed.

In addition, when determining whether to parse signaling regarding whether to use mode C, a condition by which mode C is usable may be additionally considered. For example, when a condition by which mode C is usable is satisfied, signaling (or a syntax element) regarding whether or not to use mode C may be parsed. Referring to FIG. 16, conditions by which the triangle merge mode is usable may include a condition in which the value of sps_triangle_enabled_flag is 1, a condition in which tile_group_type is B, and a condition in which cbWidth*cbHeight>=64.

In an embodiment of the present invention, an example of an inference method related to the embodiment described with reference to FIG. 17 will be described. The present embodiment may be a method of inferring signaling regarding whether or not to use mode C described with reference to FIG. 17. Further, when signaling regarding whether to use mode C does not exist, signaling regarding whether to use mode C may be inferred.

In the embodiment of FIG. 17, when at least one of conditions by which mode D is non-usable is not satisfied, signaling regarding whether to use mode C may not be parsed. According to an embodiment of the present invention, when a plurality of conditions are satisfied, the value of signaling regarding whether to use mode C may be inferred as 1. For example, the value of 1 may indicate that mode C is used, and the value of 0 may indicate that mode C is not used. In addition, the plurality of conditions may include a condition satisfying at least one of the conditions by which mode D is non-usable. In addition, the plurality of conditions may include a condition by which mode C is usable. In addition, the plurality of conditions may include conditions based on signaling regarding whether to use mode A and mode B. For example, the plurality of conditions may include a case in which signaling regarding whether to use mode A and mode B indicates that none of mode A and mode B are used. In addition, when at least one of the plurality of conditions is not satisfied, the decoder may infer the value of signaling regarding whether or not to use mode C to be 0.

In an embodiment of the present invention, the decoder may infer a triangle merge flag value based on a predefined condition. As an example, the decoder may infer the triangle merge flag value as 1 when sps_ciip_enabled_flag is 0, cu_skip_flag is 1, cbWidth has the value of 128 or more, or cbHeight has the value of 128 or more. For example, the decoder may infer the triangle merge flag value as 1 only when sps_ciip_enabled_flag is 0, cu_skip_flag is 1, cbWidth has the value of 128 or more, or cbHeight has the value of 128 or more. In addition, in order to infer the triangle merge flag value as 1, an additional condition may need to be satisfied. For example, the additional condition may include a condition by which the regular merge flag is 0, a condition in which the MMVD flag is 0, and a condition in which the subblock merge flag is 0. Further, the additional condition may include a condition in which the merge flag is 1. Further, the additional condition may include a condition in which sps_triangle_enabled_flag is 1, a condition in which tile_group_type is B, and a condition in which cbWidth*cbHeight>=64. Further, when all of additional conditions are satisfied, the triangle merge flag value may be inferred as 1.

In an embodiment, the triangle merge flag value may be inferred to be 1 when all of the following conditions are satisfied.
1) regular merge flag==0
2) MMVD flag==0
3) subblock merge flag==0
4) sps_ciip_enabled_flag==0||cu_skip_flag==1||cbWidth>=128||cbHeight>=128
5) sps_triangle_enabled_flag==1 && tile_group_type==B && cbWidth*cbHeight>=64

Alternatively, in another embodiment, when all of the following conditions are satisfied, the triangle merge flag value may be inferred to be 1.
1) regular merge flag==0
2) MMVD flag==0
3) subblock merge flag==0
4) sps_ciip_enabled_flag==0 cu_skip_flag==1||cbWidth>=128||cbHeight>=128
5) sps_triangle_enabled_flag==1 && tile_group_type==B && cbWidth*cbHeight>=64
6) merge flag==1

Further, in an embodiment, when one of the above-described conditions is not satisfied, the triangle merge flag value may be inferred to be 0. For example, when sps_ciip_enabled_flag is 1, cu_skip_flag is 0, cbWidth<128, and cbHeight<128, the triangle merge flag value may be inferred to be 0. Alternatively, when the regular merge flag is 1, the triangle merge flag value may be inferred to be 0. Alternatively, when the MMVD flag is 1, the triangle merge flag value may be inferred to be 0. Alternatively, when the subblock merge flag is 1, the triangle merge flag value may be inferred to be 0. Alternatively, when sps_triangle_enabled_flag is 0, tile_group_type is not B, or cbWidth*cbHeight<64, the triangle merge flag value may be inferred to be 0. Alternatively, when the merge flag is 0, the triangle merge flag value may be inferred to be 0.

FIG. 18 illustrates a merge data syntax structure according to an embodiment of the present invention. The embodiment of FIG. 18 may be a specific embodiment of the method described with reference to FIG. 17. In the description of FIG. 17, when determining whether to parse signaling regarding whether or not to use mode C, only some conditions may be used in order to reduce conditions needing to be checked as described above. For example, the embodiment of FIG. 18 may be a method of not checking sps_ciip_enabled_flag in FIG. 17.

For example, when cu_skip_flag is 1, cbWidth>=128, or cbHeight>=128, the decoder may not parse the triangle merge flag. Further, here, the decoder may infer the triangle merge flag value as 1. Alternatively, the decoder may infer the triangle merge flag value as 1 only when this condition is satisfied. Further, as described above, when an additional condition is satisfied, the decoder may infer the triangle merge flag value to be 1. Further, when cu_skip_flag is 0, cbWidth<128, and cbHeight<128, the decoder may parse the triangle merge flag. Further, when cu_skip_flag is 0, cbWidth<128, and cbHeight<128, if the triangle merge flag does not exist, the decoder may infer the value to be 0.

The present embodiment may have the advantage of reducing operations of checking conditions in the syntax element parsing process compared to that of the embodiment of FIG. 17 described above. As mentioned above, when the mode signaling sequence is configured differently, the present invention can be applied to another signaling instead of the triangle merge flag.

FIG. 19 illustrates an example of a merge data syntax structure according to an embodiment of the present invention. The embodiment of FIG. 19 may be a specific embodiment of the method described with reference to FIG. 17. In the description with reference to FIG. 17, it has been mentioned that only some conditions are used in order to reduce conditions needing to be checked when determining whether to parse signaling regarding whether or not to use mode C, and FIG. 19 may illustrate the description relating to FIG. 17. For example, the embodiment of FIG. 19 may be a method of not checking sps_ciip_enabled_flag in FIG. 17, and may be a method of not checking whether cbWidth has the value less than 128 and whether cbHeight has the value less than 128.

For example, when cu_skip_flag is 1, the decoder may not parse the triangle merge flag. Further, here, the decoder may infer the triangle merge flag value to be 1. Alternatively, the decoder may infer the triangle merge flag value to be 1 only when this condition is satisfied. In addition, the decoder may infer the triangle merge flag value to be 1 when an additional condition is satisfied as described above. Further, when cu_skip_flag is 0, a triangle merge flag may be parsed. Further, when cu_skip_flag is 0, the decoder may infer the value to be 0 if the triangle merge flag does not exist.

The present embodiment may have the advantage of reducing operations of checking conditions in the syntax element parsing process compared to that of the embodiment of FIG. 17 described above. As mentioned above, when the mode signaling sequence is configured differently, the present invention can be applied to another signaling instead of the triangle merge flag.

FIG. 20 illustrates an example of a merge data syntax structure according to an embodiment of the present invention. The embodiment of FIG. 20 may be a specific embodiment of the method described with reference to FIG. 17. FIGS. 20 to 24 may be specific embodiments of the invention described above. For example, the embodiments of FIGS. 20 to 24 may be related to the embodiments described with reference to FIGS. 10 to 13, and a related duplicate description will be omitted.

Referring to FIG. 20, signaling indicating whether or not to use MMVD in the invention described with reference up to FIG. 20 may be mmvd_merge_flag. That is, in the embodiment described above, the MMVD flag may be referred to as mmvd_merge_flag in the following description. Further, in the invention described with reference up to FIG. 20, signaling indicating base candidates of the MMVD may be mmvd_cand_flag. That is, the previously mentioned mmvd_merge_flag may correspond to mmvd_cand_flag up to FIG. 20. Further, features regarding the slice type can be applied to a tile group type, and vice versa. Further, values indicating the slice type and the tile group type may be slice_type and tile_group_type, respectively. Further, signaling indicating whether or not to use the merge mode described above may be general_merge_flag. That is, a description, which has been made relating to the merge flag, may be related to general_merge_flag, and a description relating to general_merge_flag may be applied to the merge flag.

According to an embodiment of the present invention, the last signaled mode among various merge modes may be a subblock merge mode. As described above, the various merge modes may include a regular merge mode, an MMVD, a CIIP, a triangle merge mode, a subblock merge mode, and the like. In addition, the triangle merge mode may be signaled immediately before the subblock merge mode among various merge modes.

Referring to FIG. 20, the encoder/decoder may perform signaling/parsing in a sequence of regular merge mode, MMVD, CIIP, triangle merge mode, and subblock merge mode in a merge data syntax. According to an embodiment of the present invention, whether to parse the regular merge flag may be determined based on general_merge_flag. In this specification, general_merge_flag may be referred to as a general_merge_flag. According to an embodiment of the present invention, when the general_merge_flag is 1, the regular merge flag can be parsed. Here, additional conditions for parsing may be required. In addition, when general_merge_flag is 0, the regular merge flag may not be parsed. Here, if general_merge_flag is 0, the regular merge flag may not be parsed regardless of other conditions. According to an embodiment of the present invention, when general_merge_flag is 1, the part of the merge data structure of FIG. 20 may be parsed.

According to an embodiment of the present invention, the decoder may determine whether to parse mmvd_merge_flag based on general_merge_flag. According to an embodiment of the present invention, when general_merge_flag is 1, mmvd_merge_flag may be parsed. Here, additional conditions for parsing may be required. Further, when general_merge_flag is 0, mmvd_merge_flag may not be parsed. Here, if the general_merge_flag is 0, the mmvd_merge_flag may not be parsed regardless of other conditions.

According to an embodiment of the present invention, whether to parse the CIIP flag may be determined based on general_merge_flag. According to an embodiment of the present invention, when general_merge_flag is 1, parsing of the CIIP flag may be possible. Here, additional conditions for parsing may be required. Further, when general_merge_flag is 0, the CIIP flag may not be parsed. Here, if general_merge_flag is 0, the CIIP flag may not be parsed regardless of other conditions.

According to an embodiment of the present invention, whether to parse the triangle merge flag may be determined based on general_merge_flag. According to an embodiment of the present invention, when general_merge_flag is 1, parsing of the triangle merge flag may be possible. Here, additional conditions for parsing may be required. Further, when general_merge_flag is 0, the triangle merge flag may not be parsed. Here, if general_merge_flag is 0, the triangle merge flag may not be parsed regardless of other conditions.

According to an embodiment of the present invention, the decoder may determine whether to parse mmvd_merge_flag based on the regular merge flag. According to an embodiment of the present invention, parsing of mmvd_merge_flag is possible when the regular merge flag is 0. Here, additional conditions for parsing may be required. Further, when the regular merge flag is 1, mmvd_merge_flag may not be parsed. Here, if the regular merge flag is 1, mmvd_merge_flag may not be parsed regardless of other conditions.

According to an embodiment of the present invention, the decoder may determine whether to parse the CIIP flag based on mmvd_merge_flag. According to an embodiment of the present invention, when mmvd_merge_flag is 0, parsing of the CIIP flag is possible. Here, additional conditions for parsing may be required. Further, when mmvd_merge_flag is 1, the CIIP flag may not be parsed. Here, when mmvd_merge_flag is 1, the CIIP flag may not be parsed regardless of other conditions.

According to an embodiment of the present invention, it may be determined whether to parse the triangle merge flag based on the CIIP flag. According to an embodiment of the present invention, when the CIIP flag is 0, parsing of the triangle merge flag may be possible. Here, additional conditions for parsing may be required. Further, when the CIIP flag is 1, the triangle merge flag may not be parsed. Here, when the CIIP flag is 1, the triangle merge flag may not be parsed regardless of other conditions.

According to an embodiment of the present invention, whether to parse the subblock merge flag may be determined based on the triangle merge flag. According to an embodiment of the present invention, when the triangle merge flag is 0, parsing of the subblock merge flag may be possible. Here, additional conditions for parsing may be required. Further, when the triangle merge flag is 1, the subblock merge flag may not be parsed. Here, when the triangle merge flag is 1, the subblock merge flag may not be parsed regardless of other conditions.

According to another embodiment of the present invention, the last signaled mode among various merge modes may determine a value indicating whether or not to use without parsing. For example, referring to FIG. 20, the subblock merge flag may be determined without parsing. For example, when all of the following conditions are satisfied, the subblock merge flag may be determined to be 1.

1) general_merge_flag==1
2) When none of modes signaled before the subblock merge mode among various merge modes are used
3) When conditions by which the subblock merge mode is usable are satisfied Further, if not (that is, when at least one of the above conditions is not satisfied), the subblock merge flag may be determined to be 0.

For example, among the above conditions, a condition "2" when none of modes signaled before the subblock merge mode among various merge modes are used" may be defined as the following condition (or may include the following condition).

(regular_merge_flag==0 && mmvd_merge_flag==0 && ciip_flag==0 && merge_triangle_flag==0)

Further, among the above conditions, a condition "3" when conditions by which the subblock merge mode is usable are satisfied" may be as follows (or may include the following condition).

(MaxNumSubblockMergeCand>0 && cbWidth>=8 && cbHeight>=8)

Alternatively, "3)" of the above conditions may be the same as the following conditions (or may include the following conditions).

(at least one of the methods that can be included in the subblock merge mode is enabled && cbWidth>=8 && cbHeight>=8)

In addition, a method that may be included in the subblock merge mode may include affine motion compensation and subblock-based temporal motion vector prediction. In addition, higher-level signaling indicating whether affine motion compensation and subblock-based temporal motion vector predictors are usable may be defined as sps_affine_enabled_flag and sps_sbtmvp_enabled_flag, respectively. In the present embodiment, specific values for width and height in the above conditions have been described as examples, but the present invention is not limited thereto, and may include a condition based on a general block size.

FIG. 21 illustrates an example of a merge data syntax structure according to an embodiment of the present invention. FIG. 21 may show an embodiment in which a more efficient signaling method is added to the embodiment of FIG. 20 described above. According to an embodiment of the present invention, if usable conditions for all one or more modes signaled later than a predetermined mode among various modes are not satisfied, whether to use the predetermined mode may be determined without explicitly signaling the same. For example, signaling indicating whether to use the predetermined mode may not be parsed.

For example, if conditions by which the subblock merge mode is usable are not satisfied in the syntax structure signaled as shown in FIG. 21, whether the triangle merge mode is usable or not may be determined without explicit signaling. For example, the triangle merge flag may not be parsed if conditions by which the subblock merge mode is usable are not satisfied. As an embodiment, conditions by which the subblock merge mode is usable may be the same as the case where conditions by which the subblock merge mode is usable are satisfied of FIG. 20 (or conditions by which the subblock merge mode is usable may include the following condition).

Therefore, referring to FIG. 21, if MaxNumSubblockMergeCand is 0, the decoder may not parse the triangle merge flag. Here, MaxNumSubblockMergeCand is a variable indicating the maximum number of subblock merge candidates. Alternatively, the decoder may not parse the triangle merge flag based on the block size. Alternatively, the decoder may not parse the triangle merge flag when cbWidth has a value less than 8. That is, when cbWidth has a value of 4 (or 4 or less), the decoder may not parse the triangle merge flag. Alternatively, the decoder may not parse the triangle merge flag when cbHeight has a value less than 8. That is, when cbHeight has a value of 4 (or 4 or less), the decoder may not parse the triangle merge flag.

Therefore, according to an embodiment of the present invention, in relation to a 4-by-X block or an X-by-4 block (in relation to a block having a width or height of 4), the decoder may not parse the triangle merge flag. Hereinafter, a method of inferring the triangle merge flag will be described. In an embodiment of the present invention, the minimum values of cbWidth and cbHeight may be 4. For example, the minimum value of cbWidth and cbHeight for a luminance block may be 4. Further, cbWidth and cbHeight may be expressed as a power of 2. Therefore, for example, cbWidth having a value of 8 or more may have the same meaning as cbWdith having a value other than 4. In an additional embodiment, the maximum values of cbWidth and cbHeight may be 128.

In addition, in the invention of FIG. 21, it has been described that various merge modes are signaled in a sequence of triangle merge mode and subblock merge mode. However, the invention is not limited thereto, and may be applied to a case in which signaling is performed in a sequence of CIIP and subblock merge mode. That is, in the above-described embodiments, the triangle merge mode and the triangle merge flag may be replaced by the CIIP and CIIP flag.

FIG. 21 illustrates a signaling determining method indicating whether or not to use a mode according to an embodiment of the present invention. The method described in the embodiment of FIG. 20 may be applied to the embodiment of FIG. 21, and a related duplicate description will be omitted. Referring to FIG. 21, when the triangle merge flag does not exist, the decoder may infer a value thereof According to an embodiment of the present invention, when signaling regarding whether to use a predetermined mode among various merge modes does not exist, a value thereof may be inferred. As an embodiment, the decoder may infer the value as "1" if 1) none of modes signaled before the predetermined mode among various merge modes are used, 2) usable conditions for all modes that are signaled later than the predetermined mode among the various merge modes are not satisfied, and 3) conditions by which the predetermined mode is usable are satisfied. Further, if not (i.e., one of conditions of 1), 2), or 3) is not satisfied), the decoder may infer the value as 0. Further, here, not satisfying usable conditions for all modes in condition "2)" may denote that at least one of usable conditions for each of all modes is not satisfied.

In addition, here, 4) a condition for using one of various merge modes may be added to conditions for inferring signaling regarding whether to use the predetermined mode as 1. For example, 4) if general_merge_mode is 1 may be added thereto.

For example, based on the embodiment of FIG. 20, if 1) none of modes signaled before the triangle merge mode among various merge modes are used, 2) usable conditions for all modes that are signaled later than the triangle merge mode among the various merge modes are not satisfied, 3) conditions by which the triangle merge mode is usable are satisfied, and 4) if general_merge_mode is 1, the triangle merge flag may be inferred as 1. Further, if not (i.e., one of conditions of 1), 2), 3), or 4) is not satisfied), the decoder may infer the triangle merge flag as 0.

Here, referring to FIG. 21, "1) none of modes signaled before the triangle merge mode among various merge modes are used" may include the following condition.

(regular_merge_flag==0 && mmvd_merge_flag==0 && ciip_flag==0)

Further, referring to FIG. 21, "2) not satisfying usable conditions for all modes that are signaled later than the triangle merge mode among the various merge modes" may correspond to a case in which conditions by which the subblock merge mode is usable are not satisfied, and may include the following conditions. For example, the above condition 2) may include a condition of the block size.

(MaxNumSubblockMergeCand==0||cbWidth==4||cbHeight==4)

Further, referring to FIG. 21, "3) satisfying conditions by which the triangle merge mode is usable" may include the following condition.

(MaxNumTriangleMergeCand>=2 && sps_triangle_enabled_flag && slice_type==B && cbWidth*cbHeight>=64)

As an additional embodiment, some of conditions may not be required to be checked in order to reduce operations required for condition checking in the embodiment of FIGS. 20 to 21. For example, the decoder may not use some of conditions failing to satisfy conditions by which the subblock merge mode is usable or conditions by which the subblock merge mode is usable when parsing or inferring the triangle merge flag. Here, conditions used in the parsing operation and the inference condition may be the same conditions. For example, when parsing or inferring the triangle merge flag, the decoder may not check a condition for MaxNumSubblockMergeCand. That is, the triangle merge flag may be parsed even if MaxNumSubblockMergeCand is 0, and if the triangle merge flag does not exist, the decoder may not check a condition regarding whetherMaxNumSubblockMergeCand is 0 when inferring the value thereof FIG. 22 illustrates an example of a merge data syntax structure according to an embodiment of the present invention. The embodiment of FIG. 22 may be a detailed embodiment in which the embodiments of FIGS. 16 to 19 and the embodiments of FIGS. 20 and 21 are performed together. According to an embodiment of the present invention, signaling overhead can be reduced. According to an embodiment of the present invention, signaling may be performed in a sequence of mode A, mode B, mode C, mode D, and mode E. Here, when mode D or mode E is usable, signaling indicating whether or not to use mode C may be parsed. If none of mode D and mode E can be used, signaling indicating whether or not to use mode C may not be parsed. Further, if none of mode D and mode E can be used, and if none of mode A and mode B are used, it may be determined to use signaling indicating whether or not to use mode C.

Referring to FIG. 22, various merge modes may be signaled in a sequence of regular merge mode, MMVD, triangle merge mode, subblock merge mode, and CIIP. Here, according to an embodiment of the present invention, when the CIIP is non-usable, the decoder may not parse signaling indicating whether or not to use the subblock merge mode. In addition, when the CIIP is usable, the decoder may parse signaling indicating whether or not to use the subblock merge mode. In addition, if none of CIIP, regular merge, MMVD, and the triangle merge mode are used, and general_merge_flag is 1, the decoder may infer to use signaling indicating whether or not to use the subblock merge mode. Otherwise, the decoder may infer not to use signaling.

For example, conditions by which CIIP is usable may include, as an &&(and) condition, at least one of 1) a condition based on higher-level signaling indicating whether or not the CIIP is usable, 2) a condition based on cu_skip_flag, and 3) a condition based on a block size (width or height). Referring to FIG. 22, conditions by which the CIIP is usable may include, as an &&(and) condition, at least one of conditions of 1) sps_ciip_enabled_flag, 2) cu_skip_flag==0, and 3) cbWidth*cbHeight>=64 && cbWidth<128 && cbHeight<128. Referring to FIG. 22, the CIIP may be used in a case in which (sps_ciip_enabled_flag && cu_skip_flag==0 && cbWidth*cbHeight>=64 && cbWidth<128 && cbHeight<128).

In addition, according to an embodiment of the present invention, if none of the subblock merge mode and the CIIP can be used, signaling indicating whether or not to use the triangle merge mode may not be parsed. In addition, when the subblock merge mode or CIIP is usable, signaling indicating whether or not to use the triangle merge mode may be parsed. In addition, if none of the subblock merge mode and CIIP can be used, the regular merge and MMVD are not used, and general_merge_flag is 1, it may be inferred that signaling indicating whether or not to use the triangle merge mode is used. Otherwise, it may be inferred that signaling indicating whether or not to use the triangle merge mode is not used. For example, conditions by which CIIP is usable or a case where the CIIP is non-usable may be described with reference to the preceding description. However, here, an overlapping condition (e.g., cbWidth*cbHeight>=64 in FIG. 22) among conditions by which the triangle merge mode is usable and conditions by which CIIP is usable may be omitted from conditions by which CIIP is usable. In addition, conditions by which the subblock mergeonjungko mode is usable may include, as &&(and) conditions, one or more conditions among 1) conditions based on MaxNumSubblockMergeonjungkoCand and 2) conditions based on a block size.

Referring to FIG. 22, conditions by which the subblock merge mode is usable may include, as && (and) conditions, one or more conditions of 1) MaxNumSubblockMergeCand>0, and 2) cbWdith>=8 && cbHeight>=8. Referring to FIG. 22, a condition by which the subblock merge mode is usable may be (MaxNumSubblockMergeCand>0 && cbWdith>=8 && cbHeight>=8). The case where the subblock merge mode is non-usable may be a NOT condition for a case where the subblock merge mode is usable.

FIG. 23 illustrates an example of a merge data syntax structure according to an embodiment of the present invention. The embodiment of FIG. 23 may be another embodiment similar to FIG. 22. According to an embodiment of the present invention, signaling may be performed in a sequence of mode A, mode B, mode C, mode D, and mode E. Here, when mode D or mode E is usable, signaling indicating whether or not to use mode C may be parsed. If none of mode D and mode E can be used, signaling indicating whether or not to use mode C may not be parsed. Further, if none of mode D and mode E can be used, and when none of mode A and mode B are used, it may be determined to use signaling indicating whether or not to use mode C.

Referring to FIG. 23, various merge modes may be signaled in a sequence of regular merge mode, MMVD, triangle merge mode, CIIP, and subblock merge mode. Here, according to an embodiment of the present invention, when the subblock merge mode is non-usable, signaling indicating whether or not to use the CIIP may not be parsed. In addition, when the subblock merge mode is usable, signaling indicating whether or not to use the CIIP may be parsed. In addition, when subblock merge mode is non-usable, if the regular merge, MMVD, and triangle merge mode are not used, and general_merge_flag is 1, it may be inferred that signaling indicating whether or not to use the CIIP is used. Otherwise, it may be inferred that signaling indicating whether or not to use the CIIP is not used. In this regard, the description of FIG. 21 will be referred to. In addition, according to an embodiment of the present invention, when none of the CIIP and the subblock merge mode can be used, and if the CIIP or subblock merge mode is usable, signaling indicating whether or not to use the triangle merge mode will be described with reference to the description of FIG. 22.

FIG. 24 illustrates a merge data syntax structure according to an embodiment of the present invention. FIGS. 24 to 25 show an embodiment in which conditions by which the triangle merge mode is usable are added to the embodiment of FIG. 17. According to an embodiment of the present invention, conditions by which the triangle merge mode is usable may include the maximum number of triangle merge mode candidates. For example, a value indicating the maximum number of triangle merge mode candidates may be MaxNumTriangleMergeCand. For example, in order to enable the triangle merge mode to be used, a condition by which (MaxNumTriangleMergeCand>=2) may be needed.

Therefore, referring to FIG. 24, if (MaxNumTriangleMergeCand>=2) is satisfied, it is possible to parse the triangle merge flag, and if (MaxNumTriangleMergeCand>=2) is not satisfied, the triangle merge flag may not be parsed. In addition, a description overlapping with the description of FIG. 17 will be omitted.

Accordingly, the decoder may parse the triangle merge flag when all of the following conditions are satisfied. If at least one of the following conditions is not satisfied, the triangle merge flag may not be parsed.
1) MaxNumTriangleMergeCand>=2
2) sps_triangle_enabled_flag
3) slice_type==B
4) cbWidth*cbHeight>=64
5) sps_ciip_enabled_flag
6) cu_skip_flag==0
7) cbWidth<128
8) cbHeight<128

In another embodiment, some of the above conditions may be omitted. This may reduce operation required to check conditions. For example, the omitted condition may be at least one of 5), 6), 7), and 8).

Further, in an embodiment of the present invention, the CIIP flag may be determined as follows. When all of the following conditions are satisfied, the CIIP flag may be set to 1.
a) general_merge_flag==1
b) regular_merge_flag==0
c) mmvd_merge_flag==0
d) merge_subblock_flag==0
e) merge_triangle_flag==0
f) sps_ciip_enabled_flag==1
g) cu_skip_flag==0
h) cbWidth*cbHeight>=64
i) cbWidth<128
j) cbHeight<128

If at least one of the above conditions is not satisfied, the CIIP flag may be set to 0. For example, conditions h), i), and j) may be replaced by other conditions relating to the block size.

In an embodiment of the present invention, when the triangle merge flag does not exist, the triangle merge flag may be inferred according to the following process. If all of the following conditions are satisfied, the triangle merge flag may be inferred to be 1.
1) regular_merge_flag==0
2) mmvd_merge_flag==0
3) merge_subblock_flag==0
4) sps_ciip_enabled_flag==0 cu_skip_flag==1||cbWidth>=128||cbHeight>=128
5) MaxNumTriangleMergeCand>=2 && sps_triangle_enabled_flag==1 && tile_group_type==B && cbWidth*cbHeight>=64
6) general_merge_flag==1

Otherwise, the triangle merge flag value may be inferred to be 0. Among the above conditions, those connected using || (i.e., OR) in condition 4) correspond to conditions of 5), 6), 7), and 8) described in FIG. 24, and if there is any omission among conditions of 5), 6), 7), and 8), the same may occur in condition of 4) of FIG. 24. As described above with reference to FIG. 24, conditions by which the triangle merge mode is usable may include the maximum number of triangle merge mode candidates. In this regard, a duplicate description will be omitted.

Further, according to an embodiment of the present invention, at least one mode among various merge modes may be used for signaling regarding whether to use same. For example, when a merge mode is used (when the general_merge_flag is "1"), at least one mode among various merge modes may be indicated to use signaling regarding whether to use same. According to an embodiment, the at least one mode may be a preset mode. For example, the at least one mode may be one mode. For example, the at least one mode may be a regular merge mode.

According to an embodiment, when a merge mode is used, if none of signalings regarding whether to use various merge modes are used, signaling regarding whether to use a predetermined mode is configured to be used. According to another embodiment, if none of signalings regarding whether to use various merge modes except for signaling regarding a predetermined mode are used, signaling regarding whether to use the predetermined mode is configured to be used. This configuration is to prevent erroneous signaling and operations according thereto from occurring.

In an embodiment of the present invention, the regular merge flag may be set to 1 when all of the following conditions are satisfied.
1) general_merge_flag==0
2) mmvd_merge_flag==0
3) merge_subblock_flag==0
4) ciip_flag==0
5) merge_triangle_flag==0
6) general_merge_flag==1

According to another embodiment, some of the conditions may be omitted. For example, condition 1) among the above conditions may be omitted.

According to another embodiment of the present invention, when usability conditions for all modes except for one specific mode among various merge modes are not satisfied, the decoder may infer the value thereof to be 1 without parsing signaling regarding whether to use the specific mode. Alternatively, when usability conditions for at least one of the modes except for one specific mode among various merge modes are satisfied, the signaling regarding whether to use the one specific mode may be parsed. In an embodiment, this may correspond to a case of using the merge mode. Further, the predetermined one mode may be a regular merge mode.

More specifically, if at least one of the following conditions of 1) to 4) is satisfied, the decoder may parse the regular merge flag. As an embodiment, this may correspond to a case of using the merge mode.

1) sps_mmvd_enabled_flag && cbWidth*cbHeight !=32
2) MaxNumSubblockMergeCand>0 && cbWidth>=8 && cbHeight>=8
3) sps_ciip_enabled_flag && cu_skip_flag==0 && cbWidth*cbHeight>=64 && cbWidth<128 && cbHeight<128
4) MaxNumTriangleMergeCand>=2 && sps_triangle_enabled_flag && slice_type==B && cbWidth*cbHeight>=64

Further, if none of the conditions of 1) to 4) above are satisfied, the regular merge flag may not be parsed, and the value thereof may be inferred as 1. This may correspond to a case of using the merge mode. Here, some of the above conditions may be omitted to reduce the amount of operation.

In addition, according to another embodiment of the present invention, when an indication of signaling regarding whether two or more modes among various merge modes are used occurs, signaling regarding whether to use all modes except a preset mode among the various merge modes is configured not to be used, and signaling regarding whether to use the preset mode may be configured to be used. For example, the preset mode may be a regular merge mode. As another example, the preset mode may be one of the two or more modes for which signaling regarding whether to use same is indicated to be used. Here, a preset method for determining one mode may be present. For example, the first mode in the preset sequence for various merge modes is determined. For example, the present embodiment may correspond to a case of using the merge mode.

For example, if regular_merge_flag==1 and merge_subblock_flag==1, merge_subblock_flag may be set to 0. Alternatively, if ciip_flag==1 and merge_subblock_flag==1, ciip_flag and merge_subblock_flag may be set to 0 and regular_merge_flag may be set to 1. As another example, if ciip_flag==1 and merge_subblock_flag==1, merge_subblock_flag, which comes first in a preset sequence of regular merge mode, MMVD, subblock merge mode, CIIP, and triangle merge mode, may be set to 1, and the CIIP flag may be set to 1.

FIG. 25 illustrates an example of a merge data syntax structure according to an embodiment of the present invention. The embodiment of FIG. 25 may be a specific embodiment of the invention described above. For example, the methods described in the embodiment of FIGS. 10 to 13 may be applied to the embodiment of FIG. 25, and a duplicate description will be omitted.

As described above, whether to use multiple merge modes may be signaled or determined in a preset sequence. Referring to FIG. 25, multiple merge modes may include a regular merge mode, an MMVD, a subblock merge mode, a CIIP, and a triangle merge mode. Further, referring to FIG. 25, whether to use the multiple merge modes may be signaled or determined in a sequence of regular merge mode, MMVD, subblock merge mode, CIIP, and triangle 1 merge mode. Further, referring to FIG. 25, signaling indicating whether or not to use the regular_merge_mode, MMVD, subblock merge mode, CIIP, and triangle merge mode may be regular_merge_flag, mmvd_merge_flag, merge_subblock_flag, ciip_flag, and MergeTriangleFlag, respectively. Further, MergeTriangleFlag may have the same meaning as that of merge_triangle_flag described above.

In addition, conditions needing to be satisfied may be present in order to enable execution of each mode. For example, when conditions needing to be satisfied in order to enable execution of a predetermined mode are not satisfied, the predetermined mode may not be executed. Further, here, a mode other than the predetermined mode may be performed. Alternatively, if conditions needing to be satisfied in order to enable execution of a predetermined mode are satisfied, the predetermined mode may be performed or not. Here, additional signaling for determining whether to perform the predetermined mode may be present.

For example, conditions needing to be satisfied in order to enable execution of a predetermined mode may be based on higher-level signaling indicating whether a predetermined mode is usable. The higher level may include a sequence level, a sequence parameter set (SPS) level, a slice level, a tile level, a tile group level, a brick level, a CTU level, and the like. In addition, the sps_mode_enabled_flag described above may be included therein. Here, the mode can be replaced by predetermined modes.

In addition, conditions needing to be satisfied in order to enable execution of a predetermined mode may include a condition related to a block size. For example, conditions based on the width or height of the current block may be included therein. For example, there may be an upper limit or a lower limit for the width. Alternatively, there may be an upper limit or a lower limit for the height. Alternatively, there may be an upper limit or a lower limit of the area (width*height). Further, the current block may be a CU or a PU. Further, the width and height of the current block may be cbWidth and cbHeight, respectively. In the present invention, width and height may be used interchangeably with cbWidth and cbHeight, respectively.

Further, conditions needing to be satisfied to enable execution of a predetermined mode may be based on a slice type or tile group type. The slice type and tile group type may have the same meaning.

Further, conditions needing to be satisfied in order to enable execution of a predetermined mode may be based on whether another predetermined mode is used. The other predetermined mode may include a skip mode. Further, whether to use the skip mode may be determined based on cu_skip_flag. Further, the other predetermined mode may include a mode signaled or determined before the predetermined mode. For example, execution of the predetermined mode is possible when the other predetermined mode is not used.

Further, conditions needing to be satisfied in order to enable execution of a predetermined mode may be based on the maximum number of candidates. For example, the candidates may be candidates related to the predetermined mode. For example, the candidates may be candidates used in the predetermined mode. For example, it is possible to perform a predetermined mode when there are more than a sufficient number of candidates. For example, it is possible to perform the predetermined mode when the maximum number of candidates is equal to or greater than a preset value. For example, the maximum number of candidates may be represented by a parameter called MaxNumModeCand, and a mode in MaxNumModeCand may be replaced by a mode to be represented. For example, a MaxNumMergeCand value for a merge mode may be present. For example, there may be a MaxNumTriangleMergeCand value for the triangle merge mode. For example, there may be a MaxNumSubblockMergeCand value for the subblock merge mode. In addition, the maximum number of candidates may be based on higher-level signaling indicating a mode to be enabled. For example, MaxNumSubblockMergeCand may be based on sps_affine_enabled_flag or sps_sbtmvp_enabled_flag. Sps_sbtmvp_enalbed_flag may be higher level signaling indicating whether subblock-based temporal motion (vector) prediction is usable.

According to an embodiment of the present invention, conditions needing to be satisfied in order to perform the regular merge mode may be present. For example, signaling indicating use of the merge mode needs to be true in order to enable execution of the regular merge mode. The signaling indicating use of the merge mode may be merge_flag or general_merge_flag. In addition, in relation to other modes described below, it may be possible to perform the other modes only when signaling indicating use of the merge mode is true.

Alternatively, unlike other modes, conditions needing to be satisfied to perform the regular merge mode may be not present. This may occur because the regular merge mode may be the most basic mode. If the above-described merge mode is used, additional conditions for using the regular merge mode may not be required.

Referring to FIG. 25, when a first condition 2501 is satisfied, the decoder may parse the regular merge flag (i.e., regular_merge_flag). The first condition 2501 may be a case where sps_mmvd_enabled_flag is 1 or the value obtained by width*height is not 32. Further, when the first condition 2501 is not satisfied, the regular_merge_flag may not be parsed. Here, the decoder may infer the value thereof as 1. For example, if sps_mmvd_enabled_flag is 0 && width*height==32, the decoder may infer regular_merge_flag as 1. Alternatively, if a condition by which general_merge_flag is 1 may be included in a case of inferring the value thereof as 1. This may be because, when the first condition 2501 is not satisfied, none of conditions needing to be satisfied in order to perform other modes belonging to the merge mode are satisfied. In addition, when regular_merge_flag does not exist, the decoder may infer the value as 0 if the above condition for inferring the value as 1 is not satisfied. Further, the width or height may be expressed as a power of 2. Further, width or height may be positive number. Therefore, the value of 32, which is obtained by calculation of a width*height, may indicate a width and a height of 4 and 8 or 8 and 4, respectively. Further, if the value obtained by width*height is not 32, the width and height may be neither 4 and 8 nor 8 and 4, respectively. Further, if the value obtained by width*height is not 32, the width or height may have a value of 8 or more. This case may correspond to inter prediction, and this may occur because inter prediction may not be allowed for a 4×4 block for example.

According to an embodiment of the present invention, conditions needing to be satisfied in order to enable execution of MMVD may be present. For example, the conditions may be based on higher level signaling indicating whether MMVD is usable. For example, the higher level signaling indicating whether MMVD is usable may be sps_mmvd_enabled_flag. Referring to FIG. 25, when a second condition 2502 is satisfied, mmvd_merge_flag may be parsed. In addition, if the second condition 2502 is not satisfied, the mmvd_merge_flag may not be parsed and the value thereof may be inferred. The second condition 2502 may be (sps_mmvd_enabled_flag && cbWidth*cbHeight !=32). That is, when sps_mmvd_enabled_flag is 1 and the block size condition is satisfied, mmvd_merge_flag may be parsed, and when sps_mmvd_enabled_flag is 0 or the block size condition is not satisfied, mmvd_merge_flag may not be parsed. Further, when sps_mmvd_enabled_flag is 1 and the block size is not satisfied, mmvd_merge_flag may be inferred to be 1. For example, when sps_mmvd_enabled_flag is 1 and width*height is 32, if regular_merge_flag is 0, and when general_merge_flag is 1, mmvd_merge_flag may be inferred as 1. The block size condition may be related to a condition by which modes signaled after MMVD are non-usable.

According to an embodiment of the present invention, conditions needing to be satisfied to enable execution of the subblock merge mode may be present. For example, the conditions may be based on higher level signaling indicating whether the subblock merge mode is usable. Alternatively, the conditions may be based on higher level signaling indicating whether a mode belonging to the subblock merge mode is usable. For example, the subblock merge mode may include affine motion prediction, subblock-based temporal motion vector prediction, and the like. Accordingly, it may be determined whether execution of the subblock merge mode is enabled, based on higher level signaling (e.g., sps_affine_enabled_flag) indicating whether affine motion prediction is usable.

Alternatively, it may be determined whether execution of the subblock merge mode is enabled, based on higher level signaling (e.g., sps_sbtmvp_enabled_flag) indicating whether subblock-based temporal motion vector prediction is usable. Alternatively, in order to enable execution of the subblock merge mode, a condition based on the maximum number of candidates for the subblock merge mode may need to be satisfied. For example, when the value of the maximum number of candidates for the subblock merge mode is greater than 0, the subblock merge mode can be used. In addition, the maximum number of candidates for the subblock merge mode may be based on higher level signaling indicating whether a mode belonging to the subblock merge mode is usable. For example, it may be possible that the maximum number of candidates for the subblock merge mode is greater than 0 only when at least one of higher-level signaling indicating whether a mode belonging to a plurality of subblock merge modes is usable is 1. In addition, in order to enable execution of the subblock merge mode, a condition based on the block size may need to be satisfied. For example, there may be lower limit on the width and height. For example, it may be possible to use the subblock merge mode when the width is 8 or more and the height is 8 or more.

Referring to FIG. 25, if a third condition 2503 is satisfied, the subblock merge flag may be parsed. Further, if the third condition 2503 is not satisfied, merge_subblock_flag may not be parsed, and the value thereof may be inferred as 0. The third condition 2503 may be (MaxNumSubblockMergeCand>0 && width>=8 && height>=8).

According to an embodiment of the present invention, conditions needing to be satisfied in order to enable execution of CIIP may be present. For example, it may be determined whether execution of CIIP is enabled based on higher level signaling (e.g., spsXBT_ciip_enabled_flag)

indicating whether CIIP is usable. In addition, it may be determined whether execution of CIIP is enabled based on whether a skip mode is used. For example, when the skip mode is used, CIIP may not be performed. Further, it may be determined whether execution of CIIP is enabled based on the block size. For example, it may be determined whether execution of CIIP is enabled based on whether the block size is equal to or greater than the lower limit and equal to or less than the upper limit. For example, execution of CIIP is enabled when the value obtained by width*height is equal to or greater than the lower limit, the value of width is equal to or lower than the upper limit, and the value of height is equal to or lower than the upper limit. For example, when the value obtained by width*height is equal to or greater than 64, the value of width is less than 128, and the value of height is less than 128, execution of CIIP is possible.

Referring to FIG. 25, the CIIP flag may be parsed when a fourth condition 2504 is satisfied. Further, when the fourth condition 2504 is not satisfied, the CIIP flag may not be parsed, and the value thereof may be inferred as 0. The fourth condition 2504 may be (sps_ciip_enabled_flag && cu_skip_flag==0 && width*height>=64 && width<128 && height<128).

According to an embodiment of the present invention, conditions needing to be satisfied in order to enable execution of the triangle merge mode may be present. For example, it may be determined whether execution of the triangle merge mode is enabled based on higher level signaling (e.g., sps_triangle_enabled_flag) indicating whether the triangle merge mode is usable. Further, it may be determined whether execution of the triangle merge mode is enabled based on the slice type. For example, when the slice type is B, it may be possible to perform the triangle merge mode. This may be because two or more pieces of motion information or two or more reference pictures are required to perform the triangle merge mode. Further, it may be determined whether execution of the triangle merge mode is enabled based on the maximum number of candidates for the triangle merge mode. The maximum number of candidates for the triangle merge mode may be expressed as the value of MaxNumTriangleMergeCand. For example, when the maximum number of candidates for the triangle merge mode is 2 or more, it may be possible to perform the triangle merge mode. This may be because two or more pieces of motion information or two or more reference pictures are required to perform the triangle merge mode. In addition, according to an embodiment of the present invention, when higher-level signaling, which indicates whether the triangle merge mode is usable or not, indicates usability thereof, the maximum number of candidates for the triangle merge mode is always 2 or more, and when higher-level signaling, which indicates whether the triangle merge mode is usable or not, indicates non-usability thereof, the maximum number of candidates for the triangle merge mode may always be less than 2 or 0.

Accordingly, here, it may be determined whether execution of the triangle merge mode is enabled based on the maximum number of candidates for the triangle merge mode instead of based on higher level signaling indicating whether the triangle merge mode is usable. Accordingly, it is possible to reduce operations for checking conditions. Further, it may be determined whether execution of the triangle merge mode is enabled based on the block size. For example, it may be determined whether execution of the triangle merge mode is enabled based on whether the block size is equal to or greater than the lower limit and equal to or less than the upper limit. For example, it is possible to perform the triangle merge mode if the value obtained by width*height is equal to or greater than the lower limit, the value of width is equal to or lower than the upper limit, and the value of height is equal to or lower than the upper limit. For example, it is possible to perform triangle merge mode if the value obtained by width*height is 64 or more. It is also possible to perform triangle merge mode if the value of width is less than 128 and the value of height is less than 128.

Referring to FIG. 25, when a fifth condition 2505 is satisfied, the triangle merge mode may be used. Further, when the fifth condition 2505 is not satisfied, the triangle merge mode may be used. The fifth condition 2505 may correspond to a case in which MergeTriangleFlag is 1. In addition, conditions needing to be satisfied in order to satisfy the fifth condition 2505 may be present. For example, the condition may include (sps_triangle_enabled_flag && slice_type==B && MaxNumTriangleMergeCand>=2 && width*height>=64). If (sps_triangle_enabled_flag && slice_type==B && MaxNumTriangleMergeCand>=2 && width*height>=64) is true, MergeTriangleFlag may be 1 or 0. Here, whether MergeTriangleFlag is 1 or 0 may be determined according to an additional condition. The additional condition may include a case where none of modes (e.g., regular merge mode, MMVD, subblock merge mode, or CIIP) which are signaled or determined before the triangle merge mode are used and a case where a merge mode is used (e.g., general_merge_flag==1). MergeTriangleFlag may be 1 if the additional condition is satisfied, and MergeTriangleFlag may be 0 if the additional condition is not satisfied. Further, when (sps_triangle_enabled_flag && slice_type==B && MaxNumTriangleMergeCand>=2 && width*height>=64) is false, MergeTriangleFlag may be 0.

FIG. 26 illustrates a merge data syntax structure according to an embodiment of the present invention. FIG. 26 may be a specific embodiment of the signaling method described with reference to FIGS. 12 to 13.

According to an embodiment of the present invention, when at least one of the modes signaled or determined later than a predetermined mode can be performed, signaling regarding whether to use the predetermined mode may be parsed. In addition, when none of the modes signaled or determined later than a predetermined mode can be performed, signaling regarding whether to use the predetermined mode may not be parsed. In addition, when none of the modes signaled or determined later than a predetermined mode can be performed, it may be determined to use the value of signaling regarding whether to use the predetermined mode.

In addition, whether execution of a mode signaled or determined later than a predetermined mode is enabled or disabled may depend on whether conditions needing to be satisfied in order to enable execution of mode described in FIG. 26 are satisfied or not. Alternatively, whether execution of a mode signaled or determined later than a predetermined mode is enabled or disabled may depend on whether some of the conditions needing to be satisfied in order to enable execution of mode described in FIG. 26 are satisfied or not. For example, some of conditions needing to be satisfied in order to enable execution of a mode may be omitted when determining signaling for another mode. This could result in reducing operations of checking conditions, e.g., could omit conditions which are often true.

More specifically, in order to use a predetermined mode, higher-level signaling indicating a usable mode needs to be true, and the slice type needs to have a specific value. However, when checking condition for using the predetermined mode in order to determine parsing of signaling regarding whether to use a mode different from the predetermined mode, it is possible to determine parsing of signaling regarding whether to use the other mode based on higher level signaling instead of based on the slice type. This may be possible because the slice type often has a specific value. Accordingly, even if the slice type does not have a specific value, if the higher-level signaling indicating a usable mode is true, signaling regarding whether or not to use a mode different from the predetermined mode may be parsed.

Referring to FIG. 26, mmvd_condition, subblock_merge_condition, ciip_condition, and triangle_merge_condition may be present. For example, mmvd_condition, subblock_merge_condition, ciip_condition, and triangle_merge_condition may be conditions needing to be satisfied in order to perform the MMVD, subblock merge mode, CIIP, and triangle merge mode described with reference to FIG. 25, respectively. Alternatively, mmvd_condition, subblock_merge_condition, ciip_condition, and triangle_merge_condition may be a part of conditions needing to be satisfied in order to perform the MMVD, subblock merge mode, CIIP, and triangle merge mode described with reference to FIG. 25, respectively. For example, mmvd_condition, subblock_merge_condition, and ciip_condition may be the second condition 2502, the third condition 2503, and the fourth condition 2504 described with reference to FIG. 25, or a part thereof, respectively.

Further, if conditions needing to be satisfied to enable execution of a mode signaled or determined later than a predetermined mode and conditions to be satisfied to enable execution of the predetermined mode overlap, conditions to be satisfied in order to enable execution of the predetermined mode need to be satisfied to enable the predetermined mode to be used. Therefore, the overlap conditions may be excluded from mmvd_condition, subblock_merge_condition, ciip_condition, triangle_merge_condition, and the like of FIG. 26.

Referring to FIG. 26, when the triangle_merge_condition is satisfied, ciip_flag may be parsed. Further, ciip_flag may not be parsed if triangle_merge_condition is not satisfied. Further, if triangle_merge_condition is not satisfied, ciip_flag may be inferred as 1. Here, in order to infer the value thereof as 1, the condition for performing CIIP needs to be satisfied, none of modes signaled or determined before CIIP are used (for example, regular_merge_flag==0 && mmvd_merge_flag==0 && merge_subblock_flag==0), and if the merge mode is used, the condition of (general_merge_flag==1) needs to be satisfied. Otherwise, if ciip_flag does not exist, the value thereof may be inferred as 0.

Referring to FIG. 26, if ciip_condition is satisfied or triangle_merge_condition is satisfied, merge_subblock_flag may be parsed. Further, if ciip_condition is not satisfied, and triangle_merge_coondition is not satisfied, merge_subblock_flag may not be parsed. Further, if ciip_condition is not satisfied, and triangle_merge_coondition is not satisfied, merge_subblock_flag may be inferred as 1. Here, in order to infer the value thereof as 1, the condition for performing the subblock merge mode needs to be satisfied, none of modes signaled or determined before the subblock merge mode are used (for example, regular_merge_flag==0 && mmvd_merge_flag==0), and if the merge mode is used, the condition of (general_merge_flag==1) needs to be satisfied. Otherwise, if merge_subblock_flag does not exist, the value thereof may be inferred as 0.

Referring to FIG. 26, when subblock_merge_condition is satisfied, ciip_condition is satisfied, or triangle_merge_condition is satisfied, mmvd_merge_flag may be parsed. Further, if subblock_merge_condition is not satisfied, ciip_condition is not satisfied, and triangle_merge_coondition is not satisfied, mmvd_merge_flag may not be parsed. Further, if subblock_merge_condition is not satisfied, ciip_condition is not satisfied, and triangle_merge_coondition is not satisfied, mmvd_merge_flag may be inferred as 1. Here, in order to infer the value of mmvd_merge_flag as 1, conditions for execution of MMVD needs to be satisfied, none of modes signaled or determined before MMVD are used (e.g., regular_merge_flag==0), and if a merge mode is used, the condition of (general_merge_flag==1) may need to be satisfied. Further, there may be a case where the mmvd_merge_flag described with reference to FIG. 25 is inferred to be 1. Otherwise, if mmvd_merge_flag does not exist, the value thereof may be inferred as 0.

Referring to FIG. 26, when mmvd_condition is satisfied, subblock_merge_condition is satisfied, ciip_condition is satisfied, or triangle_merge_condition is satisfied, regular_merge_flag may be parsed. Further, if mmvd_condition is not satisfied, subblock_merge_condition is not satisfied, ciip_condition is not satisfied, and triangle_merge_coondition is not satisfied, regular_merge_flag may not be parsed. Further, if mmvd_condition is not satisfied, subblock_merge_condition is not satisfied, ciip_condition is not satisfied, and triangle_merge_coondition is not satisfied, regular_merge_flag may be inferred as 1. Here, in order to infer the value thereof as 1, conditions for execution of the regular merge mode needs to be satisfied (this condition may be not present for the regular merge mode), none of modes signaled or determined before the regular merge mode are used (this condition may be not present for the regular merge mode), and if the merge mode is used, the condition of (general_merge_flag==1) needs to be satisfied. Further, there may be a case where the regular_merge_flag described with reference to FIG. 25 is inferred to be 1. Otherwise, if regular_merge_flag does not exist, the value thereof may be inferred as 0.

In addition, FIG. 26 illustrates signaling according to whether execution of a mode signaled or determined later than a plurality of modes is enabled. The signaling method is usable only for some of the plurality of modes. That is, at least one of the first condition 2501, the second condition 2502, the third condition 2503, and the fourth condition 2504 of FIG. 25 may be used, and the method of FIG. 26 may be used for the rest. That is, the first condition 2501 of FIG. 25, and the second condition 2602, the third condition 2603, and the fourth condition 2604 of FIG. 26 may be used.

FIG. 27 illustrates a merge data syntax structure according to an embodiment of the present invention. FIG. 27 may be a specific embodiment of the signaling method described with reference to FIGS. 12, 13, and 26. Referring to FIG. 27, ciip_flag may be parsed when (sps_triangle_enabled_flag && slice_type==B && MaxNumTriangleMergeCand>=2). Here, parsing of the ciip_flag may be possible only when a condition for performing CIIP is satisfied. Further, if the condition of (sps_triangle_enabled_flag && slice_type==B && MaxNumTriangleMergeCand>=2) is not satisfied, ciip_flag may not be parsed. Further, if the condition of (sps_triangle_enabled_flag && slice_type==B && MaxNumTriangleMergeCand>=2) is not satisfied, ciip_flag may be inferred to be 1. Here, ciip_flag may be inferred to be 1 when the merge mode is used, conditions for execution of CIIP are satisfied, and none of modes signaled or determined before CIIP are used.

For example, ciip_flag may be inferred as 1 in a case of (general_merge_flag==1 && sps_ciip_enabled_flag && cu_skip_flag==0 && width*height>=64 && width<128

&& height<128 && regular_merge_flag==0 && mmvd_triangle_flag==0 && merge_subblock_flag==0), and if a condition of (sps_triangle_enabled_flag && slice_type==B && MaxNumTriangleMergeCand>=2) is not satisfied. Here, only some conditions among (sps_triangle_enabled_flag && slice_type==B && MaxNumTriangleMergeCand>=2) can be used. If only some conditions are used, some conditions for determining whether to parse and some conditions used when inferring may need to match. For example, as an example of not using slice_type, ciip_flag may be parsed when satisfying (sps_triangle_enabled_flag && MaxNumTriangleMergeCand>=2), and ciip_flag may not be parsed if (sps_triangle_enabled_flag && MaxNumTriangleMergeCand >=2) is not satisfied. Further, the merge mode is used if (sps_triangle_enabled_flag && MaxNumTriangleMergeCand>=2) is not satisfied, and ciip_flag may be inferred as 1 when conditions for execution of CIIP are satisfied and none of modes signaled or determined before CIIP are used.

Referring to FIG. 27, in a case of (sps_triangle_enabled_flag && slice_type==B && MaxNumTriangleMergeCand>=2)||(sps_ciip_enabled_flag && cu_skip_flag==0 && width<128 && height<128)), merge_subblock_flag may be parsed. Here, parsing of the merge_subblock_flag may be possible only when conditions for execution of the subblock merge mode are satisfied. Further, if (sps_triangle_enabled_flag && slice_type==B && MaxNumTriangleMergeCand>=2)||(sps_ciip_enabled_flag && cu_skip_flag==0 && width<128 && height<128)) is not satisfied, merge_subblock_flag may not be parsed. Further, if (sps_triangle_enabled_flag && slice_type==B && MaxNumTriangleMergeCand>=2)||(sps_ciip_enabled_flag && cu_skip_flag==0 && width<128 && height<128)) is not satisfied, merge_subblock_flag may be inferred as 1. Here, merge_subblock_flag may be inferred as 1 when the merge mode is used, the conditions for execution of the subblock merge mode are satisfied, and none of modes signaled or determined before the subblock merge mode are used.

For example, merge_subblock_flag may be inferred to be 1 in a case of (general_merge_flag==1 && MaxNumSubblockMergeCand>0 && width>=8 && height>=8 && regular_merge_flag==0 && mmvd_merge_flag==0), and if ((sps_triangle_enabled_flag && slice_type==B && MaxNumTriangleMergeCand>=2)||(sps_ciip_enabled_flag && cu_skip_flag==0 && width<128 && height<128)) is not satisfied. Here, only some conditions of (sps_triangle_enabled_flag && slice_type==B && MaxNumTriangleMergeCand>=2) can be used and only some conditions of (sps_ciip_enabled_flag && cu_skip_flag==0 && width<128 && height<128) can be used. When using only some conditions, some conditions for determining whether to parse and some conditions used when inferring may need to match. Further, a case where (sps_triangle_enabled_flag && slice_type==B && MaxNumTriangleMergeCand>=2)|| (sps_ciip_enabled_flag && cu_skip_flag==0 && width<128 && height<128)) is not satisfied, which has been described in the above, may be the same as a case where (sps_triangle_enabled_flag && slice_type==B && MaxNumTriangleMergeCand>=2) is not satisfied (&&), and a case where (sps_ciip_enabled_flag && cu_skip_flag==0 && width<128 && height<128) is not satisfied.

Referring to FIG. 27, in a case of ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && height>=8 && height>=8)), mmvd_merge_flag may be parsed. Here, parsing of mmvd_merge_flag may be possible only when conditions for execution of MMVD are satisfied. In addition, mmvd_merge_flag may not be parsed if ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8)) is not satisfied. In addition, if ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8)) is not satisfied, mmvd_merge_flag may be inferred as 1.

Here, mmvd_merge_flag may be inferred to be 1 when the merge mode is used, conditions for execution of MMVD are satisfied, and none of modes signaled or determined before MMVD are used. For example, in a case of (general_merge_flag==1 && sps_mmvd_enabled_flag && regular_merge_flag==0), and if ((sps_triangle_enabled_flag && slice_type==B && MaxNumTriangleMergeCand>=2)||(sps_ciip_enabled_flag && cu_skip_flag==0 && width<128 && height<128H (MaxNumSubblockMergeCand>0 && width>=8 && height>=8)) is not satisfied, mmvd_merge_flag may be inferred as 1. Here, only some conditions of (sps_triangle_enabled_flag && slice_type==B && MaxNumTriangleMergeCand>=2) are usable, only some conditions of (sps_ciip_enabled_flag && cu_skip_flag==0 && width<128 && height<128) are usable, and only some conditions of (MaxNumSubblockMergeCand>=0 && width>=8 && height>=8) are usable. When using only some conditions, some conditions for determining whether to parse and some conditions used when inferring may need to match. In addition, a case where ((sps_triangle_enabled_flag && slice_type==B && MaxNumTriangleMergeCand>=2)|| (sps_ciip_enabled_flag && cu_skip_flag==0 && width<128 && height<128)||(MaxNumSubblockMergeCand>0 && width>=8 && height>=8)) are not satisfied, which has been described in the above, are the same as a case where (sps_triangle_enabled_flag && slice_type==B && MaxNumTriangleMergeCand>=2) is not satisfied (&&), a case where (sps_ciip_enabled_flag && cu_skip_flag==0 && width<128 && height<128) is not satisfied (&&), and a case where(MaxNumSubblockMergeCand>0 && width>=8 && height>=8) is not satisfied.

As described with reference to FIG. 25, there may be a case where mmvd_merge_flag is inferred to be 1. For example, in a case of (sps_mmvd_enabled_flag==1 && general_merge_flag==1 && width*height==32 && regular_merge_flag==0), mmvd_merge_flag may be inferred as 1. In addition, as described in FIG. 26, in a case of (general_merge_flag==1 && sps_mmvd_enabled_flag && regular_merge_flag==0), and if ((sps_triangle_enabled_flag && slice_type==B && MaxNumTriangleMergeCand>=2)|| (sps_ciip_enabled_flag && cu_skip_flag==0 && width<128 && height<128)||(MaxNumSubblockMergeCand>0 && width>=8 && height>=8)) is not satisfied, mmvd_merge_flag may be inferred as 1. Otherwise, mmvd_merge_flag may be inferred to be 0.

Referring to FIG. 27, in a case of ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8 && height>=8)||sps_mmvd_enabled_flag), regular_merge_flag may be parsed. Here, parsing of the regular_merge_flag may be possible only when not only the regular merge mode as a possible merge mode exist. In addition, if ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8 && height>=8)||sps_mmvd_enabled_flag) is not satisfied, regular_merge_flag may not be parsed.

In addition, if ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8 && height>=8)||sps_mmvd_enabled_flag) is not satisfied, regular merge flag may be inferred to be 1. Here, when the merge mode is used, regular_merge_flag may be inferred as 1. For example, in a case of (general_merge_flag==1), and if ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8 && height>=8)||sps_mmvd_enabled_flag) is not satisfied, regular merge flag may be inferred as 1. Here, only some conditions of (sps_triangle_enabled_flag && slice_type==B && MaxNumTriangleMergeCand>=2) may be used, only some conditions of (sps_ciip_enabled_flag && cu_skip_flag==0 && width <128 && height<128) may be used, and only some conditions of (MaxNumSubblockMergeCand>=0 && width>=2) 8 && height>=8) may be used. When using only some conditions, some conditions for determining whether to parse and some conditions used when inferring may need to match.

More specifically, a low-complexity encoder may not use various merge tools, and for the encoder, if (sps_triangle_enabled_flag||sps_affine_enabled_flag||sps_sbtmvp_enabled_flag||sps_ciip_enabled_flag||sps_mmvd_enabled_flag) is not satisfied, regular_merge_flag may not be parsed and the value thereof may be inferred as 1. In addition, a case where ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8 && height>=8)||sps_mmvd_enabled_flag) is not satisfied, which has been described in the above, may be the same as a case where (sps_triangle_enabled_flag && slice_type==B && MaxNumTriangleMergeCand>=2) is not satisfied (&&), a case where (sps_ciip_enabled_flag && cu_skip_flag==0 && width<128 && height<128) is not satisfied (&&), a case where (MaxNumSubblockMergeCand>0 && width>=8 && height>=8) is not satisfied (&&), and a case where sps_mmvd_enabled_flag is not satisfied.

As described with reference to FIG. 25, there may be a case where regular_merge_flag is inferred to be 1. For example, in a case of (sps_mmvd_enabled_flag==0 && general_merge_flag==1 && width*height==32), regular_merge_flag may be inferred as 1. Further, as described in FIG. 25, in a case of (general_merge_flag==1), and if ((sps_triangle_enabled_flag && slice_type==B && MaxNumTriangleMergeCand>=2)||(sps_ciip_enabled_flag && cu_skip_flag==0 && width<128 && height<128)|| (MaxNumSubblockMergeCand>0 && width>=8 && height>=8)||sps_mmvd_enabled_flag) is not satisfied, regular_merge_flag may be inferred as 1. Otherwise, regular_merge_flag may be inferred as 0.

Further, since a first condition 2701 and a second condition 2702 of FIG. 27 may include conditions of (1) width*height>=64, and (2) width>=8 and height >=8, in relation to conditions (1) or (2), width and height may be neither 4 and 8 nor 8 and 4, respectively. Therefore, there is no need to check whether width*height is 32 in the first condition 2701 and the second condition 2702. Therefore, the second condition 2702 may only include ((sps_triangle_enabled_flag && slice_type==B && MaxNumTriangleMergeCand>=2)||(sps_ciip_enabled_flag && cu_skip_flag==0 && width<128 && height<128)||(MaxNumSubblockMergeCand>0 && width>=8 && height>=8||sps_mmvd_enabled_flag). Here, if general_merge_flag is 1, and if ((sps_triangle_enabled_flag && slice_type==B && MaxNumTriangleMergeCand>=2)||m(sps_ciip_enabled_flag && cu_skip_flag==0 && width<128 && height<128)||(MaxNumSubblockMergeCand>0 && width>=8 && height>=8)||sps_mmvd_enabled_flag) is not satisfied, regular_merge_flag may be inferred as 1. Otherwise, regular_merge_flag may be inferred as 0.

Further, the second condition 2702 may include only sps_mmvd_enabled_flag && ((sps_triangle_enabled_flag && slice_type==B && MaxNumTriangleMergeCand>=2)|| (sps_ciip_enabled_flag && cu_skip_flag==0 && width<128 && height<128)||(MaxNumSubblockMergeCand>0 && width>=8 && height>=8)). Here, in a case of (general_merge_flag==1 && sps_mmvd_enabled_flag && regular_merge_flag==0), and if ((sps_triangle_enabled_flag && slice_type==B && MaxNumTriangleMergeCand>=2)|| (sps_ciip_enabled_flag && cu_skip_flag==0 && width<128 && height<128)||(MaxNumSubblockMergeCand>0 && width>=8 && height>=8)) is not satisfied, mmvd_merge_flag may be inferred as 1. Otherwise, mmvd_merge_flag may be inferred as 0.

Further, as described with reference to FIG. 26, the signaling method may be used only for some of a plurality of modes in FIG. 27. That is, some of the first condition 2501, the second condition 2502, the third condition 2503, and the fourth condition 2504 of FIG. 25 may be used, and the method of FIG. 27 may be used for the rest. That is, the first condition 2501 of FIG. 25, the second condition 2702, the third condition 2703, and the fourth condition 2704 of FIG. 27 may be used.

FIG. 28 illustrates an example of a merge data syntax structure according to an embodiment of the present invention. FIG. 28 may be a specific embodiment of the signaling method described with reference to FIGS. 12, 13, and 26. In addition, in the embodiment of FIG. 28, conditions overlapping with those of the embodiment described in FIG. 27 may be excluded.

Referring to FIG. 28, compared to FIG. 27, a second condition 2802 may not include a condition of width*height>=64. This may occur since, if the condition of (width>=8 && height>=8) is not satisfied, the condition of width*height>=64 is not satisfied and thus the condition of width*height !=32 already exists. That is, this may occur since width*height>=64 may always be satisfied according to other conditions.

Further, as described with reference to FIG. 26, the signaling method may be used only for some of a plurality of modes in FIG. 28. That is, some of the first condition 2501, the second condition 2502, the third condition 2503, and the fourth condition 2504 of FIG. 25 may be used, and the method of FIG. 28 may be used for the rest. That is, the first condition 2501 of FIG. 25, and the second condition 2802, the third condition 2803, and the fourth condition 2804 of FIG. 28 may be used. Alternatively, the first to fourth conditions of FIGS. 25 to 28 may be interchangeably used. That is, the first condition 2701 of FIG. 27, and the second condition 2802, the third condition 2801, and the fourth condition 2801 of FIG. 28 may be used.

FIG. 29 illustrates an example of a merge mode signaling method according to an embodiment of the present invention. In the previously described merge mode signaling, a sequential signaling method has been described. For example, a sequential signaling method as shown in FIG. 25 may be used. FIG. 29 (a) shows the sequential signaling method. In FIG. 29, the bolded part indicates a mode to be determined, and the italicized part denotes signaling. This signaling may be a flag and may have a value of 0 or 1.

In addition, explicit signaling or implicit signaling may be performed depending on circumstances. For example, in FIG. 29(a), regular_merge_flag may be signaled, and based on the value of regular_merge_flag, whether or not it is the regular merge mode may be determined. If it is determined not to be the regular merge mode according to regular_merge_flag, mmvd_merge_flag may be signaled, and based on mmvd_merge_flag, whether or not it is MMVD may be determined. If it is determined not to be MMVD, merge_subblock_flag may be signaled, and based on merge_subblock_flag, whether or not it is the subblock merge mode may be determined. If it is determined not to be the subblock merge mode, ciip_flag may be signaled, and whether or not it is CIIP may be determined based on ciip_flag. In addition, it may be determined whether it is a triangular merge mode or triangular partitioning mode (TPM) based on ciip_flag. FIG. 29 (a) shows an embodiment in which signaling is performed in a sequence of regular merge mode, MMVD, subblock merge mode, CIIP, and triangle merge mode. However, the present invention is not limited thereto, and signaling may be configured in a difference sequence. The preceding figures illustrate embodiments in which signaling is performed in a difference sequence As another merge mode signaling method, a grouping method may be used. FIG. 29(b) shows an embodiment of a grouping method. For example, group_1_flag may be signaled, and it may be determined whether a mode selected based on group_1_flag belongs to group 1. If it is determined not to be group 1 according to group_1_flag, group_2_flag may be signaled. In addition, it may be determined whether a mode selected based on group_2_flag belongs to group 2. Such an operation can be performed even if a plurality of groups exist. Further, signaling indicating a mode in a group may be present. The grouping method can reduce the signaling depth compared to sequential signaling. Further, the grouping method can reduce the maximum length of signaling (maximum length of a codeword).

According to an embodiment of the present invention, three groups may be present. Further, there may be one mode belonging to a predetermined group. For example, one mode belonging to group 1 may be present. In addition, two modes belonging to each of group 2 and group 3 may be present. Referring to FIG. 29(b), group 1 may include the subblock merge mode, group 2 may include the regular merge mode and MMVD, and group 3 may include the CIIP and triangle merge mode. In addition, group_1_flag may be merge_subblock_flag, and group_2_flag may be regular_merge_flag. In addition, ciip_flag and mmvd_merge_flag may be present as signaling indicating a mode in a group. For example, merge_subblock_flag is signaled, and based on merge_subblock_flag, whether or not it is a subblock merge mode may be determined. If it is determined not to be the subblock merge mode, regular_merge_flag may be signaled. A determination as to whether it is group 2 (regular merge mode or MMVD) or group 3 (CIIP or triangle merge mode) can be made based on the regular_merge_flag. In addition, when it is determined to be group 2, whether it is the regular merge mode or MMVD is determined based on mmvd_merge_flag. In addition, when it is determined to be group 3, a determination of whether it is the CIIP or the triangle merge mode can be made based on ciip_flag. That is, merge_subblock_flag, regular_merge_flag, mmvd_merge_flag, and ciip_flag in FIGS. 29(a) and 29(b) may have slightly different meanings with each other.

FIG. 30 illustrates an example of a merge data syntax according to an embodiment of the present invention. The embodiment of FIG. 30 may use the grouping method described with reference to FIG. 29(b). In the present embodiment, a description that overlaps with those described above may be omitted.

According to an embodiment of the present invention, merge_subblock_flag may be signaled when the merge mode is used. The case of using the merge mode may be the same as described above, and may correspond to a case where general_merge_flag is 1. Further, the present invention may correspond to a case where CuPredMode is not MODE_IBC or a case where CuPredMode is MODE_INTER. In addition, it may be determined whether to parse the merge_subblock_flag based on MaxNumSubblockMergeCand and the block size, and this determination can be made based on a condition by which the subblock merge mode is usable as described above. If merge_subblock_flag is 1, it may be determined to use the subblock merge mode, and a candidate index may be additionally determined based on merge_subblock_idx.

Further, if merge_subblock_flag is 0, regular_merge_flag may be parsed. Here, a condition for parsing the regular_merge_flag may be present. For example, a condition based on the block size may be included therein. In addition, a condition based on higher level signaling indicating whether a mode is usable may be included therein. The higher level signaling indicating whether the mode is usable may include sps_ciip_enabled_flag and sps_triangle_enabled_flag. The higher level signaling may include a condition based on the slice type. Further, a condition based on cu_skip_flag may be included therein. Referring to FIG. 30, regular_merge_flag may be parsed only if (width*height>=64 && width<128 && height<128) is satisfied. Further, if (width*height>=64 && width<128 && height<128) is not satisfied, regular_merge_flag may not be parsed.

In addition, conditions by which CIIP is usable may include (sps_ciip_enabled_flag && cu_skip_flag==0). Further, the block size condition by which CIIP is usable may include (width*height>=64 && width<128 && height<128). Further, conditions by which the triangle merge mode is usable may include (sps_triangle_enabled_flag && slice_type==B). Further, the block size condition by which the triangle merge mode is usable may include (width*height>=64 && width<128 && height<128). If conditions by which CIIP is usable or conditions by which the triangle merge mode is usable are satisfied, regular_merge_flag may be parsed. Further, when none of conditions by which CIIP is usable and conditions by which the triangle merge mode is usable are satisfied, the regular_merge_flag may not be parsed.

According to an embodiment of the present invention, when regular_merge_flag does not exist, the value thereof may be inferred as 1. For example, the value may always be inferred to be 1. This may correspond to a case in which the regular merge mode or MMVD is used if regular_merge_flag is 1 in the present invention. Therefore, if none of a block size condition by which CIIP is usable and a block size condition by which the triangle merge mode is usable are satisfied, the regular merge mode and MMVD may be usable, and the value thereof may be determined to be 1 without parsing the regular_merge_flag. In the embodiment shown in FIG. 30, the block size condition by which CIIP is usable and the block size condition by which the triangle merge mode is usable are the same. That is, none of the CIIP and the triangle merge mode may be used for a block having a width or height of 128.

Further, even if none of conditions by which CIIP is usable and conditions by which the triangle merge mode is usable are satisfied, the regular merge mode or MMVD may be usable as described above, and thus the value thereof may be inferred as 1 without parsing the regular_merge_flag.

Referring to FIG. 30, if regular merge flag is 1, a syntax element may be parsed based on the value of sps_mmvd_enabled_flag. sps_mmvd_enabled_flag may be higher-level signaling indicating whether MMVD is usable as described above. When sps_mmvd_enabled_flag is 0, MMVD may not be used. Referring to FIG. 30, if sps_mmvd_enabled_flag is 0, mmvd_merge_flag, mmvd_cand_flag, mmvd_distance_idx, mmvd_direction_idx, and merge_idx may not be parsed. In addition, if mmvd_merge_flag does not exist, the value thereof may be inferred as 0. Further, if merge_idx does not exist, the value thereof may be inferred according to a preconfigured method. For example, if merge_idx does not exist and mmvd_merge_flag is 1, it may be inferred as mmvd_cand_flag, and if mmvd_merge_flag is 0, the value thereof may be inferred as 0. Therefore, in the embodiment of FIG. 30, in a case where sps_mmvd_enabled_flag is 0, if regular_merge_flag is 1, the value of merge_idx may always be 0, and regular merge mode prediction may be performed using candidates of index 0 of a merge candidate list. Therefore, there may be no degree of freedom for candidate selection, and thus coding efficiency may decrease. Further, if sps_mmvd_enabled_flag is 1, mmvd_merge_flag may be parsed, and if mmvd_merge_flag is 0, merge_idx may be parsed based on MaxNumMergeCand.

Further, referring to FIG. 30, if regular merge flag is 0, ciip_flag may be parsed when all of conditions by which CIIP is usable and conditions by which the triangle merge mode is usable are satisfied. If ciip_flag is 1, the CIIP may be used, and if ciip_flag is 0, the triangle merge mode may be used. If either conditions by which CIIP is usable or conditions by which the triangle merge mode is usable are satisfied, the ciip_flag may not be parsed. If ciip_flag does not exist and regular_merge_flag is 1, ciip_flag may be inferred as 0. If ciip_flag does not exist and regular_merge_flag is 0, ciip_flag may be inferred as (sps_ciip_enabled_flag && cu_skip_flag==0). In addition, MergeTriangleFlag may be set to !ciip_flag in a case of B slice. Further, MergeTriangleFlag may be set to 0 in a case of P slice.

FIG. 31 illustrates an example of a merge data syntax according to an embodiment of the present invention. In the present embodiment, details that are duplicated with those described above may be omitted. As described in FIG. 30, if regular_merge_flag is 1 and higher-level signaling indicating whether MMVD is usable or not indicates that MMVD is non-usable, a degree of freedom for candidate selection is reduced. In the embodiment of FIG. 31, this problem can be solved.

Referring to FIG. 31, whether to parse merge_idx may be independent of sps_mmvd_enabled_flag. That is, whether merge_idx is parsed may be determined regardless of the value of sps_mmvd_enabled_flag. According to an embodiment of the present invention, if regular_merge_flag is 1, mmvd_merge_flag is 0, and MaxNumMergeCand>1, merge_idx may be parsed. Further, if regular_merge_flag is 1 and mmvd_merge_flag is 1, merge_idx may not be parsed. Further, if regular merge_flag is 1 and MaxNumMergeCand is 1, merge_idx may not be parsed. For example, if sps_mmvd_enabled_flag is 1, regular_merge_flag is 1, mmvd_merge_flag is 0, and MaxNumMergeCand>1, merge_idx may be parsed. Similarly, if sps_mmvd_enabled_flag is 0, regular_merge_flag is 1, mmvd_merge_flag is 0, and MaxNumMergeCand>1, merge_idx may be parsed.

In addition, the block size condition by which the triangle merge mode is usable in the embodiment of FIG. 30 could be (width*height>=64 && width<128 && height<128). However, if the width or height has the value of 128, the triangle merge mode is usable. For example, if the width or height has the value of 128, the triangle merge mode prediction can help improve coding efficiency. In FIG. 31, the triangle merge mode may be used even when the width or height has the value of 128.

In FIG. 31, the block size condition by which CIIP is usable may be (width*height>=64 && width<128 && height<128). Further, the block size condition by which the triangle merge mode is usable may be (width*height>=64). Therefore, referring to FIG. 31, if (width*height>=64) is not satisfied, regular_merge_flag may not be parsed. Further, the regular_merge_flag may be parsed when the width has the value of 128 (or the height has the value of 128 or more) or the height has the value of 128 (or the height has the value of 128 or more). For example, in a case of (sps_ciip_enabled_flag && cu_skip_flag==0 && width<128 && height<128), and if (width*height>=64) is satisfied, regular_merge_flag may be parsed. Further, in a case of (sps_triangle_enabled_flag && slice_type==B), if (width*height>=64) is satisfied, regular_merge_flag may be parsed. Further, if (sps_ciip_enabled_flag && cu_skip_flag==0 && width<128 && height<128) is not satisfied, and (sps_triangle_enabled_flag && slice_type==B) is not satisfied, regular merge flag may not be parsed.

Further, referring to FIG. 31, when determining whether to parse ciip_flag, a condition based on the block size may be required. For example, if width<128 and height<128, the decoder may parse ciip_flag. If the width has the value of 128 (or more than 128) or the height has the value of 128 (or more than 128), ciip_flag may not be parsed. This may occur because if the width or height has the value of 128 (or more than 128), one of the CIIP and triangle merge mode may be non-usable, but the other one may be usable. This may occur because if the width or height has the value of 128 (or more than 128), the CIIP is non-usable but triangle merge mode may be usable. In the embodiment of FIG. 30, if the width or height has the value of 128 (or 128 or more), neither CIIP nor triangle merge mode are usable, and accordingly, regular_merge_flag is not parsed and the value thereof is inferred as 1. Therefore, there is a difference between the embodiments of FIG. 30 and FIG. 31.

In an embodiment of the present invention, the value of regular_merge_flag may be inferred based on merge_subblock_flag. In the present embodiment, regular_merge_flag, merge_subblock_flag, and ciip_flag may correspond to regular_merge_flag, merge_subblock_flag, and ciip_flag described with reference to FIG. 29(b), FIG. 30, and FIG. 31.

In the description of FIG. 30, if regular_merge_flag does not exist, the value thereof is always inferred to be 1, but there may be a case where merge_subblock_flag signaled before regular_merge_flag is 1. Here, when prediction is performed based on merge_subblock_flag or regular_merge_flag, since both of the values of merge_subblock_flag and regular_merge_flag are 1, ambiguity may occur as to prediction to be performed. Therefore, in the present embodiment, regular_merge_flag may be inferred based on merge_subblock_flag. For example, if merge_subblock_flag is 1, regular_merge_flag may be inferred as 0. Further, if merge_subblock_flag is 0, regular_merge_flag may be inferred as 1. Alternatively, a condition of general_merge_flag may be added thereto. For example, when merge_subblock_flag is 0 and general_merge_flag is 1, regular_merge_flag may be inferred as 1.

In addition, in FIG. 30, a method of inferring the value of ciip_flag when the ciip_flag does not exist is shown. In a case where the block size condition by which CIIP is usable and the block size condition by which the triangle merge mode is usable are different, if the ciip_flag inference method described in FIG. 30 is used, it is signaled that a specific mode is used in connection with a block size for which the specific mode cannot be used. That is, for example, if the width or height has the value of 128, CIIP is non-usable, but ciip_flag may be set to 1. The present embodiment can solve this problem.

According to an embodiment of the present invention, if ciip_flag does not exist, the value thereof may be inferred based on the block size. Further, if ciip_flag does not exist, the value thereof may be inferred based on regular_merge_flag. For example, if regular_merge_flag is 1, ciip_flag may be inferred as 0. Further, if regular_merge_flag is 0, ciip_flag may be inferred based on the block size. For example, if regular_merge_flag is 0, ciip_flag may be inferred based on the block size, sps_ciip_enabled_flag, and cu_skip_flag. If regular_merge_flag is 0, ciip_flag may be inferred as (sps_ciip_enabled_flag && cu_skip_flag==0 && width<128 && height<128). Therefore, if regular_merge_flag is 0 and the width or height has the value of 128, ciip_flag may be inferred as 0. Further, in order to infer the value of ciip_flag as 1, a condition by which general_merge_flag is 1 may be included. If general_merge_flag is 0, the value of ciip_flag may be inferred as 0. That is, if regular_merge_flag is 0, ciip_flag may be inferred as (sps_ciip_enabled_flag && cu_skip_flag==0 && width<128 && height<128 && general_merge_flag==1). Otherwise, the value of ciip_flag may be inferred as 0.

Alternatively, if regular_merge_flag is 0 and general_merge_flag is 1, ciip_flag may be inferred as (sps_ciip_enabled_flag && cu_skip_flag==0 && width<128 && height<128). If general_merge_flag is 0, the value of ciip_flag may be inferred as 0.

In addition, a method of setting MergeTriangleFlag regardless of the value of regular_merge_flag has been described in the embodiment of FIG. 30. Therefore, a case where regular_merge_flag is 1 and MergeTriangleFlag is 1 may occur, and this causes ambiguity for the prediction method. Therefore, in the present embodiment, MergeTriangleFlag may be set based on regular_merge_flag. For example, if regular_merge_flag is 1, MergeTriangleFlag may be set to 0. Further, if regular_merge_flag is 0, MergeTriangleFlag may be set to !ciip_flag. Additionally, if regular_merge_flag is 0, MergeTriangleFlag may be set in consideration of conditions by which the triangle merge mode is usable. For example, if regular_merge_flag is 0, MergeTriangleFlag may be set to (!ciip_flag && sps_triangle_enabled_flag && slice_type==B).

Therefore, when sps_triangle_enabled_flag is 0 or slice_type is not B, a situation in which MergeTriangleFlag is set to 1 can be prevented. In addition, a condition by which general_merge_flag is 1 may be included in order to determine MergeTriangleFlag as 1. If general_merge_flag is 0, MergeTriangleFlag may be set to 0. That is, if regular_merge_flag is 0, MergeTriangleFlag may be set to (!ciip_flag && sps_triangle_enabled_flag && slice_type==B && general_merge_flag==1). Otherwise, MergeTriangleFlag may be set to 0.

Alternatively, if regular_merge_flag is 0 and general_merge_flag is 1, MergeTriangleFlag may be set to (!ciip_flag && sps_triangle_enabled_flag && slice_type==B). If general_merge_flag is 0, MergeTriangleFlag may be set to 0.

FIG. 32 illustrates a geometric merge mode according to an embodiment of the present invention. According to an embodiment of the present invention, the geometric merge mode may be referred to as various names, such as a geometric partitioning mode, a GEO mode, a GEO merge mode, and GEO partitioning. According to an embodiment of the present invention, the geometric merge mode may be a method of dividing a coding unit (CU) and a coding block (CB). For example, the geometric merge mode may be a method of dividing the CU or CB of a square or rectangular shape by using non-square or non-rectangular partitions. Referring to FIG. 32, an example of geometric partitioning is shown. As shown in FIG. 32, a rectangular CU may be divided into triangular or trapezoidal partitions (or polygons) by geometric partitioning. Further, signaling for a method of performing the geometric merge mode may be signaled for the CU. Further, in relation to the geometric merge mode, motion compensation and prediction may be performed based on two pieces of motion information. Further, two pieces of motion information can be obtained from a merge candidate. According to an embodiment of the present invention, signaling indicating two pieces of motion information used in the geometric merge mode may be present. For example, two indices may be signaled to indicate two pieces of motion information used in the geometric merge mode. More specifically, for example, two merge candidate indices may be signaled to indicate two pieces of motion information used in the geometric merge mode. Further, two predictors may be blended in the geometric merge mode. For example, in the geometric merge mode, two predictors may be blended near the inner boundary in the CU. Blending of two predictors may denote that a weighted summation of two predictors is performed.

As an embodiment, syntax elements for indicating two pieces of motion information used in the geometric merge mode may be merge_triangle_idx0 and merge_triangle_idx1. Here, two indices m and n may be derived from the syntax element. For example, the following equation can be derived.

m=merge_triangle_idx0 n=merge_triangle_idx1+((merge_triangle_idx1>=m)?1: 0)

That is, index m may be equal to merge_triangle_idx0. Further, index n may be merge_triangle_idx1+1 if merge_triangle_idx1 is equal to or greater than merge_triangle_idx0, and index n may be merge_triangle_idx1 if merge_triangle_idx1 is less than merge_triangle_idx0.

Further, referring to FIG. 32, the split boundary of the geometric merge mode may be represented by angle phi and distance offset rho. Angle phi may represent a quantized angle, and distance offset rho may represent a quantized offset. Angle and distance offset may be signaled by merge_geo_idx. For example, the angle and distance offset may be defined based on a look-up table. The geometric merge mode may generate a prediction signal from two predictors based on two pieces of motion information. Here, when performing a weighted summation of two predictors, a weight may be based on the angle and the distance offset. Alternatively, when performing a weighted summation of two predictors, the weight may be based on the position (coordinates) within the block. Alternatively, when performing a weighted summation of two predictors, the weight may be based on block width and height.

The geometric merge mode may have more possible split types than that of the TPM. For example, two or more split types are possible in the geometric merge mode. For example, 80 split types may be possible. The geometric merge mode can be a type of merge mode. That is, general_merge_flag can have the value of 1 in the geometric merge mode.

FIG. 33 illustrates a merge data syntax according to an embodiment of the present invention.

In relation to the embodiment of FIG. 33, the details described with reference to FIGS. 29 to 32 or previously described may be omitted.

As described above, a method for signaling multiple merge modes may be present. Further, the multiple merge modes may include a subblock merge mode, a regular merge mode, MMVD, CIIP, a geometric merge mode, and the like. Further, the multiple merge modes may not include a triangle partitioning mode. Alternatively, the triangle partitioning mode may be in a form of being included in the geometric merge mode. In addition, when signaling merge modes by using the signaling method of the present embodiment, codewords of different lengths can be used and a short-length codeword can be used for a particular mode, and thus coding efficiency can be improved. Further, the signaling method of the present embodiment can eliminate redundant signaling and improve coding efficiency. In addition, the parsing complexity can be lowered by omitting unnecessary condition checking in the signaling of the present embodiment.

According to an embodiment of the present invention, there may be conditions by which CIIP is usable. Conditions by which CIIP is usable may be referred to as CIIP_conditions. CIIP_conditions may be true when all of the following conditions are satisfied.

Condition 1. sps_ciip_enabled_flag
Condition 2. cu_skip_flag==0
Condition 3. cbWidth*cbHeight>=64
Condition 4. cbWidth<128
Condition 5. cbHeight<128

Further, CIIP_conditions may be false when at least one of the above conditions is not satisfied. Since the above conditions have been described in the previous embodiment, the details will be omitted here.

According to an embodiment of the present invention, conditions by which the geometric merge mode is usable may be present. Conditions by which the geometric merge mode is usable may be referred to as GEO_conditions. GEO_conditions may be true when all of the following conditions are satisfied.

Condition 1. sps_triangle_enabled_flag
Condition 2. MaxNumTriangleMergeCand>1
Condition 3. slice_type==B
Condition 4. cbWidth>=8
Condition 5. cbHeight>=8

Further, GEO_conditions may be false when at least one of the above conditions is not satisfied.

In another embodiment, a slice_type condition may not be required. This is possible because a condition based on slice_type is satisfied when another condition, for example, a condition based on MaxNumTriangleMergeCand, is satisfied. According to an embodiment of the present invention, conditions by which the geometric merge mode is usable may be present. Conditions by which the geometric merge mode is usable may be referred to as GEO_conditions. GEO_conditions may be true when all of the following conditions are satisfied.

Condition 1. sps_triangle_enabled_flag
Condition 2. MaxNumTriangleMergeCand>1
Condition 3. cbWidth>=8
Condition 4. cbHeight>=8

Further, GEO_conditions may be false when at least one of the above conditions is not satisfied.

Since the above conditions have been described in the previous embodiment, the details will be omitted here. However, in relation to sps_triangle_enabled_flag and MaxNumTriangleMergeCand, it has been previously described with regard to a value relating to the TPM, but in the present embodiment, a value relating to the geometric merge mode may be considered. That is, sps_triangle_enabled_flag may be higher-level signaling indicating whether the geometric merge mode is usable. Further, MaxNumTriangleMergeCand may be the maximum number of candidate lists used in the geometric merge mode.

According to an embodiment of the present invention, regular merge flag may be parsed when CIIP_conditions or GEO_conditions are satisfied. Further, if neither CIIP_conditions nor GEO_conditions are satisfied, regular_merge_flag may not be parsed. Referring to FIG. 33, condition 2 indicates (CIIP_conditions||GEO_conditions). That is, the regular_merge_flag may be parsed if at least one of the following conditions is satisfied.

Condition 1 (CIIP_conditions). sps_ciip_enabled_flag && cu_skip_flag==0 && cbWidth*cbHeight>=64 && cbWidth<128 && cbHeight<128
Condition 2 (GEO_conditions). sps_triangle_enabled_flag && MaxNumTriangleMergeCand>1 && cbWidth>=8 && cbHeight>=8

Further, if none of the above conditions are satisfied, the regular merge flag may not be parsed. In addition, when regular_merge_flag does not exist, the value thereof may be inferred as general_merge_flag && !merge_subblock_flag.

As another embodiment, as described above, the condition 2 (GEO_conditions) may include the slice_type condition and be represented as follows.

Condition 2 (GEO_conditions). sps_triangle_enabled_flag && MaxNumTriangleMergeCand>1 && slice_type==B && cbWidth>=8 && cbHeight>=8

However, if the slice_type condition is always satisfied when other conditions are satisfied, additional checking of the slice type condition may not be required in order to reduce the complexity of checking the parsing condition.

According to an embodiment of the present invention, ciip_flag may be parsed if both CIIP_conditions and GEO_conditions are satisfied. Further, if either CIIP_conditions or GEO_conditions is not satisfied, ciip_flag may not be parsed. That is, if all of the following conditions are satisfied, ciip_flag may be parsed, and if at least one of the following conditions is not satisfied, ciip_flag may not be parsed.

Condition 1 (CIIP_conditions). sps_ciip_enabled_flag && cu_skip_flag==0 && cbWidth*cbHeight>=64 && cbWidth<128 && cbHeight<128
Condition 2 (GEO_conditions). sps_triangle_enabled_flag && MaxNumTriangleMergeCand>1 && cbWidth>=8 && cbHeight>=8

Further, as described above, it is possible to include conditions based on slice_type in condition 2 (GEO_conditions). The condition may be as follows.

Condition 2 (GEO_conditions). sps_triangle_enabled_flag && MaxNumTriangleMergeCand>1 && slice_type==B && cbWidth>=8 && cbHeight>=8

According to an embodiment of the present invention, conditions for parsing ciip_flag may differ in order to reduce parsing complexity. For example, some of the block size conditions may be omitted. In the present invention, when block size conditions for using the geometric merge mode are satisfied, some of block size conditions for using CIIP may be satisfied. Therefore, in reference to condition 3 of FIG. 33 and according to an embodiment of the present invention, ciip_flag may be parsed if all of the following conditions are satisfied, and ciip_flag may not be parsed if at least one of the following conditions is not satisfied.

Condition 1 (CIIP_conditions). sps_ciip_enabled_flag && cu_skip_flag==0 && cbWidth<128 && cbHeight<128

Condition 2 (GEO_conditions). sps_triangle_enabled_flag && MaxNumTriangleMergeCand>1 && cbWidth>=8 && cbHeight>=8

Further, if ciip_flag does not exist, the value thereof may be inferred as 1 when all of the following conditions are satisfied, and the value thereof may be inferred as 0 when at least one of the following conditions is not satisfied.

Condition 1. sps_ciip_enabled_flag==1
Condition 2. general_merge_flag==1
Condition 3. merge_subblock_flag==0
Condition 4. regular_merge_flag==0
Condition 5. cu_skip_flag==0
Condition 6. cbWidth<128
Condition 7. cbHeight<128
Condition 8. cbWidth*cbHeight>=64

That is, conditions during parsing and conditions during inference may be different. In addition, conditions omitted during parsing (for example, conditions based on the block size) may be included in the inference condition.

In addition, merge_geo_flag, which is a value indicating whether or not to use the geometric merge mode, may be determined as 1 if all of the following conditions are satisfied, and may be determined as 0 if at least one of the following conditions is not satisfied.

Condition 1. sps_triangle_enabled_flag==1
Condition 2. general_merge_flag==1
Condition 3. merge_subblock_flag==0
Condition 4. regular_merge flag==0
Condition 5. ciip_flag==0
Condition 6. MaxNumTriangleMergeCand>=2
Condition 7. cbWidth>=8
Condition 8. cbHeight>=8

As an additional embodiment, slice_type==B of condition 9 may be added.

Therefore, referring to FIG. 33, the following signaling structure may be provided. When a first condition 3301 is satisfied, merge_subblock_flag may be parsed. If merge_subblock_flag is 1, the subblock merge mode may be used, merge_subblock_idx may be parsed, and regular_merge_flag, mmvd_merge_flag, and ciip_flag may not be parsed. If merge_subblock_flag is 0 and a second condition 3302 is satisfied, regular_merge_flag may be parsed. If regular_merge_flag is 1, regular merge mode or MMVD can be used, and additionally mmvd_merge_flag can be parsed. In this regard, the details described with reference to FIGS. 29 to 32 may be applied. If regular_merge_flag is 0 and the second condition 3302 is satisfied, ciip_flag may be parsed. If ciip_flag is 1, CIIP may be used. When using the CIIP, merge_idx may be parsed if MaxNumMergeCand is greater than 1. If ciip_flag is 0, merge_geo_flag may be determined to be 1. Further, if ciip_flag is 0, the geometric merge mode may be used. When using the geometric merge mode, merge_geo_idx, merge_triangle_idx0, and merge_triangle_idx1 may be parsed. Alternatively, when using the geometric merge mode, if MaxNumTriangleMergeCand is greater than 1, merge_geo_idx, merge_triangle_idx0, and merge_triangle_idx1 may be parsed.

Therefore, according to an embodiment of the present invention, when a block having a width or height of 4, that is, a 4×N or N×4 size block uses CIIP, signaling may be performed as follows. The merge_subblock_flag may be 0, since the second condition 3302 is satisfied, regular_merge_flag may be parsed and the value thereof may be 0, and since the third condition 3303 is not satisfied, ciip_flag may not be parsed and the value thereof may be inferred as 1 according to the details described above. In addition, when using the geometric merge mode, signaling may be performed as follows. The merge_subblock_flag may be 0, regular_merge_flag may be 0, and ciip_flag may be 0.

In the embodiment described with reference to FIG. 33, only ciip_flag may be present as a syntax element indicating whether to use the geometric merge mode. In addition, the embodiment of FIG. 33 has been described based on that the geometric merge mode cannot be performed for a block having a width or height smaller than 8. However, the present invention is not limited thereto, and the embodiment may be applied even when the geometric merge mode is non-usable for another block size (e.g., a block size smaller than a threshold).

Figure 34:
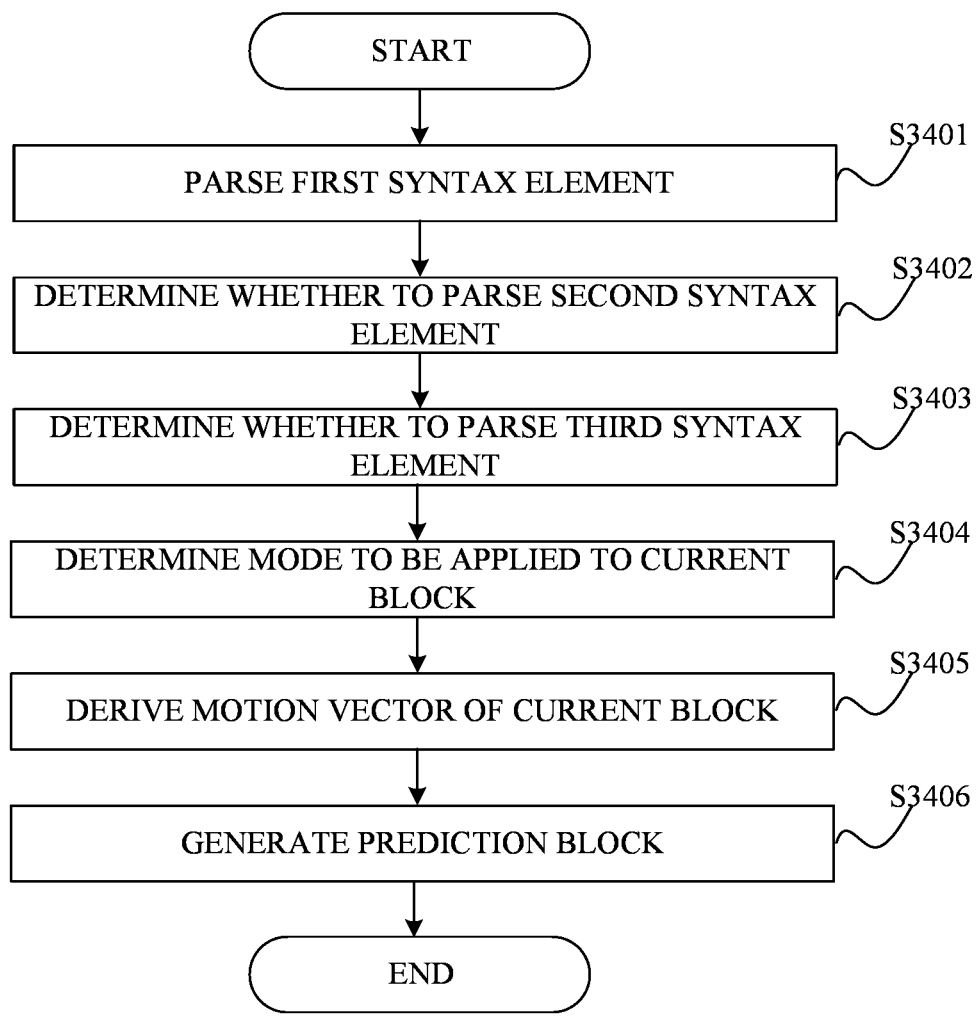
FIG. 34 illustrates an example of a video signal processing method according to an embodiment to which the present invention is applied.

FIG. 34 illustrates an example of a video signal processing method according to an embodiment to which the present invention is applied. Referring to FIG. 34, a decoder is mainly described for convenience of description, but the present invention is not limited thereto. Further, the method for processing a video signal based on multi-hypothesis prediction according to the present embodiment can be applied to an encoder in substantially the same manner.

The decoder parses a first syntax element indicating whether a merge mode is applied to the current block (S3401).

When the merge mode is applied to the current block, the decoder determines whether to parse a second syntax element based on a first predefined condition (S3402). As an embodiment, the second syntax element may indicate whether a first mode or a second mode is applied to the current block.

When the first mode and the second mode are not applied to the current block, the decoder determines whether to parse a third syntax element based on a second predefined condition (S3403). As an embodiment, the third syntax element may indicate a mode applied to the current block among a third mode or a fourth mode.

The decoder determines a mode applied to the current block based on the second syntax element or the third syntax element (S3404).

The decoder derives motion information of the current block based on the determined mode (S3405).

The decoder generates a prediction block of the current block by using the motion information of the current block (S3406).

The present invention relates to a video signal processing method in which the first condition includes at least one of a condition by which the third mode is usable and a condition by which the fourth mode is usable.

As described above, as an embodiment, the third mode and the fourth mode may be located later than the first mode in a decoding sequence in a merge data syntax.

As described above, as an embodiment, the video signal processing method according to the present invention includes parsing the second syntax element when the first condition is satisfied; and when the first condition is not satisfied, the value of the second syntax element may be inferred as 1.

As described above, as an embodiment, when the first condition is not satisfied, the second syntax element may be inferred based on a fourth syntax element indicating whether a subblock-based merge mode is applied to the current block.

As described above, as an embodiment, the second condition may include a condition by which the fourth mode is usable.

As described above, as an embodiment, the second condition may include at least one of conditions relating to whether the third mode is usable in the current sequence, whether the fourth mode is usable in the current sequence, whether the maximum number of candidates for the fourth mode is greater than 1, whether a width of the current block is smaller than a first predefined size, and whether a height of the current block is smaller than a second predefined size.

As described above, as an embodiment, the video signal processing method according to the present invention includes, when the second syntax element has the value of 1, obtaining a fifth syntax element indicating whether a mode applied to the current block is the first mode or the second mode.

The embodiments of the present invention may be implemented through various means. For example, the embodiments of the present invention may be implemented by hardware, firmware, software, or a combination thereof.

In implementation by hardware, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, a microprocessor, and the like.

In implementation by firmware or software, the method according to the embodiments of the present invention may be implemented in the form of a module, a procedure, a function, or the like for performing functions or operations described above. Software code may be stored in a memory and executed by a processor. The memory may be located inside or outside the processor, and may exchange data with the processor through already known various means.

Some embodiments may be implemented in the form of a recording medium including instructions executable by a computer, such as a program module executed by a computer. A computer-readable medium may be a random available medium which can be accessed by a computer, and includes all of volatile and nonvolatile media and separable and nonseparable media. Further, the computer-readable medium may include all of computer storage media and communication media. The computer storage media include all of volatile, nonvolatile, separable, and nonseparable media implemented by a random method or technology for storing information, such as computer-readable instructions, data structures, program modules, or other data. The communication media include computer-readable instructions, data structures, other data of modulated data signals such as program modules, or other transmission mechanism, and include a random information transfer medium.

The description according to the present invention is only for an example, and it may be understood by those skilled in the art that embodiments of the present invention can be easily changed into other detailed forms without departing from the technical idea or necessary features of the present invention. Therefore, the above-described embodiments should be construed as examples in all aspects and not be restrictive. For example, each element mentioned in a singular form may be implemented in a distributed manner, and also elements mentioned in a distributed form may be implemented in a combination form.

The scope of the present invention is defined by the appended claims rather than the detailed description. The meaning and scope of the claims and all modifications or modified forms derived from the concept of equivalents thereof should be construed to be included in the scope of the present invention.

INDUSTRIAL APPLICABILITY

Preferred embodiments of the present invention described above are provided for the purpose of illustration, and a person skilled in the art can improve, modify, substitute, or add various other embodiments within the technical idea and the technical scope of the present invention disclosed in the appended claims.

The invention claimed is:

1. A video signal decoding method comprising:
parsing a first syntax element indicating whether a merge mode is applied to a current block;
parsing a second syntax element when the merge mode is applied to the current block and a first predefined condition is satisfied, wherein the second syntax element indicates whether a first mode or a second mode is applied to the current block, when the first predefined condition is not satisfied, the second syntax element is inferred based on a fourth syntax element indicating whether a subblock-based merge mode is applied to the current block;
determining whether to parse a third syntax element based on a second predefined condition when the first mode and the second mode are not applied to the current block, wherein the third syntax element indicates a mode applied to the current block among a third mode and a fourth mode, wherein a syntax element related to the third mode and a syntax element related to the fourth mode are located later than the second syntax element in a decoding sequence in a merge data syntax;
determining a mode applied to the current block based on the second syntax element or the third syntax element;
deriving motion information of the current block based on the determined mode; and
generating a prediction block of the current block by using the motion information of the current block,
wherein the first predefined condition includes at least one of a condition by which the third mode is usable and a condition by which the fourth mode is usable.

2. The video signal decoding method of claim 1, wherein the second predefined condition includes a condition by which the fourth mode is usable.

3. The video signal decoding method of claim 1, wherein the second predefined condition includes at least one of conditions relating to whether the third mode is usable in a current sequence, whether the fourth mode is usable in the current sequence, whether a maximum number of candidates for the fourth mode is greater than 1, whether a width of the current block is smaller than a first predefined size, and whether a height of the current block is smaller than a second predefined size.

4. The video signal decoding method of claim 1, further comprising, when the second syntax element has the value of 1, obtaining a fifth syntax element indicating whether a mode applied to the current block is the first mode or the second mode.

5. A video signal decoding apparatus comprising a processor, wherein the processor is configured to:
- parse a first syntax element indicating whether a merge mode is applied to a current block;
- parsing a second syntax element when the merge mode is applied to the current block and a first predefined condition is satisfied, wherein the second syntax element indicates whether a first mode or a second mode is applied to the current block, when the first predefined condition is not satisfied, the second syntax element is inferred based on a fourth syntax element indicating whether a subblock-based merge mode is applied to the current block;
- determine whether to parse a third syntax element based on a second predefined condition when the first mode and the second mode are not applied to the current block, wherein the third syntax element indicates a mode applied to the current block among a third mode and a fourth mode, wherein a syntax element related to the third mode and a syntax element related to the fourth mode are located later than the second syntax element in a decoding sequence in a merge data syntax;
- determine a mode applied to the current block based on the second syntax element or the third syntax element;
- derive motion information of the current block based on the determined mode; and
- generate a prediction block of the current block by using the motion information of the current block,
- wherein the first predefined condition includes at least one of a condition by which the third mode is usable and a condition by which the fourth mode is usable.

6. The video signal decoding apparatus of claim 5, wherein the second predefined condition includes a condition by which the fourth mode is usable.

7. The video signal decoding apparatus of claim 5, wherein the second predefined condition includes at least one of conditions relating to whether the third mode is usable in a current sequence, whether the fourth mode is usable in the current sequence, whether a maximum number of candidates for the fourth mode is greater than 1, whether a width of the current block is smaller than a first predefined size, and whether a height of the current block is smaller than a second predefined size.

8. The video signal decoding apparatus of claim 5, wherein when the second syntax element has the value of 1, the processor is configured to obtain a fifth syntax element indicating whether a mode applied to the current block is the first mode or the second mode.

9. A video signal encoding method comprising:
- encoding a first syntax element indicating whether a merge mode is applied to a current block;
- encoding a second syntax element when the merge mode is applied to the current block and a first predefined condition is satisfied, wherein the second syntax element indicates whether a first mode or a second mode is applied to the current block, when the first predefined condition is not satisfied, the second syntax element is not included in a bitstream including the video signal;
- determining whether to encode a third syntax element based on a second predefined condition when the first mode and the second mode are not applied to the current block, wherein the third syntax element indicates a mode applied to the current block among a third mode or a fourth mode, wherein a syntax element related to the third mode and a syntax element related to the fourth mode are located later than the second syntax element in a decoding sequence in a merge data syntax;
- deriving motion information of the current block based on a mode applied to the current block; and
- generating a prediction block of the current block by using the motion information of the current block,
- wherein the first predefined condition includes at least one of a condition by which the third mode is usable and a condition by which the fourth mode is usable.

10. A non-transitory computer-readable medium storing a bitstream, the bitstream being decoded by a decoding method,
wherein the decoding method, comprising:
- parsing a first syntax element indicating whether a merge mode is applied to a current block;
- parsing a second syntax element when the merge mode is applied to the current block and a first predefined condition is satisfied, wherein the second syntax element indicates whether a first mode or a second mode is applied to the current block, when the first predefined condition is not satisfied, the second syntax element is inferred based on a fourth syntax element indicating whether a subblock-based merge mode is applied to the current block;
- determining whether to parse a third syntax element based on a second predefined condition when the first mode and the second mode are not applied to the current block, wherein the third syntax element indicates a mode applied to the current block among a third mode and a fourth mode, wherein a syntax element related to the third mode and a syntax element related to the fourth mode are located later than the second syntax element in a decoding sequence in a merge data syntax;
- determining a mode applied to the current block based on the second syntax element or the third syntax element;
- deriving motion information of the current block based on the determined mode; and
- generating a prediction block of the current block by using the motion information of the current block,
- wherein the first predefined condition includes at least one of a condition by which the third mode is usable and a condition by which the fourth mode is usable.

* * * * *